(12) United States Patent
Azenkot et al.

(10) Patent No.: US 7,050,419 B2
(45) Date of Patent: May 23, 2006

(54) HEAD END RECEIVER FOR DIGITAL DATA DELIVERY SYSTEMS USING MIXED MODE SCDMA AND TDMA MULTIPLEXING

(75) Inventors: Yehuda Azenkot, San Jose, CA (US); Paul Alan Lind, Santa Cruz, CA (US); Michael Grimwood, Palo Alto, CA (US); Selim Shlomo Rakib, Cupertino, CA (US)

(73) Assignee: Terayon Communicaion Systems, Inc., Santa Clara, CA (US)

( * ) Notice: Subject to any disclaimer, the term of this patent is extended or adjusted under 35 U.S.C. 154(b) by 838 days.

(21) Appl. No.: 09/792,815

(22) Filed: Feb. 23, 2001

(65) Prior Publication Data

US 2002/0154620 A1    Oct. 24, 2002

(51) Int. Cl.
*H04B 7/212* (2006.01)
(52) U.S. Cl. .................. 370/347; 370/441; 370/442
(58) Field of Classification Search ......... 370/441, 370/442, 478, 479, 480, 503, 204, 290, 292, 370/458, 535, 347
See application file for complete search history.

(56) References Cited

U.S. PATENT DOCUMENTS

| | | | |
|---|---|---|---|
| 6,243,369 B1 * | 6/2001 | Grimwood et al. | 370/335 |
| 6,356,555 B1 * | 3/2002 | Rakib et al. | 370/441 |
| 6,459,703 B1 * | 10/2002 | Grimwood et al. | 370/442 |
| 6,791,995 B1 * | 9/2004 | Azenkot et al. | 370/436 |
| 2001/0055319 A1 * | 12/2001 | Quigley et al. | 370/480 |

\* cited by examiner

*Primary Examiner*—Chi Pham
*Assistant Examiner*—Anh-Vu Ly
(74) *Attorney, Agent, or Firm*—Thelen Reid & Priest, LLP

(57) ABSTRACT

A pipelined digital data receiver for a cable TV headend which is capable of receiving DOCSIS 1.0 or 1.1 or advanced PHY TDMA or SCDMA bursts having programmable symbol rates and programmable modulation types as well as a host of other burst parameters such at Trellis code modulation on or off, scrambling on or off, various values for Reed-Solomon T number and codeword length. The receiver has an RF section to filter and digitize incoming RF signals. It also has an input section to detect impulse noise and do match filtering and despread SCDMA bursts. A timing recovery section recovers the symbol clock and detects the start of bursts and collisions. A rotational amplifier and equalizer calculate and track gain, phase and frequency offsets and correct symbols and calculates equalization coefficients. A decoder section decodes TCM and non TCM bursts, and a Reed-Solomon decoder section reconstructs RS codewords and uses them to error correct the payload data.

49 Claims, 12 Drawing Sheets

DEMODULATOR

INPUT SIGNAL SPECTRUM FOR 5.12 Msps

INPUT SIGNAL SPECTRUM FOR 2.56 Msps

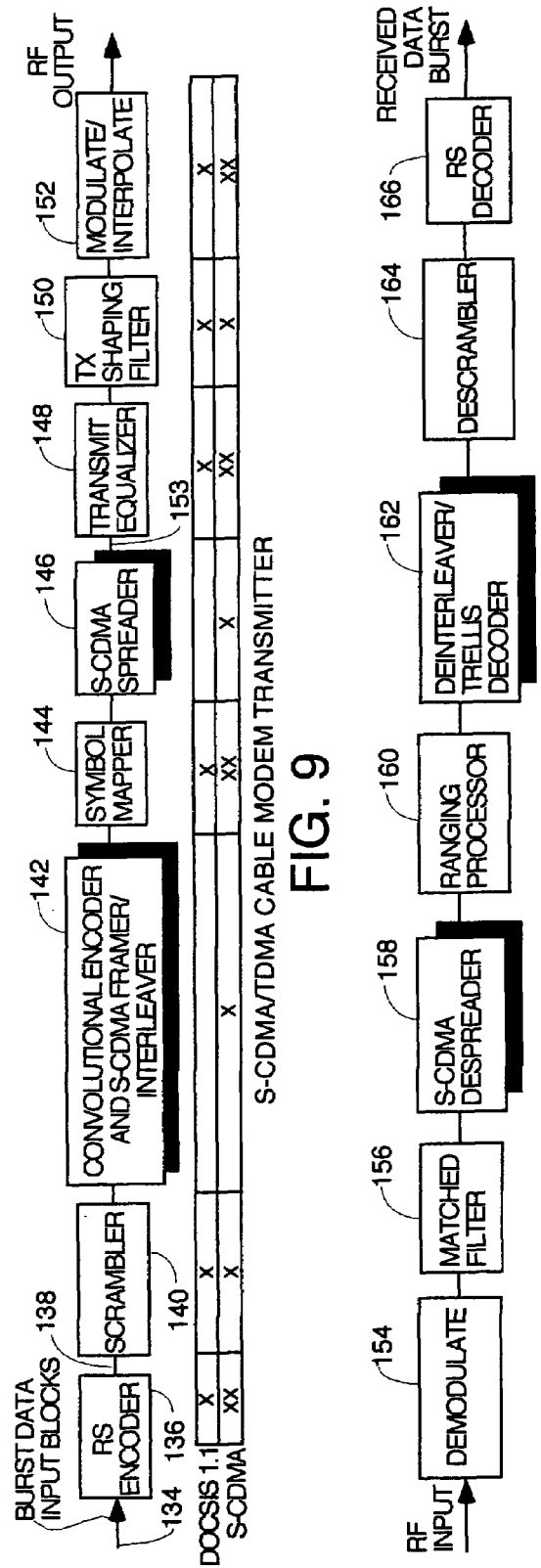

OVERALL SYSTEM

SCDMA REGION MINISLOT TO CODE MAPPING

TDMA BURST TX PROCESSING

SCDMA BURST TX PROCESSING

HEAD END RECEIVER FOR DIGITAL DATA DELIVERY SYSTEMS USING MIXED MODE SCDMA AND TDMA MULTIPLEXING

BACKGROUND OF THE INVENTION

Cable modem usage to send and receive digital data is on the rise with the buildout of high bandwidth cable TV systems with spare bandwidth in which to send high speed digital data such as internet traffic. An emerging standard for cable modems is currently under development which defines cable modem systems wherein mixed mode upstream transmissions can be received. The reason this is important is that legacy cable systems exist such as DOCSIS 1.0 and 1.1 that deliver time division multiplexed (hereafter TDMA) digital data bursts over cable television media. However, there are significant advantages to using code division multiplexing, and especially synchronous code divsion multiplexed (hereafter SCDMA) bursts. Specifically, the use of SCDMA provides significant "code gain" to suppress the negative effects caused by both narrowband interference and Gaussian noise suppression. In the upstream where many cable modems (CMs) in homes and businesses transmit digital data to a cable modem termination system (CMTS) at the cable plant headend, there are many sources of interference which can leak into the upstream signals. These sources include echoes from improperly terminated cable outlets, ignition noise, radio frequency interference generated by transmitters and household appliances, etc. In some prior art cable modem distributed digital data delivery systems, these noise problems have been so intractable, that they led to the ultimate failure of the system to fully live up to its promised potential.

The upstream transmissions from the cable modems are in a FDMA/TDMA or FDMA/SCDMA burst modulation format. That is, frequency division modulation is used to create a plurality of logical channels at different center frequencies. Inside each FDMA channel, time division multiplexing (TDMA) or synchronous code division multiplexing (SCDMA) is used to create logical subchannels. In the legacy DOCSIS systems, the timeslots used by the TDMA process are called minislots. The SCDMA bursts also use minislots, but the multiplexing is actually accomplished in a two dimensional space having codes as one axis, and spreading intervals within minislots as the other axis.

Permission to transmit is requested by a CM in the form of an upstream bandwidth request. Such requests are sent autonomously by CMs having data to send upstream, but such requests are only sent during request intervals defined in the upstream by MAC messages transmitted downstream. If there is a collision between upstream requests, the CM that transmitted the request does not receive any reply in the downstream MAP messages that define when bursts may be transmitted for various Service Identifiers (SIDs). The downstream MAP messages are broadcast and not directed to any particular CM. The CM only knows when it has an authorization to transmit a burst when a SID it owns is included in a MAP message. Assuming not collision on the request, the CMTS responds with UCD and MAP messages. These messages define the burst parameters and the interval during which the burst may be sent. Specifically, the MAP message defines the logical channel and subchannel(s) to use (when the burst may start and how long it may be and on which frequency channel) and the burst type in terms of an IUC identifier. There were originally 6 different burst types defined in DOCSIS 1.0, but the class of advanced PHY layer receivers according to the genus of the invention will be able to receive 15 different burst types. The UCD messages define the burst parameters such as the type of multiplexing (TDMA or SCDMA), the type of modulation to use, the symbol rate and error correction encoding to use, interleaving depth, whether Trellis encoding is on or off, other parameters, and any neccessary correction to power level at which to transmit the burst so as to keep the received power at the CMTS within a gain controlled range of the receiver for to not saturate the A/D converter and use its full dynamic range. All CMs on the same logical channel or subchannel use the assigned symbol rate in the UCD message in the prior art systems.

The modulation modes are controlled by the UCD message and include 16 QAM for TDMA channels, Gray coded QPSK and 8 QAM to 64 QAM for TDMA and SCDMA channels and Trellis encoded QPSK and 8 QAM through 128 QAM for SCDMA channels. The symbols transmitted in each mode and the mapping of input bit to the I and Q constellation must be as defined in a predetermined table(s) having specified mappings for each type of modulation. Thus, CMTS receivers that are fully compatible with this emerging physical layer standard (which has no assigned name or specification number yet) for broadband digital data delivery over cable TV plants must be able to receive either SCDMA or TDMA bursts at different symbol rates and using different forms of modulation and different error correction encoding. For example, to be fully compatible with the emerging system which has legacy DOCSIS TDMA only transmitters in some CMs, a receiver should be able to receive QPSK and 16 QAM modulation for TDMA bursts. To be fully compatible, such a receiver must be able to receive QPSK, 8 QAM, 16 QAM, 32 QAM, 64 QAM modulations for TDMA and SCDMA bursts if the system has some cable modems that transmit using these forms of modulation and multiplexing. Further, to be fully compatible with SCDMA bursts from the most modern cable modems, the receiver must be able to receive QPSK or M-ary QAM including 8 QAM, 16 QAM, 32 QAM, 64 QAM and 128 QAM Trellis Coded modulations (hereafter TCM). In addition to be fully compatible, such a receiver would have to receive bursts transmitted at 160, 320, 640, 1280, 2560 and 5120 kilosymbols per second (ksym/sec) and using different forms of Trellis encoded modulation or other predetermined encoding to add error correction bits.

In addition, to be fully compatible with such a system, the receiver in the CMTS must be able to perform symbol timing (clock recovery), carrier recovery and tracking, burst acquisition and demodulation in the radio frequency section. In addition, to be fully compatible, the receiver must be able to provide an estimate of burst timing relative to a reference edge to provide a timing offset to assist in the DOCSIS TDMA based ranging process. In addition, to be fully compatible, such a receiver must provide a frequency offset and an estimate of signal power and should be able to participate in adaptive equalization with the cable modems to mitigate the effect of echoes in the cable plant, narrowband interference and group delay.

The cable modem transmitters in such a system do some signal processing to interleave data to minimize burst errors, scramble it for privacy or to break up long runs of 0s or 1s, encode it with error correction bits (programmable Forward Error Correction encoding) and multiplex it with either TDMA or SCDMA multiplexing. TDMA bursts are timed by the cable modems so that the center of the last symbol of the previous burst is separated by a guardband of at least 5 symbol times plus the maximum timing error from the center of the first symbol of the preamble of the next burst.

To be fully compatible with such a system, the CMTS receiver must be able to do the inverse processing of all the signal processing and multiplexing that the transmitters did. The signal processing function in the CMTS receiver, to be fully compatible, also must be able to support the DOCSIS ranging process by providing an edge-timing reference in an upstream gap opened by the CMTS. This gap is used by the cable modem transmitters (hereafter the CMs) to perform DOCSIS ranging. The signal processing function in the CMTS receiver, to be fully compatible, also must provide a gating-enable signal to the demodulators to activate the burst acquisition process during the Minislots assigned to any particular burst.

Further, such a mixed mode CMTS receiver must be able to do either coherent detection to receive advanced physical layer TDMA and SCDMA bursts (hereafter sometimes referred to as advanced PHY bursts) or coherent detection/ differential decoding so as to be capable of receiving DOCSIS 1.0 or 1.1 bursts.

Thus, a need has arisen for a head end receiver for use in the CMTS which is capable of receiving both advanced PHY SCDMA, and TDMA bursts as well as DOCSIS 1.0 or DOCSIS 1.1 bursts with different modulation types and different symbol rates.

SUMMARY OF THE INVENTION

All CMTS receivers within the genus of the invention will have the following shared characteristics that define the genus. First, they will be able to receive any DOCSIS 1.0 or 1.1 TDMA burst at various programmable symbol rates and various programmable modulation types. Second, they will also be able to receive advanced PHY TDMA and SCDMA bursts. In some embodiments, these different burst types will be received properly when transmitted on different frequency channels. In other embodiments, these different burst types will be received properly when transmitted on the same frequency but multiplexed in time. In still other embodiments, the receiver will be able to receive two simultaneous bursts transmitted on adjacent frequency channels at a first symbol rate and an SCDMA burst transmitted at twice the symbol rate during a different non overlapping interval on a bandwith that encompasses the bandwidth of the two TDMA channels. The advanced PHY bursts also have programmable symbol rates and various programmable modulation types that are controlled by the headend media access control (hereafter MAC) process via downstream messages.

The different burst types referred to in the claims can be characterized by the following transmission characteristics or smaller subsets thereof. Basically, the transmission characteristics of each logical channel are separated into three portions: 1) channel parameters; 2) burst profile attributes, and 3) user unique parameters. The channel parameters include: a) the symbol rate which can be any one of 6 different rates from 160 ksym/sec to 5.12 Msym/sec in octave steps; b) the center frequency; and c) the 1536-bit preamble superstring; and d) the SCDMA channel parameters. These characteristics are shared by all users on a given channel. User unique parameters may vary from user to user even when on the same channel and same burst type and include such things as power level. Each CM must generate each burst at the appropriate time so that the beginning of the burst arrives at the CMTS at the assigned first minislot boundary specified in the MAP message.

The burst profile transmission characteristics, in the preferred embodiment, include: modulation (QPSK, 64 QAM, 128 QAM etc.), differential encoding on or off; TCM encoding on or off; preamble length, preamble value offset; preamble type (QPSK 0 or QPSK1), RS error correction T from 0 to 16 where 0 is no FEC bits to 16 for the maximum where the number of codeword parity bytes is 2×T, RS codeword length (fixed or shortened), scrambler seed, max burst length in minislots, guardtime from 5 to 255 symbols for TDMA channels and 1 for SCDMA channels, last codeword length, scrambler on or off, byte interleaver depth, byte interleaver block size, SCDMA on or off, codes per subframe, and SCDMA interleaver step size.

The user unique parameters are: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex). The ranging offset is measured by the CMTS and is the fine tuning delay correction applied by the CM to the CMTS Upstream Frame Time derived at the CM during the coarse ranging process. It is an advancement equal to roughly the round-trip delay of the CM from the CMTS, and is needed to synchronize upstream transmissions in the TDMA and SCDMA bursts. The CMTS provides feedback correction for this offset value to the CM based on reception of one or more successfully received training bursts.

In other classes of embodiments within the genus of the invention, numerous smaller sets or combinations of the above defined programmable channel and burst parameters and user unique parameters so long as the receiver can receive both TDMA bursts and SCDMA bursts and ranging and preamble processing is performed to achieve phase coherence. In an important class of embodiments, the receiver will be able to receive TDMA and SCDMA bursts either on different frequency channels or transmitted on the same frequency channel during different non overlapping intervals in a mixed mode.

When receiving SCDMA bursts, a CMTS receiver within the genus of the invention will be able to receive data transmitted simultaneously on the same frequency by multiple cable modems or other transmitters such as cellular phones, wireless modems or messaging services, any digital data carrying wireless or hardwired service with distributed transmitters transmitting to a single receiver, or satellite uplink or downlink transmitters with each burst spread by different spreading codes. This provides the advantage that more cable modems or cellular phones can be operating simultaneously which appears to the cable modems or cellular phones to be more virtual bandwidth, although the absolute bandwidth of the cable television or other shared transmission medium has not physically changed.

Each CMTS receiver within the genus of the invention will have an RF section that filters out unwanted RF signals and digitizes the desired signal, and a demodulator section that recovers the transmitted data. In some species within the genus of the invention, the demodulator will be able to receive mixed mode TDMA and SCDMA transmissions on the same subchannel either at the same or different symbol rates. For example, a subchannel can be divided into TDMA intervals wherein TDMA signals are transmitted at 2.56 megasymbols per second (Msps) and SCDMA regions wherein transmissions are sent at 5.12 megasymbols per second. Other species can receive two different TDMA signals on two different, but adjacent frequencies at 2.56 Msps (bandwidth of 3.2 Mhz each) and an SCDMA signal 5.12 Msps on a channel that has 6.4 Mhz bandwidth of the TDMA carriers and encompasses the bandwidth of both said TDMA carriers, the SCDMA signals being transmitted in an SCDMA interval which is different in time from the TDMA interval. To do that, the RF front end would have its bandpass filter tuned to the center frequency of the SCDMA carrier, and the A/D conversion samples both TDMA bursts simultaneously. Then, in the demodulator, two different digital bandpass filters, each tuned to the center frequency of one of the TDMA carriers and having a common sample input separates out the two TDMA bursts into two different sample streams. Then decimation would remove some unneeded samples, and the results stored in two different areas of the sample buffer. From there, process to detect the payload data in each TDMA burst is processed normally.

The following are the essential and optional elements of the RF section of every species within the genus of the invention, and at least the essential elements should be interpreted to be part of every claim. Optional elements identified below should be interpreted to be part of the claims only if necessary to make the claim valid. In the RF section, there must be filtration circuitry that can filter out or at least substantially suppress unwanted RF carriers and pass the desired carrier. Typically, this is done with a broad bandpass filter followed by mixing down or up to an intermediate frequency and a narrow passband bandpass filter centered on the desired carrier and having a bandwidth sufficient to pass most of the energy of the carrier. However, if filtering and digitization can be accomplished without a mixer and local oscillator, then the mixer and local oscillator are not essential and are just optional. Frequency agility is also only optional and not essential. In frequency agile alternative embodiments, the filters can be tuned in center frequency as can the output frequency of a frequency synthesizer that feeds a mixer so that a selected one of a plurality of different carriers at different center frequencies can be filtered out from all the other carriers. An analog-to-digital (A/D) converter is also essential as is a gain control stage of some kind to prevent powerful signals from clipping in the A/D converter and to enable reception of weak signals.

The following are the essential and optional elements of the demodulator section of every species within the genus of the invention, and at least the essential elements should be interpreted to be part of every claim. An impulse detector is optional to detect impulse noise and mark samples that are corrupted by impulse noise as erased. The impulse detector is preferred to improve performance but is not essential. Likewise, a narrowband excision circuit coupled between the RF section and the demodulator section is optional to improve performance but is not essential. A front end AGC circuit in the demodulator is optional to allow the receiver to be used in digital cable headends or wireless systems, but is not essential if the only application is cable system headends. A decimation and programmable passband filter circuit should be included which has a bandwidth that is adjustable to match the symbol rate of the transmitted burst to reject noise outside the bandwidth of the selected carrier and burst if this function has not already been performed in the RF section. Optionally, the programmable passband filter is a matched filter to obtain better signal-to-noise (SNR) ratio. The programmable passband filter essential for use in addition to the narrow passband filter in the RF section. The narrow passband filter in the RF section must have a bandwith to receive the highest symbol rate burst on a channel and reject all other channels. The programmable passband filter in the demodulator finishes the filtering job by having a passband that can be narrowed below 6.2 MHz to allow passband filtering of bursts with low symbol rates and bandwidths below 6.2 MHz. The decimation function is optional and serves to reduce the number of samples for bursts of lower symbol rate where a high number of samples are not needed.

A despreader is essential to receive advanced PHY SCDMA bursts but is bypassed during DOCSIS 1.0 and advanced PHY TDMA bursts and TDMA training bursts of SCDMA CMs. A circuit to accomodate code hopping in SCDMA bursts is not essential, but is optional to improve performance so that weak spreading codes can be spread around to all CMs. A sample buffer to store the samples of the despread data is not essential but is an option to simply the implementation so that all processing does not have to occur on the fly. A timing recovery circuit is essential to recover the symbol clock of DOCSIS 1.0 TDMA bursts and advanced PHY TDMA and the TDMA training bursts of SCDMA CMs. A start of burst detector is essential to receive DOCSIS 1.0 or advanced PHY TDMA and ranging bursts. A frame buffer is optional but preferred to simplify the implementation. An interburst ISI canceller is optional to improve performance. The function of preamble processor and AGC and carrier recovery circuits to develop gain, phase and frequency offset correction factors is essential, but this function can be done without the preamble processor to develop initial values that are fined tuned and can be done by a single rotational amplifier that converges on gain, phase and frequency offsets. The rotational amplifier does not have to be split into an AGC section and a carrier recovery section. An equalizer buffer is optional to simplify the implementation, but is not essential. An equalizer is essential to receive DOCSIS 1.1 bursts and advanced PHY TDMA or SCDMA bursts. An equalizer data buffer to store ranging burst identifications is optional, but this data could be processed on the fly. A burst buffer to store data burst data after correction by the rotational amplifier is optional to simplify the implementation, but is not essential. A differential decoder is essential to receive DOCSIS 1.0 differentially encoded bursts, but not otherwise and can be eliminated if differentially encoding is barred. An inner deinterleaver and uncoded bit interleaver are essential to receive advanced PHY SCDMA bursts that are Trellis Code Modulated and together function to undo the interleaving done by the CM prior to Trellis encoding payload bits into SCDMA constellation points. A Trellis Code Modulation Viterbi decoder is essential to detect the payload data bits encoded in Trellis Code Modulation (TCM) constellation points of advanced PHY SCDMA bursts. The TCM modulator at the CM only convolutionally encodes some of the payload bits that go into each constellation point. These are called the coded bits. Other uncoded bits are then combined with the coded bits to define the constellation point. The TCM Viterbi decoder decodes the TCM bits of the constellation point and then figures out from those bits what the uncoded bits were and outputs all the bits. An uncoded bit interleaver deinterleaves the uncoded bits, and is essential to complete the deinterleaving of TCM encoded SCDMA bursts. A Reed-Solomon (RS) degrouper is essential to receive advanced PHY SCDMA bursts, and a descrambler is also essential to undo the effects of the scramble in the CM which was used to break up long runs of 0s or 1s which could cause the rotational amplifier tracking loops to lose lock. An RS deinterleaver and associated memory is essential to receive advanced PHY TDMA bursts and an RS decoder is essential to receive all burst types. An interface to the media access control process to output the payload data is optional since the payload bits may be sent elsewhere in some embodiments.

BRIEF DESCRIPTION OF THE DRAWINGS

FIG. 9 is a block diagram of a cable modem transmitter capable of either TDMA or SCDMA bursts.

FIG. 10 is a block diagram of an alternative embodiment for a CMTS receiver capable of receiving the signals transmitted by the transmitter of FIG. 9.

DETAILED DESCRIPTION OF THE PREFERRED AND ALTERNATIVE EMBODIMENTS

Figure 1:
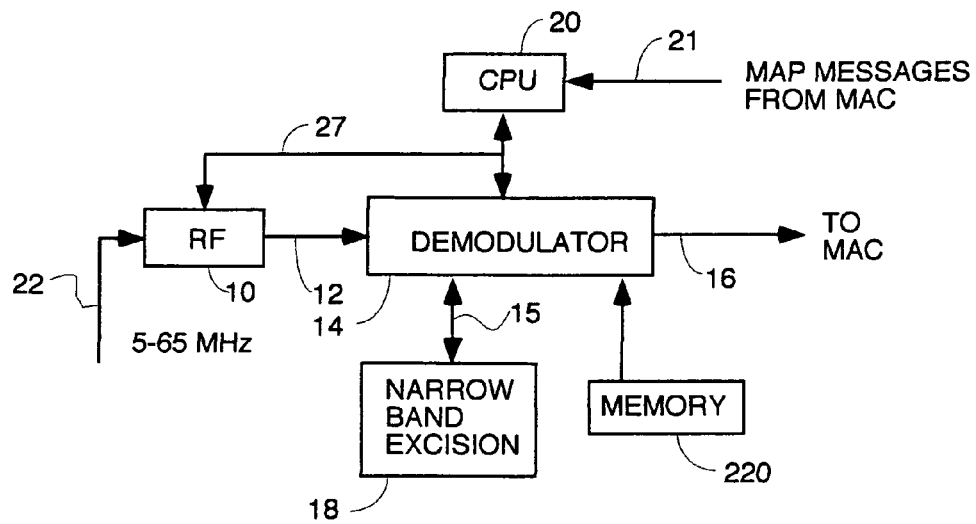
FIG. 1 is a block diagram of the overall architecture of the preferred CMTS receiver.

Referring to FIG. 1, there is shown a block diagram of the preferred form of receiver according to the teachings of the invention. The functions the various blocks must perform to be DOCSIS compatible are defined in published DOCSIS specifications which are available publicly to Cable Labs members at www.cablelabs.com. All such specifications and, specifically, SP-RFIv1.1-I05-000714 are hereby incorporated by reference.

In a typical CMTS, a receiver like the one shown in FIG. 1 would be assigned to receive data in one or more frequency channels. Typically, there would be a plurality of frequency division multiplexed (hereafter FDMA) channels transmitted upstream in a band from 5 to 65 MHz, each of which carries multiple logical channels of data from different sources. Each logical channel within an FDMA channel would be multiplexed from the other channels by SCDMA or TDMA. In the preferred embodiment, the upstream FDMA channels have selectable bandwidths of 6.4, 3.2, 1.6, 0.8, 0.4 and 0.2 MHz with the wider bands carrying data at higher symbol rates.

An RF section 10 downconverts the received signal to a low IF frequency or baseband. In the preferred embodiment, a low IF of 5.12 MHz is used.

The IF signal on line 12 is received and demodulated by a demodulator 14 which also serves to demultiplex the upstream transmissions and detect the transmitted bits and outputs a stream of bits on line 16 to media access control (hereafter MAC) circuitry and processes which do not form part of the invention. The MAC circuitry controls which remote unit transmitters which have requested bandwidth are awarded bandwidth by downstream MAP and UCD messages to the cable modems. Although the preferred embodiment is taught using the example of cable modem transmitters, the teachings of the invention apply equally to receivers and transmitters in cellular or personal communications or other wireless, wired or satellite based services.

These MAP messages assign specific upstream intervals of Minislots to specific burst types and service identifiers. A MAP message is comprised of one or more information elements called IEs. Each IE corresponds to one grant of bandwidth. Each IE contains a service identifier (SID), an interval usage code (IUC) and an offset. The SID identifies the data from which service may be transmitted during the burst corresponding to the IE, and the SID is used by each CM to determine whether the grant is for it or for some other CM. Each different source of data coupled to a CM has a different SID. The IUC identifies the burst type that may be transmitted during the grant. There are 15 different SCDMA and TDMA burst types at various symbol rates and modulation types that are predefined in the preferred embodiment, and each has a different IUC. The offset identifies the starting minislot number when the burst may start. The burst length is calculated by subtracting the offset in one IE from the offset in the next IE of the MAP.

Figure 4:
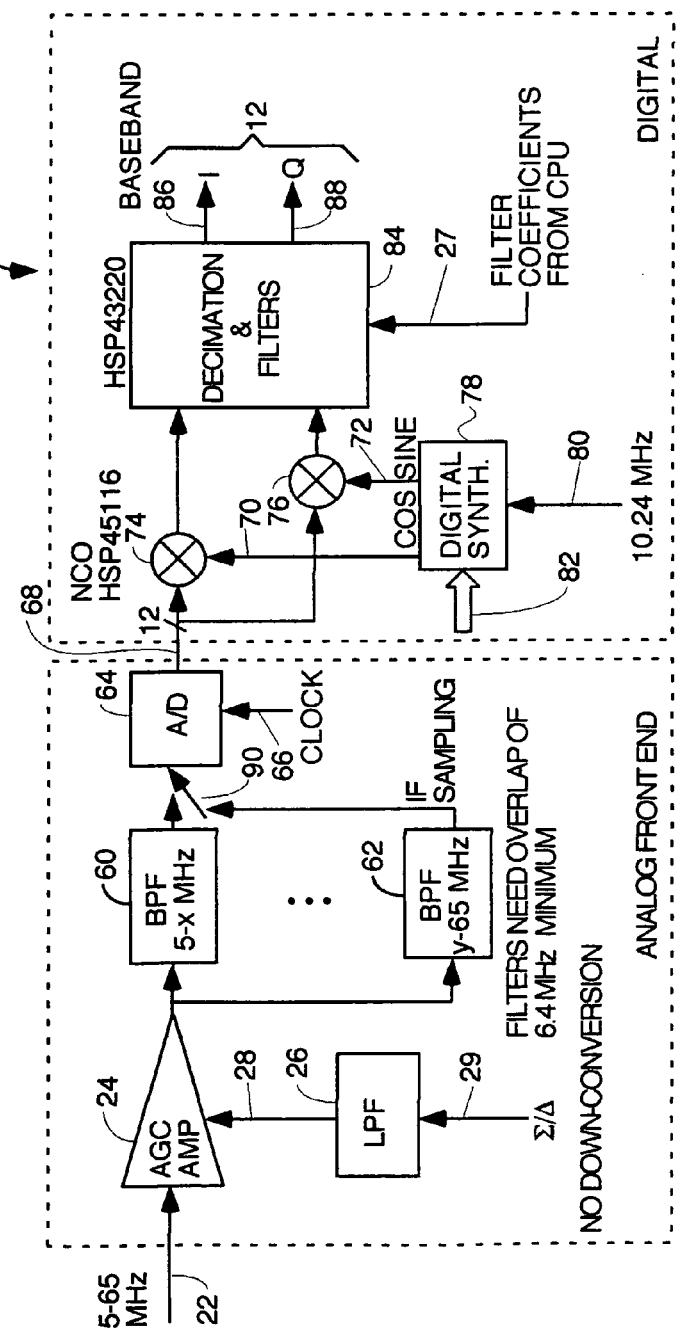
FIG. 4 is a block diagram of a mixed analog and digital embodiment for the RF front end 10.

The burst parameters and the MAP messages and channel characteristics are stored by the computer 20 in burst parameter memory 220 in FIG. 4 by the MAC process. The MAP messages and burst parameters and channel characteristics define what type of bursts are going to be received during each upstream minislot. The MAP data output by the MAC process for every burst indicates whether measurements made by the demodulator are needed for that burst in the preferred embodiment, but measurements for every burst are made in other embodiments. The timing and control circuit 222 takes the burst parameters out for each IUC and sends them with the burst data through the demodulator pipeline. The burst parameters are defined below in the Burst Profile section. In the claims, the phrase "controlled by said computer" means the circuits of the demodulator are controlled by the burst parameters stored for every burst by the computer 20 in the burst memory. In alternative embodiments, the phrase should be interpreted to mean the computer controls the demodulator circuits directly in real time as a burst propagates through the pipeline, although this is more complicated than sending the burst parameters through the demodulator pipeline along with the data of each burst.

A demodulator circuit 14 functions to receive the digital data output by the RF section 10 and process the digitized data to recover payload data transmitted in any of the following type bursts: DOCIS 1.0 or DOCSIS 1.1 or advanced PHY TDMA or SCDMA bursts. These bursts having programmable symbol rates and programmable modulation types.

A computer 20 is coupled to the RF circuit 10 and the demodulator circuit 14. The computer is programmed to control a downstream transmitter (not shown) send messages downstream to multiple transmitters telling them what type of burst to send in the upstream and when to send them. This computer is also programmed to control the radio frequency filtering and digitizing circuit 10 and the demodulator circuit 14 so as to know the type of burst that each received burst is so as to control these circuits to properly receive the burst.

Memory 220 stores burst parameters and other information needed by the demodulator circuit 14. In FIG. 1, this memory is shown outside the demodulator, but in FIG. 4, it is shown inside. It can be in either place or part of it can be inside and part outside.

A narrow band excision circuit 18 removes narrow band noise which is commonplace in the upstream environment. The narrow band exicision circuit is described in a co-pending U.S. patent application entitled, "METHOD AND APPARATUS OF USING A BANK OF FILTERS FOR EXCISION OF NARROW BAND INTERFERENCE SIGNAL FROM CDMA SIGNAL", filed Sep. 14, 1998, Ser. No. 09/152,645, which is hereby incorporated by reference.

A programmed microprocessor 20 performs various tasks such as ranging support, Medium Access Control functions such as receipt of upstream bandwidth requests and allocation of bursts (in other embodiments, bandwidth are permanently allocated among the remote unit transmitters and in still other embodiments, the MAC process could be by any of the prior art processes taught in Safadi, U.S. Pat. No. 5,572,517 or the hybrid combination thereof taught in Safadi, which is hereby incorporated by reference). The computer 20 is also programmed to support ranging and monitor synchronization, control which spreading codes are used to despread the spectrum of upstream SCDMA bursts, etc.

Figure 2:
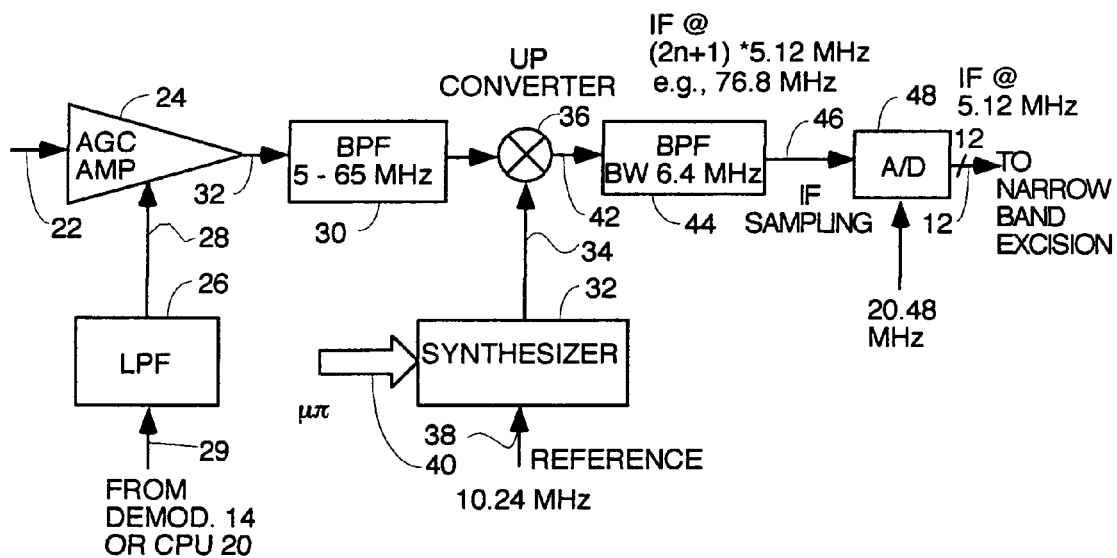
FIG. 2 is a block diagram of an analog species for the RF section 10 in FIG. 1.

FIG. 2 is a block diagram of one analog implementation or species of the RF section 10 in FIG. 1. The received signal on line 22 is amplified by a gain controlled amplifier 24. Despite the fact that the amplifier 24 is labeled an AGC amplifier, in typical operation, it does not do an automatic gain control process. Its gain is set by an analog signal on section 28 which is derived from a digital signal on line 29 from the demodulator 14 or, in some embodiments, from the computer 20. The reason an automatic gain control cannot be used is that the received traffic is very burst oriented with periods of silence between bursts. An automatic gain control would drive the gain very high during periods of silence and would cause the amplifier to be over driven when the next burst comes in and possibly saturate and distort the received signal. Thus, the gain of amplifier 24 is controlled by a digital duty cycle type signal on line 29. In embodiments where only one application, such as two-way digital data delivery over CATV, will be in effect, the gain can be fixed at a proper level for that application. Flexible gain allows the application in wireless services. The gain dynamic range should preferably be at least 42 dB for best performance since input powers can vary depending upon symbol rate.

A low pass filter 26 filters out high frequency noise on the gain control input 28 of the AGC amplifier 24 by smoothing out the signal on line 29 to generate an analog signal on section 28 which has a level which varies with the duty cycle. Line 29 is one of the signal lines on bus 27 if it comes from the computer 20 or is a separate line from the demodulator (not shown in FIG. 1).

A wideband bandpass filter 30 filters the amplified analog signal at output 32 of the amplifier 24 so as to remove all frequency components above 65 MHz and below 5 MHz. The receiver will be tuned to one small FDMA channel somewhere in this range of 5–65 MHz, so filter 30 just filters out noise not within the range of interest.

Since the range from 5–65 MHz will contain many FDMA channels but only one is of interest to this receiver, another bandpass filter 44 is used to filter out all the other FDMA channels other than the one this receiver is assigned to receive. The cable modem transmitter are frequency agile and will transmit on whatever frequency is assigned to them by their MAC layers in response to MAP messages. To filter out the neighboring channels requires a sharp rolloff of the passband, so bandpass filter 44 is preferably a surface acoustic wave filter (hereafter SAW). These type filters have sharp rolloffs, flat amplitude passbands and linear phase change with frequency so as to minimize the distortion of the signal as it passes through the filter.

Part of the job of the SAW filter is to reject harmonics and intermodulation products. These can be created if the frequency conversion process is nonlinear and can exist in the input signal. Accordingly, the frequency conversion processes in all embodiments of the RF section 10 should be linear so as to minimize the effects in the selected channel harmonics of any other channel or mixing of the signals from any two other channels to create intermodulation products.

Preferably, for best performance in the SAW filter there should be less than 0.5 dB peak-to-peak variation from linear amplitude in the passband at a bandwidth of 6.4 MHz and less than 0.5 dB peak-to-peak tilt deviation from flat line at the same bandwidth for the SAW filter 44 and the other narrowband passband filters. The upstream channel defined by the DOCSIS specification has 0.5 dB/MHz passband ripple.

The SAW filter should have −51 dB min at a bandwidth greater than 10.24 MHz and a phase linearity of five degrees or less in the preferred embodiment. This can be achieved by making the 1 dB bandwidth greater than 6.4 MHz. The group delay ripple for the SAW filter should be 100 nanoseconds maximum in the preferred embodiment. The DOCSIS downstream channel has 75 ns within 6 MHz, but the upstream channel defined by the DOCSIS specification has a group delay of 200 ns/MHz.

The SAW filter 44 is not frequency agile since it is a mechanical device with fixed physical parameters. Therefore, it is necessary to up convert the output signal from bandpass filter 30 to the center frequency of the SAW filter 44. This is done using a frequency agile programmable synthesizer 32. The frequency synthesizer 32 generates a beat frequency signal on line 34 and applies it to one input of an up converter mixer 36. The other input of the mixer 36 receives the filtered output signal from the bandpass filter 30. The synthesizer receives a 10.24 MHz reference signal at input 38, and a frequency control signal on line 40. The frequency of the signal on line 34 is such that the mixer outputs sum product of the two input frequencies at a frequency which is:

$$(2n+1)*5.12 \text{ MHz} \tag{1}$$

where n=any integer.

The frequency control signal establishes the frequency on line 34 based upon the center frequency of the FDMA channel the receiver is assigned to receive on line 22 so as to establish an up converted output signal from the mixer which has the frequency established by equation (1) and typically has a center frequency of approximately 76.8 MHz in the example chosen here for illustration. The analog synthesizer 32 should have low phase noise for best performance.

The synthesizer receives a frequency control signal on line 40 which is set by the computer 20 as one of the signals on bus 27. The frequency is set so that the center frequency of the FDMA channel the receiver is currently assigned to receive is up converted to the center frequency of the passband of the SAW filter.

In alternative embodiments, the synthesizer 32 can be a fixed frequency oscillator so that the receiver is not frequency agile and is tuned permanently to receive only one carrier frequency.

The SAW filter 44 has its parameters selected to have a passband bandwidth of 6.4 MHz and sharp enough rolloff skirts to filter out the adjacent FDMA channels. This 6.4 MHz bandwidth is wide enough to receive the highest symbol rate FDMA channel transmitted by advanced TDMA and advanced SCDMA cable modems at a symbol rate of 5.12 megasymbols per second. However, 6.4 MHz is wider than necessary to receive lower bandwidth FDMA channels. For example, DOCSIS 1.0 or 1.1 cable modem transmitters transmit at a symbol rate of 2.56 megasymbols per second which translates to a bandwidth of 3.2 MHz. Because the SAW filter bandwidth is too wide for a 3.2 MHz channel, another digital passband filter with programmable filter coefficients (decimation and matched filter 114 in FIG. 6) is used in the demodulator 14 to finish the filtering job for channels more narrow than 6.4 MHz. The computer 20 sets the filter coefficients of this filter via bus 27 to establish the center frequency at the frequency of the assigned FDMA channel and to establish a bandwidth commensurate with the symbol rate of the channel, as established by the MAP message received on line 21 from the MAC processes.

The output signal from the SAW bandpass filter 44 on line 46 is sampled by an analog-to-digital converter 48 and is clocked by a 20.48 MHz clock. The sample rate is 20.48 MHz so the high frequency output signal on line 46 at 76.8 MHz is down converted by IF sampling to a 5.12 MHz signal represented by the 12-bit sample stream on line 12. The A/D clock jitter should be less than 10 psec RMS in order to get a desirable low level of phase noise of 0.29 degrees or −46 dBc. In the preferred embodiment, the A/D resolution is 12 bits.

The filters 26, 30 and 44 may be any known kind of filter compatible with the functional requirements specified above. If the amplifier 24 is implemented in operational amplifiers, the basic precautions of op amp design apply as given in Horowitz, *The Art of Electronics*, Chapter 4, Section 4.08, pp. 182 and in sections 4.11 and Section 7.06 (Cambridge Press 1989) ISBN 0-521-37095-7, the entire treatise being hereby incorporated by reference.

The bandpass filters 30 and 44 at least should have a design which results in minimal distortion of the received signals amplitude or phase characteristics. Any filter design which meets the required error rate and has adequately low phase noise will suffice, and Bessel filters implemented in either an active or passive design, are a good choice usually because they have a phase shift that varies linearly with frequency so as to cause minimal distortion of the waveform passing through the passband. Likewise, cascaded Butterworth and Bessel filters could be used.

Figure 3:
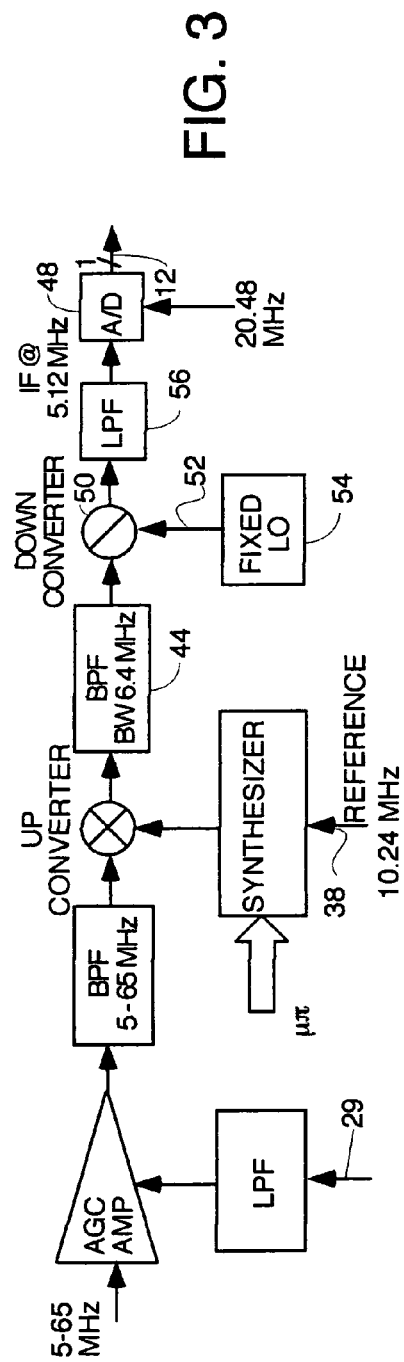
FIG. 3 is a block diagram of another analog embodiment for the RF front end 10.

FIG. 3 is a block diagram of another embodiment for the RF front end 10. The difference between this RF section and the RF section of FIG. 2 is that the SAW bandpass filter is followed by a down converter circuit that precedes the A/D conversion. The down converter is comprised of mixer 50 fed by a beat frequency on line 52 supplied from a fixed frequency local oscillator 54. All components and design choices in the embodiments of FIGS. 2 and 3 should be made with an intent to achieve as low a phase noise as possible. A low pass filter 56 filters out all frequencies outside the IF signal at 5.12 MHz. All the other components have the same characteristics and serve the same functions as their counterparts in FIG. 2.

Referring to FIG. 4, there is shown a block diagram for a digital embodiment of the RF front end section 10. The amplifier 24 and low pass filter 26 are analog components that have the same characteristics and function in the overall circuit as their counterparts in FIG. 2. The gain of the amplifier is set by the duty cycle of the signal on line 29 which the filter converts to an analog gain signal on line 28. A bank of band pass filters, of which filters 60 and 62 are typical, receive the amplified input signal and filter out one channel that the receiver is assigned to receive. A multiplexer, not shown, selects the particular filter to use. The filters should have a minimum overlap of 6.4 MHz in the preferred embodiment.

A fast analog-to-digital converter 64 samples at the clock rate of a clock signal on line 66 to do IF sampling. A resulting stream of 12-bit samples are output on line 68 where they are digitally mixed with a digital representation of a quadrature beat signal on lines 70 and 72 in digital mixers 74 and 76. The quadrature beat signals are 90 degrees out of phase with each other and are generated by a digital frequency synthesizer 78. This digital frequency synthesizer is clocked by a clock signal on line 80 and its frequency is controlled by a signal on line 82. The purpose of the mixers 74 and 76 is to down convert the frequency of the signal on line 68 to a lower intermediate frequency because the frequency on line 68 is higher than the desired IF frequency. The A/D converter 64 samples at a fixed rate, but the center frequency of the incoming signal varies with the selected channel and can be anywhere in the 5–65 MHz band. However, the IF frequency is fixed at 5.12 MHz, so the frequency agile digital frequency synthesizer 78 is used to beat the frequency down to 5.12 MHz.

The 10.24 MHz master clock signal on line 80 (and the clock signal used by all digital components in the receiver) should have an accuracy of +/−2.5 ppm and a drift rate of less than $10^{-8}$ per second and an edge jitter of 10 ns peak-to-peak (+/−5 ns) over a temperature range of 0 to 40 degrees C. up to 10 years from the date of manufacture for best performance and DOCSIS compatibility.

A decimation and digital filter 84 receives the IF signal sample stream and does decimation to reduce the number of samples. A high number of samples is taken by the A/D converter so that high frequency channels will be adequately sampled. This is more samples than are necessary for adequate representation, so the decimation process reduces the number of samples to speed up the computational processes in the ASIC demodulator 14 in FIG. 1. The signal is also digitally filtered in a digital passband filter which has its filter coefficients set by computer 20 for the symbol rate of the selected channel. Thus, even though all channels are converted to the IF frequency by the time they reach filter 84, the bandwidth of the channel is still a variable. This embodiment for the RF section eliminates the need for digital filter 114 in FIG. 6 to finish the filtering job as is necessary in the embodiments of FIGS. 2 and 3.

The RF front end embodiment of FIG. 4 uses IF sampling implemented by A/D converter 64 thereby avoiding the need for frequency conversion. In alternative embodiments, the bandpass filters 60, 62, etc. can be located before the input to the gain controlled amplifier 24. The digital output signal on lines 86 and 88 is a complex signal having I and Q components, at baseband. The A/D converter 64 needs to deal with a wide range of input signal power that depends upon the number of active channels.

Figure 5:
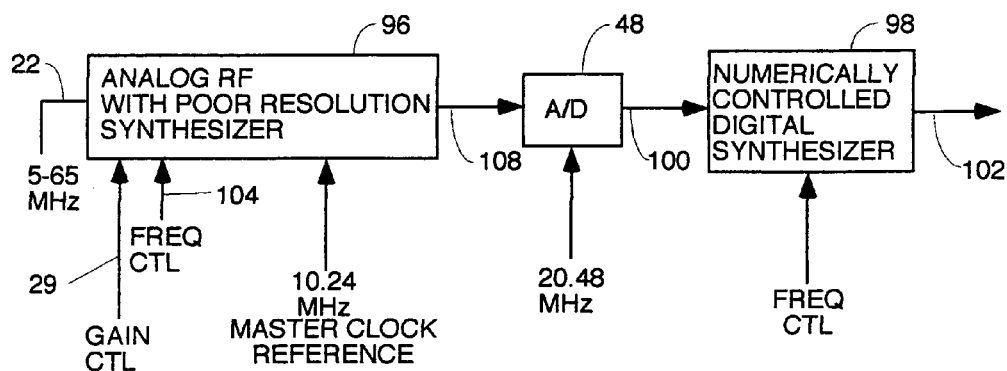
FIG. 5 is a block diagram of another mixed analog and digital embodiment for the RF front end 10.

Referring to FIG. 5, there is shown another alternative embodiment for an RF front end in FIG. 1. In this embodiment, an analog front end 96 with a low resolution frequency synthesizer functions to down convert the desired frequency band in the input signal on line 22 to an IF frequency approximately in the range of 5.12 MHz. An A/D converter 48 then digitizes the IF signal using a 20.48 MHz sample rate. A down converter 98 with a high resolution digital numerically controlled oscillator frequency synthesizer downconverts the digitized frequency on line 100 to a digital IF signal exactly at 5.12 MHz (or whatever other IF frequency is desired) on line 102.

The advantage of the embodiment of FIG. 5 is that the analog front end 96 is easier to design and still obtain low phase noise because the frequency resolution is lower meaning the step size between frequencies the internal oscillator generates does not have to be as small as the synthesizer 32 in FIG. 2. Block 96 is comprised of the following components similar to those shown in FIG. 2: a gain controlled amplifier 24, a wide passband bandpass filter 30, a low pass filter 26, a mixer 36 and an analog frequency synthesizer similar to 32 but lower in resolution, and a more narrow bandpass filter 44. Control of the frequency generated by the low resolution synthesizer is via a signal on line 104, and the gain of the amplifier is controlled by a duty cycle signal on line 29. The synthesizer in downconverter 96 has a low phase noise and can be analog with a resolution in the range of 1.28 MHz to 2.56 MHz, preferably 1.28 MHz.

The down converter 98 is comprised of a digital synthesizer like numerically controlled oscillator 78 in FIG. 4 and two mixers like 74 and 76. A digital decimating filter (not shown) similar to filter 84 can filter the output on line 102, or, in some embodiments, can be included within the analog RF downconverter 96. The digital synthesizer in downconverter 98 also has low phase noise and a step size of less than 16 KHz in the preferred embodiment. The phase noise is preferably less than or equal to −46 dBc over 1 Khz to 400 KHz above and below the carrier and the same value over 8 KHz to 3.2 MHz above and below the carrier. The frequency tuning step should be 32 KHz or less in most embodiments.

All of the RF sections just described are frequency agile and can tune to the particular FDMA channel specified in the UCD message from the MAC layer.

Figure 6:
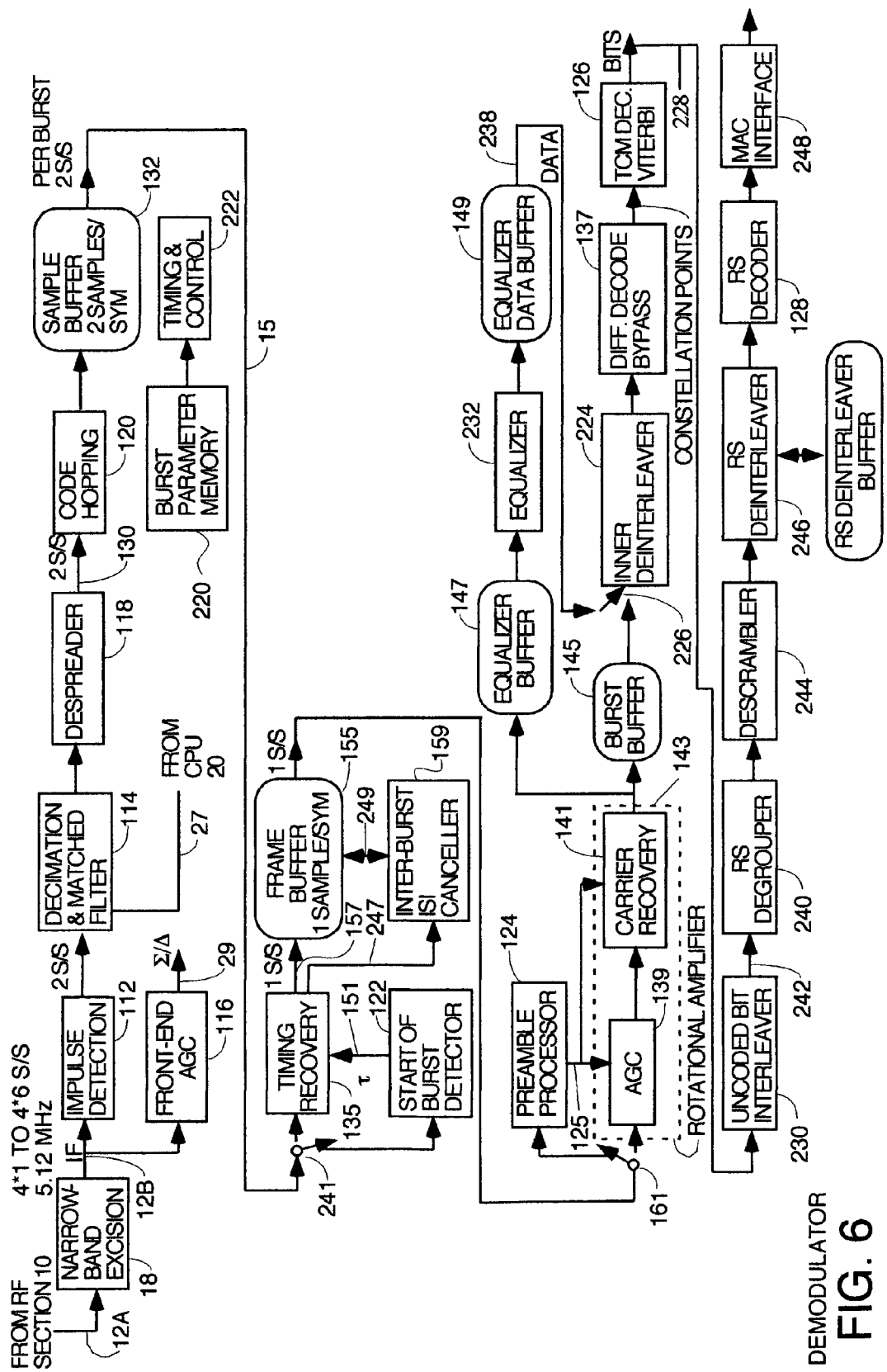
FIG. 6 is a block diagram of the preferred form for the demodulator section 14.

Referring to FIG. 6, there is shown a block diagram of the demodulator 14. This circuit does the detection of the transmitted constellation points and all the other processing necessary to receive whatever modulation, multiplexing, symbol rate, forward error correction encoding and deal with whatever other variable that are employed by the transmitted burst per the UCD message.

In the preferred embodiment, the output from the RF section is passed through the narrowband excision circuit 18 before entering the demodulator.

Each burst type is received differently, and the demodulator adapts its circuitry each time a new burst is received in accordance with the burst parameters identified by the IUC of burst to be received. The computer 20 tells the demodulator which type of burst is going to be received and when it will be received by sending the burst parameters over bus 27. The burst parameters are stored in burst parameter memory 220. Timing and control circuit 222 uses those burst parameters to send suitable control signals out to each circuit that needs to be configured to receive a particular burst type before the data of that burst arrives.

Timing and Control Circuit 222

A timing and control circuit 222 keeps the upstream minislot counter. Using that counter and the MAP messages stored in burst parameter memory 220, the control circuit 222 retrieves the appropriate burst parameters from memory 220 and distributes them to the various sections of the pipelined demodulator in some embodiments. In the preferred embodiment, as the minislot where each burst starts comes up, the burst parameters for that burst are extracted from the burst parameter memory and input to the input section of the pipelined demodulator along with the burst data itself. The burst parameters then travel to each section of the pipelined demodulator with the burst data. Each circuit in the demodulator then uses the burst parameters for each burst to configure itself and carry out the appropriate processing that needs to be carried out for that particular burst type and burst parameters. Either of these processes is referred to in the claims as control or configuration of the circuits of the demodulator by the computer since it is the computer which sends the UCD and MAP messages downstream and which loads the burst parameters into the burst parameter memory.

As an example of how this configuration and control process works, the despreader bypasses itself for TDMA bursts, and the Reed-Salomon decoder 128 uses the Reed-Solomon T number burst parameter to properly decode the Reed-Solomon encoding. Likewise, the Viterbi decoder 126 uses the modulation type defined by the burst parameter to determine which constellation was used and properly decode the incoming constellation points back to the coded and uncoded bits that define each point. Other control functions will be identified as each different circuit in the demodulator is discussed.

The control circuit 222 includes the following counters:

Minislot counters: 32 bits for SCDMA and another counter for TDMA (1.0 & advanced PHY) which rolls over with TS counter. The TDMA MS is derived from the TS counter.

Note that TDMA bursts in SCDMA mode are considered as SCDMA timing.

Frame counter: 8 bits (SCDMA only)

Timestamp counter: 32 bits

For TDMA bursts, the minislot (MS) counter is derived from the timestamp counter, so the MS counter does not have to be an actual counter. When the TS counter rolls over, the MS counter also rolls over to 0. Also, the SCDMA frame counter can be derived from the TS counter so the CPU can read only the TS counter and would then be able to derive the MS and frame counters and plan the allocation of SCDMA regions and TDMA regions, and the allocation of minislots to modems in the MAP messages.

Each block or stage in the demodulator pipeline should have allocation of processing time. The worst case is when the input symbol rate is the maximum of 5.12 Msps since that is the fastest symbol rate and gives the least time.

Each data burst goes from one block to another using a FIFO in some embodiments or a Stop/Go hand shake in other embodiments. Handshaking is preferred when the burst size varies from one burst to another.

The receiver is divided into five pipelined areas so five different bursts can be processed at the same time. Therefore, each burst parameters should be forwarded to the next section when the data of the burst is forwarded. The five stages of the pipeline are:
(1) Input processing (full frame in SCDMA) to mark corrupted samples, decimate and matched filter and despread SCDMA bursts;
(2) timing recovery to recover the symbol clock and resample at the correct timing and do start of burst detection, ranging offset measurements and collision detection;
(3) rotational amplifier circuitry (including preamble processor, and R/A) to calculate and track correction offsets and correct preamble and symbols and calculate equalization coefficients from corrected preamble symbols for each training burst;
(4) deinterleaving and TCM decoding of TCM bursts and differential decoding of differentially encoded bursts or slicer decoding of non TCM bursts;
(5) Reed-Solomon decoding for reassembling the RS codewords and error correcting the payload data in the RS codewords for output.

Only the first area deals with full frame (in SCDMA) where all the rests deal with bursts.

Mixed DOCSIS 1.0/1.1 and Advanced PHY TDMA or SCDMA Modes

The receiver MUST deal with 2 channel modes, DOCSIS 1.0/1.1 and Advanced PHY TDMA and SCDMA bursts multiplexed over time. The MAC process in computer 20 or elsewhere (hereafter just the MAC) divides the time domain into SCDMA frames and some of the SCDMA frames will be used for TDMA bursts. Generally, the TDMA bursts will be used for DOCSIS 1.0/1.1 modems, but Advanced PHY TDMA bursts and TDMA ranging bursts from SCDMA CMs can be received also. The TDMA bursts should have the same latency as the SCDMA bursts; namely, the sample buffer should delay the TDMA bursts with the same delay as the SCDMA bursts in order to let the previous SCDMA bursts be processed.

If the head-end (the head-end is the CMTS receivers and other associated circuitry and downstream transmitters) detects that there are two kinds of modems TDMA and SCDMA, it will divide the time between TDM modems and SCDMA modems using the mixed mode scheme. The same chip can deal with either TDMA or SCDMA or, in alternative embodiments, two separate chips are used simultaneously where one receives SCDMA bursts and the other receives TDMA bursts.

In some species within the genus of the invention, the demodulator will be able to receive mixed mode TDMA and SCDMA transmissions on the same subchannel either at the same or different symbol rates. For example, a subchannel can be divided into TDMA intervals wherein TDMA signals are transmitted at 2.56 megasymbols per second (Msps) and non overlapping SCDMA regions wherein transmissions are sent at 5.12 megasymbols per second. Other species can receive two different TDMA signals transmitted simultaneously on two different, but adjacent frequencies at 2.56 Msps (bandwidth of 3.2 Mhz each) and an SCDMA signal transmitted during an interval that does not over lap the interval during which the TDMA bursts are transmitted and transmitted at 5.12 Msps. The SCDMA burst is transmitted on a frequency channel that has 6.4 Mhz which is twice the bandwidth of each of the TDMA carriers and is transmitted on a center frequency approximately at the junction frequency between the two adjacent TDMA carriers such that the SCDMA carrier's bandwidth encompasses the bandwidth of both said TDMA carriers. To accomplish the latter function of receiving two simultaneous TDMA bursts and a non overlapping SCDMA burst, the RF front end would have its bandpass filtering circuitry and synthesizer controlled up or down convert the frequency of the received SCDMA channel to the center frequency of the SAW filter 44 so as to reject frequencies outside the bandwidth of the two adjacent TDMA carriers and the SCDMA carrier. The A/D converter 48 then samples both TDMA bursts simultaneously and samples the SCDMA burst later when it arrives. Then, in the demodulator 14, two different digital bandpass filters (represented for this embodiment by the single decimation and matched filtering block 114), each tuned to the center frequency of one of the TDMA carriers and having a common sample input. These two filters have their center frequencies and bandwidth set by computer 20 to filter out the two TDMA bursts so as to output two different sample streams. The SCDMA despreader and code hopper are controlled by computer 20 to be bypassed when receiving the TDMA bursts but to operate when receiving the SCDMA burst. The decimation and matched filter block 114 would remove some unneeded samples, and the result samples for the TDMA bursts are stored in two different areas of the sample buffer 132, and the SCDMA burst samples are stored in a third area of sample buffer 132. From there, processing to detect the payload data in each TDMA burst is as described elsewhere herein to process each burst.

In mixed mode reception, there is an SCMDA guard time after the SCDMA region and before the TDMA region. The SCDMA guard time should at least equal to the guard time between two TDMA bursts. Note that the guard time belongs to the end of the burst, therefore, the guard time after the TDMA burst and before the SCDMA region is already in place. In alternative embodiments, synchronous TDMA is implemented and there is no guardtime between TDMA bursts or between the TDMA region and the SCDMA region of mixed mode channels.

In order to get minimum latency all the blocks after the sample buffer should finish the processing in one frame. For simplified implementation the timing recovery blocks need to finish the processing up to one frame. Note that the size of a frame is variable.

Clock Generator
The highest clock that the demodulator 14 uses is 102.4 MHz (5.12 MHz*20).

Data Flow in SCDMA Mode
The data of each SCDMA frame is written into the sample buffer 132 at constant rate of 2 samples per symbol.
The SCDMA burst data is read burst by burst from the sample buffer 132.
In order to minimize the latency, the start of burst (SOB) detector 122 starts processing the sample buffer preamble symbols after one column (spreading interval—explained below) is written into it. The SOB is not required to wait until the full frame is written.
The Start of Burst (SOB) detector and the timing recovery 135 have to finish the processing of each burst in one burst time. Problems can be caused when small bursts are received back to back.
The timing recovery 135 writes into the frame buffer 155 over codes (in columns).
The frame buffer can store a couple of bursts, where the maximum number of symbols is two frames.

The preamble processor 124 and the AGC 139 and carrier recovery 141 have to finish processing each burst in one burst time.

The preamble processor reads the preamble symbols from the frame buffer by columns. The preamble processor starts reading the preamble symbols immediately after the first column is written into the frame buffer by the timing recovery to minimize latency.

The AGC and carrier recovery circuits read from the frame buffer over columns. Each burst is written into the burst buffer 145 or the equalizer buffer 147 for data bursts and training bursts, respectively. Also the rotational amplifier (R/A) coefficient register (not shown) that stores phase, amplitude and frequency correction factors is output for each burst.

The equalizer 232 processes the data of the preamble of each training burst by columns to develop equalization coefficients for the transmitter that transmitted the burst. It should start processing the data after one column (or even one symbol) of data is available in the equalizer buffer 147.

After the coarse equalization is done, the equalizer is used as a filter to filter the data (explained below). The output symbols are written into the equalizer output data buffer 149. The equalizer output data buffer is an internal buffer or external and has the same role as the burst buffer.

The equalizer continues with fine equalization process iterations on the preamble data until a new training burst arrives or the processing is finished.

The burst buffer 145 can store a couple of bursts up to maximum of 3 frames.

The bursts are output from the burst buffer 145 and the equalizer output data buffer 149 according to the order they were received (FIFO mode). Note that while the equalizer processes the training burst, the burst buffer can continue to output other previous data bursts to the inner deinterleaver 224 and the TCM Viterbi decoder 126.

While the TCM decoder 126 processes the training burst, other bursts can be stored in the burst buffer 145. The TCM decoder will catch up when another training burst is received.

The preamble symbols are not stored in the burst buffer or in the equalizer output data buffer.

The TCM deinterleaver 224 deinterleaves the data symbols only.

Data Flow in TDMA Mode

When TDMA is active in TDMA and SCDMA mode, the flow of the data is similar to SCDMA mode.

The start of burst detector and the timing recovery reads the symbols in the order they were received from the sample buffer.

The start of burst detector reads the received symbols immediately after they are written into the sample buffer.

The start of burst detector cuts out the unused samples received in the gap between bursts.

The MAP message defines which intervals will be advanced PHY SCDMA only bursts and which will be advanced PHY TDMA only bursts, and it also controls which minislots will be used for DOCSIS 1.0/1.1 bursts. Thus, a single logical channel on a single FDMA channel can carry both TDMA and SCDMA bursts, but at different times. In SCDMA regions within the MAP, data from multiple different services each of which has its spectrum spread by one or more different spreading codes may be transmitted simultaneously. There are a set of rules to map minislots to codes. Both the CMTS receiver of FIG. 1 and the CM transmitters use the same rules, and each has an upstream minislot counter. Therefore, based upon the local upstream minislot count, the CM transmitter uses whatever spreading codes mapped to those minislots during bursts transmitted therein. The CMTS receiver then uses the same codes to despread the data based upon the upstream minislot count in the CMTS local upstream minislot counter in timing and control circuit 222.

Figure 12A:
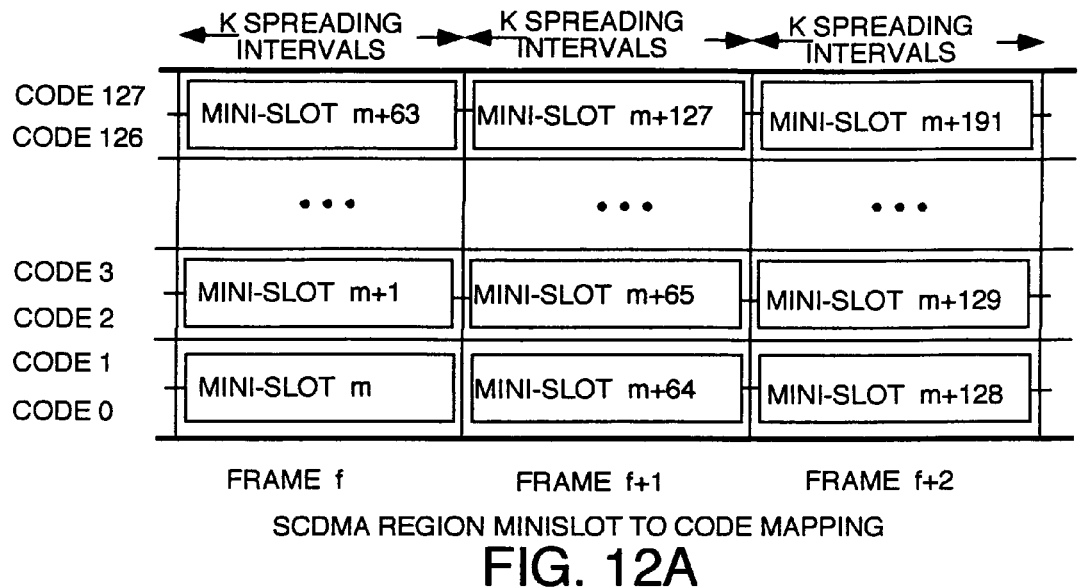
FIG. 12A illustrates the mapping of Minislots to codes and time.

A diagram of the mapping of minislots to codes is shown in FIGS. 12A. In FIG. 12A, the data from one particular SID would be transmitted by one CM during minislot m using spreading codes 0 and 1, and data from a different SID would be transmitted simultaneously during the the same time interval but using codes 2 and 3 which are mapped to minislot m+1.

Figure 12B:
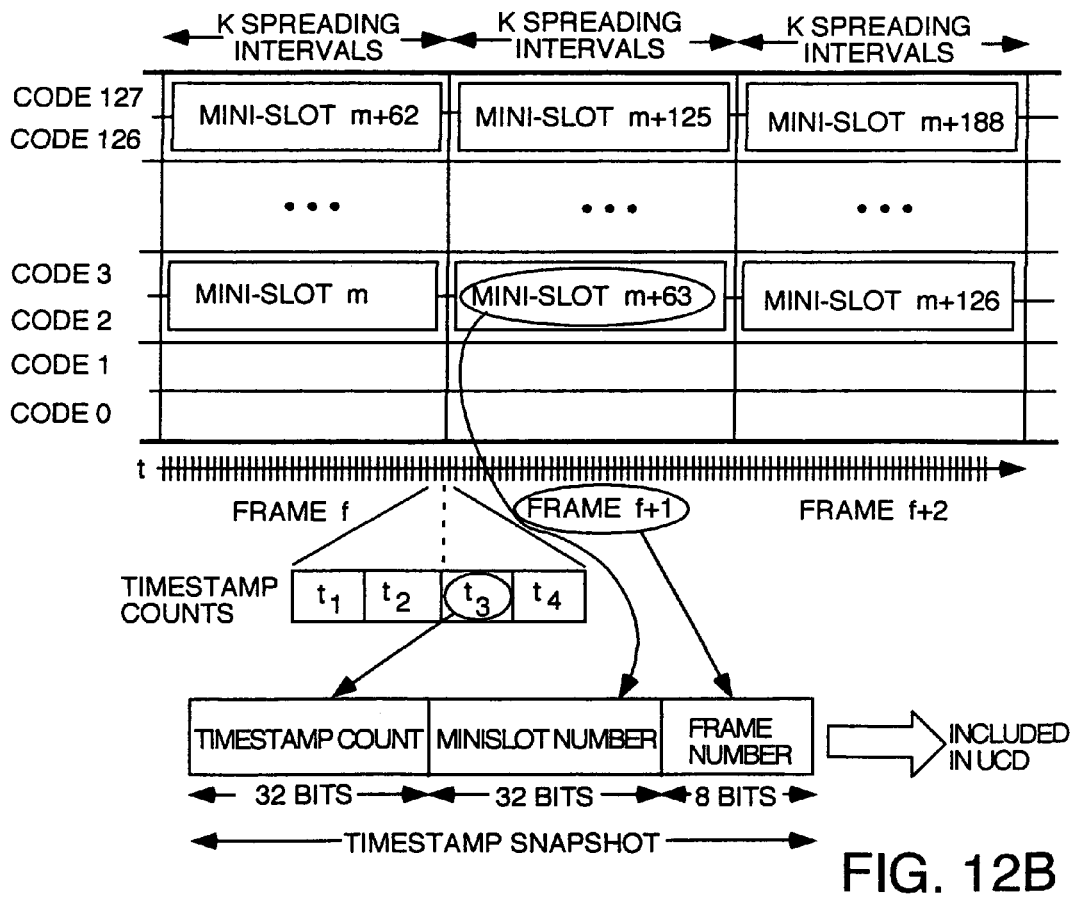
FIG. 12B shows how the timestamp snapshot is composed from the timestamp counter count on a minislot boundary, the frame number and the minislot number for inclusion in the UCD message to keep the CMs frame synchronized.
Figure 12C:
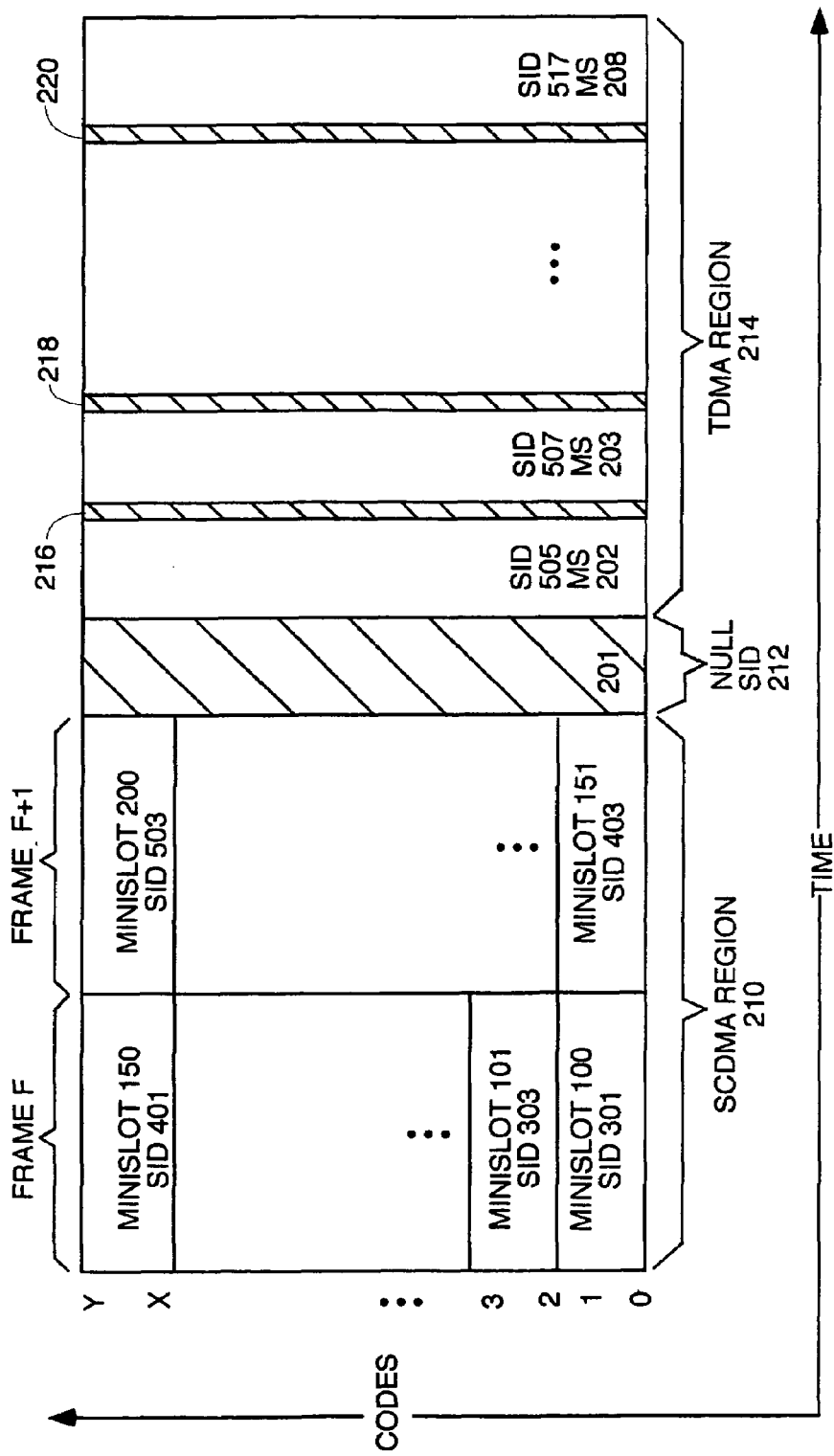
FIG. 12C is a time vs. code map showing SCDMA and TDMA regions.

A MAP which shows both SCDMA and TDMA regions is shown in FIG. 12C. This MAP defines an SCDMA region 210 extending over frames F and F+1 in time which maps spreading codes from 0 to Y to minislots in grants from 100 to 200. A null SID during minislot 201 is shown at 212. A TDMA region 214 exists during minislots 202 through 208. Data from SIDs 301, 303 through 401 are all transmitted simultaneously by different CMs during frame F spread using codes 0 through Y. Data from SIDs 403 through 503 are all transmitted simultaneously during frame F+1 by different CMs. No data at all is transmitted during minislot 201 which is the null SID. This acts as a guardband.

Synchronous TDMA is not supported in the preferred embodiment, however in alternative embodiments, synchronous TDMA with no guardbands between SCDMA and STDMA intervals and between STDMA minislots can be implemented. In other words, in embodiments where STDMA bursts are transmitted during the TDMA regions, 214 in FIG. 12C, the null SID minislot guardband 212 is not needed, and there is also no need for the guardbands 216, 218 and 220, etc. between STDMA minislots. This is because alignment with minislot boundaries will be so precise in both STDMA and SCDMA regions, that the guardbands are wasted bandwidth.

During the TDMA or STDMA region 214, data from only SID 505 is transmitted during minislot 202. Likewise, data from only SID 507 is transmitted during minislot 503 and so on for minislots up to 208.

The upstream transmissions are carried out by each cable modem only during its assigned Minislots. Minislots are like timeslots, and each is numbered. The MAP messages therefore tell specific remote unit transmitters when and for how long they can transmit by virtue of the Minislot assignment to the SIDs served by that transmitter in a MAC message. Thus, some transmitters assigned to the frequency channel of the receiver in FIG. 1 which are DOCSIS 1.0 modems may be transmitting during certain time intervals while other transmitters which use SCDMA multiplexing will be transmitting during other non overlapping intervals by virtue of their Minislot assignments. Likewise, other transmitters which use TDMA multiplexing will be transmitting at other non overlapping intervals by virtue of their respective Minislot assignments. Likewise, second SCDMA or TDMA transmitters which transmit at different symbol rates than other transmitters, respectively, will have their own non overlapping Minislot assignments. The demodulator 14 receives the MAP information from the MAC layer processes by messages from the CPU 20 and it knows when each numbered Minislot is arriving because the demodulator has a its own upstream minislot counter. Thus, the demodulator 14 uses demultiplexing circuitry which is appropriate to demultiplex the signals being received during each interval.

Impulse Detector

An optional impulse detector 112 in the first pipelined section of the receiver functions to determine if there is impulse noise in the received IF signal on line 12 and erases it. The impulse detector should be included as part of the filtering function of at least some of the claims in means plus function form or when impulse noise removal is specifically mentioned. Impulse noise results from switching and is characterized by low or no noise intervals on either side of a high noise power interval. The function of the impulse detector is to look at the input signal over time and determine if there is an impulse noise pattern, and, if there is, determine the boundaries in time of the noise interval and erase the high noise interval. This may be done by calculating a moving average over time for a plurality of overlapping windows of time and examine the results. When the moving average jumps substantially, this is indicative that an impulse noise event has occurred. The impulse detector erases the intervals or Minislots during which impulse noise exists and outputs a message indicating which intervals or Minislots were erased. More specifically, the following are defining characteristics of the impulse detector 112.

The objective of the Impulse Detector is to detect the specific samples corrupted by high impulse noise. The SNR of the corrupted samples is expected to be smaller than a programmable value, e.g., about 0 dB.

The input to the Impulse Detector is the IF signal at 5.12 MHz obtained from the A/D.

The samples that have high impulse noise will be replaced by 0 and will have erasure indications. The replacement by 0 is done to prevent error propagation at the filters (DF) including the matched filter.

Each sample has 2 erasure indications for TDMA (including TDMA bursts for SCDMA modems) and SCDMA. The 2 erasure indications will propagate up to the despreader 118, where the correct one, depending on the despreader mode, is picked.

The Impulse Detector block preferably has an impulse noise level (or percentage) output register that can be read by the computer 20 for monitoring purposes.

The impulse detector preferably has an ENABLE/DISABLE option in some embodiment in order to disable the erasure option.

When in a specified time window the input signal energy is above a threshold all the samples in that window are considered erased.

In order to increase the probability of detecting impulse noise with SNR of about 0 dB, the impulse detector design is modified in some embodiments. In these embodiments, instead of using a comparator to compare the power of each input sample to a reference level, the power should be calculated over a sliding window and compared to a threshold. This is similar to the use of soft decision rather than hard decision. In these sliding window embodiments, sliding window values of [1,2,4,8]*4 samples may be used. Each sliding window has a different programmable threshold.

Each sliding window has 2 thresholds, one for TDMA and one for SCDMA signal.

The Impulse Detector should delay output of the sample data so the erasure indication is aligned with the data.

The Decimation/filtering block 114 needs an addition of 2 erasure bits for each input sample and it has to propagate them to the output. Each filter at the Decimation/filtering block 114 typically uses an OR gate at the decimation, so an erasure bit is output when at least one of the samples is erased. Also, a 0 value should replace the output sample when the 2 erasure bits are active. Note that since generally the TDMA threshold in the impulse detector is lower than the SCDMA threshold, an active SCDMA erasure will always have a TDMA erasure as well. Thus, TDMA will have some spreading of the impulse noise in the filters. The output of the Decimation/filtering block 114 is applied to a Despreader 118 only in SCDMA mode to despread the spectrum represented by the samples. The Despreader 118 outputs despread data to a Code Hopping circuit 120 which reverses the effects of any code hopping (changing of spreading codes over time in each logical channel to spread the effect of weak codes around to all channels).

The Despreader 118 needs an addition of 2 erasure bits for each input sample. Based on the despreader mode, the proper erasure for TDMA (including TDMA bursts for SCDMA modems) or SCDMA is picked and further processed. An erased symbol is replaced by 0, so a Start of Burst Detector 122 (to be described below) will not use the 0 in the correlation calculation to determine when a ranging burst started relative to a reference time to achieve Minislot boundary synchronization at the CMTS for transmissions from cable modems at different distances from the CMTS. In SCDMA bursts, all the symbols in the spreading interval will be marked as erased and will be replaced by 0. Also the Despreader has to count the number of erasures in a spreading interval and output an erasure bit depending on a programmable number of erasures.

Also the Timing Recovery, AGC and Carrier Recovery loops need to freeze any updates when there is an erasure indication. The correlator (not shown) at the Start of Burst Detector 122 (SBD) does not need to do an update freeze, because the erased sample is already 0. A Preamble Processor 124 (PP—to be described later) also should not take into consideration the erased sample to avoid developing the wrong amplitude and phase error correction factors from a preamble with erasures in it.

In order to simplify the design, no timing signal is available to distinguish between TDMA and SCDMA segments in mixed mode. The Impulse Detector 112 will generate 2 erasure bits for each sample. Note that SCDMA signal has higher peak to average, so a higher threshold for SCDMA bursts is used in the preferred embodiment but other embodiments can use the same threshold for both TDMA and SCDMA.

The erasure indication is used by all the synchronization loops, equalizer, Trellis Coded Modulation (TCM) Viterbi decoder 126 (to be described below) and the Reed-Solomon (RS) decoder 128 (also to be described below).

In some alternative embodiments, the Impulse Detector 112 can have as its input the output of the Decimation/filtering block 114, but, in order to reduce the effects of impulse noise on the matched filter 114, it is preferable to place the Impulse Detector so that line 12 is its input. This is because the matched filter tends to spread impulse noise because of the length of the filter. However, especially at low symbol rates, the impulse noise can be outside the signal bandwidth, so it is better to detect impulse noise after the matched filtering process.

In some more complex embodiments, impulse length and impulse rate measurements are made to determine the Reed-Solomon codeword length and the correction capability T based upon the number of erred bytes in one codeword. When more impulse noise is present, the RS codeword length can be decreased and/or the correction capability T is increased.

Decimation and Matched Filter

The output signal from the impulse detector is passed through a decimation and matched filter 114. This circuit is omitted with the mixed analog and digital front end circuits of FIGS. 4 and 5 if the decimation and narrowband passband filtering process performed by circuit 114 is performed in the RF front end section 10.

The purpose of the decimation is to remove excess samples when they are not needed for low symbol rate bursts. The matched filter is a narrow bandwidth filter that attenuates all noise outside the bandwidth of the signal which is set digitally to match the transmitted signal of the particular burst symbol rate being received. The use of matched filters in receiving spread spectrum signals is described in Dixon, *Spread Spectrum Systems with Commercial Applications* (3rd Ed. 1994) Wiley & Sons, ISBN0-471-59342-7, and Haykin, *Communication Systems* (3rd Ed. 1994) Wiley & Sons, ISBN 0-471-57178-8, both of which are hereby incorporated by reference. Matched filters provide a better signal-to-noise ratio at their outputs than regular passband filters so their use is preferred but not mandatory. The matched filter has its impulse response matched to the time-reversed replica of the signal to which it is matched as set by a shaping filter in the transmitter. This provides the best correlation and the highest signal-to-noise ratio.

The input signal to the matched filter/decimation circuit 114 has two possibilities:
  The input signal is real and centered at the IF frequency of 5.12 MHz. It's sampled at 20.48 MHz which is 4 times the highest symbol rate of 5.12 MHz.
  The input is a complex signal at baseband.

The received signal has 6 different symbol rates. The symbol rates are $5.12/2^m$ Msps, $m=0,1,2, \ldots , m-1$, where $m=6$.

The input signal needs to be filtered well within bandwidth of 10.24 MHz to prevent aliasing errors when it's sampled by the A/D, and that is the function of the matched filter.

Figure 7:
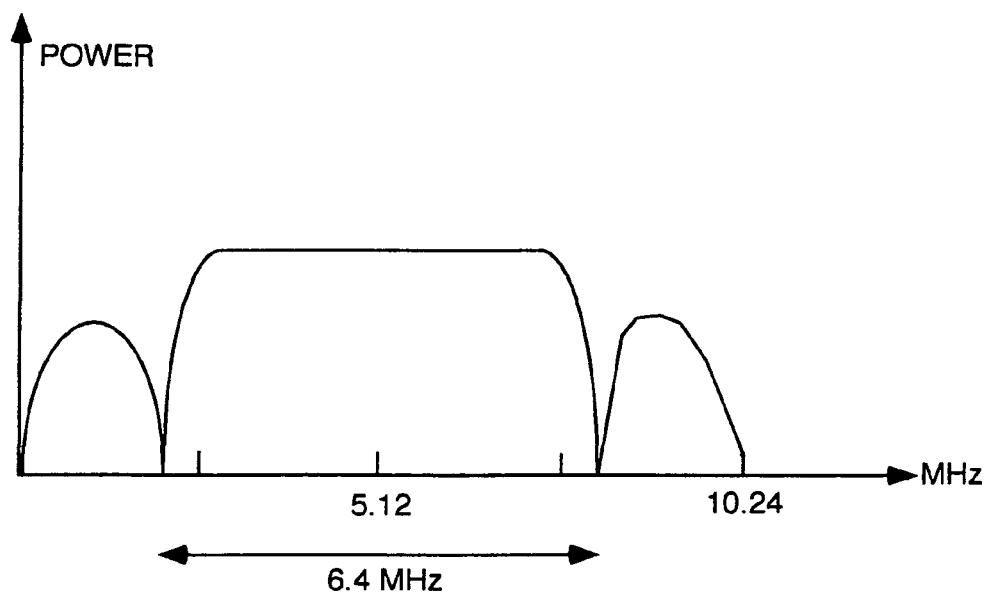
FIG. 7 shows a typical input spectrum to the matched filter for a 5.12 Msps burst.
Figure 8:
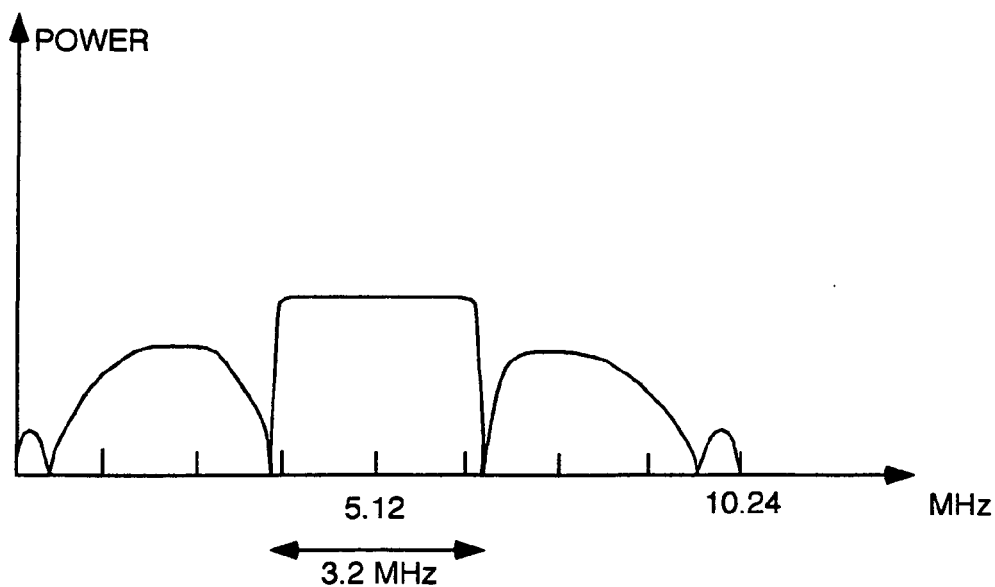
FIG. 8 shows a typical input spectrum to the matched filter for a 2.56 Msps burst.

The input signal includes adjacent channels on both sides of the signal, where their power can be bigger by 10 dB relative to the signal. The SAW filter in the RF front end filters a portion of the adjacent channel but does not filter it all out usually. The worst case is probably when the adjacent channels are signals with the smallest symbol rate of 160 ksps and the signal of interest has the highest symbol rate of 5.12 Msps. The combination of the SAW narrowband filter in the RF section 10 and the matched filter 114 suppress the adjacent channel interference by typically more than 55 dB. A typical input spectrum to the matched filter for a burst at 5.12 Msps symbol rate is shown in FIG. 7. A typical input spectrum to the matched filter for a burst at 2.56 Msps symbol rate is shown in FIG. 8.

The signal at the input to the matched filter is first down converted to DC. The down conversion process involves multiplying by the sine and cosine factors for QAM signals and any other quadrature modulated signals. The bandwidth of the IF signal is actually around 10.48 MHz if the 3 dB points are ignored. After the down conversion, the input signal has a bandwidth of from 0 to 5.12 MHz and from 0 to −5.12 MHz. The actual bandwidth consumed by the data depends upon the symbol rate, so for low symbol rates, even more filtering can be performed to remove noise since the signal does not consume the entire 10.48 MHz passband. To remove as much noise as possible, the signal is passed through a programmable number of half-band low pass filters with the number of filters concatenated in series depending upon the symbol rate. The half band filters have increasingly more narrow passbands and are like a funnel. For the highest symbol rate, the signal is passed only through the first half band filter and the more narrow ones behind it are bypassed. For a lower symbol rate, the broadest passband half band filter is concatenated with a more narrow passband filter so that the more narrow filter filters the output of the more broad filter. Switching connections are controlled by the computer 20 to concatenate the number of filters needed. In the preferred embodiment, 6 half-band filters are used. This is followed by 6 decimations by 2 and one complex square root raised cosine (SRRC) filter.

The input signal resolution, which is the A/D resolution, is 12 bits.

The input signal format can be:
  Two's complement (for A/D or digital down converter)
  Binary offset (for A/D)

Programmable gain: a block that has a programmable gain between 1 to 8 in step of x2 is put at the output of each block or sub-block in the receiver. This is used only in some embodiments, and is useful to allow the computer 20 to control the gain at every stage in case some problem requires it. The final gain will be programmed by the software of the computer 20 in FIG. 1 to ensure maximum signal resolution. The final gain depends on the power of adjacent channel and the range of the adjacent channel power. The programmable gain block has clipping and rounding capabilities. In some embodiments, this programmable gain stage between every stage is omitted.

The power after the matched filter is measured and is used as an averaged input power or as channel signal-to-noise ratio (SNR) when the input signal is not available. One of the upstream channels can be used as a backup channel and when the SNR of one of the upstream channels is bad the head-end will hop to the backup channel assuming its SNR is better. The power should be measured at 2 samples per symbol because there is no time synchronization that has been achieved at this point in the receiver.

Front-end AGC

The front-end AGC circuit 116 outputs a sigma/delta gain control signal on line 29 as a duty cycle signal, which, after averaging, controls the gain of an AGC amplifier 24 in FIG. 2 of the RF front end 10 in FIG. 1. The AGC circuit has a fixed gain output for cable modem applications, and is only used to vary the gain where the receiver of FIG. 1 is used in a different environment such as cellular phones or PCS environments, digital satellite communications, or any other wireless digital data, DSL applications, etc. Generally, in broadband CATV environments, the headend receiver controls the transmitted power of each burst so it knows what to expect in terms of received power and can set the gain on line 29 accordingly. In environments where the transmitted power is not controlled or which can vary because of conditions in the transmission medium, gain control circuit 116 varies the gain on line 29 to maximize the accuracy of the receiver by boosting weak signals and cutting down strong signals. Having a fixed gain level is better because AGC control loops are slow and the cable environment contemplates transmission bursts, each burst preceded by a preamble. If the gain were not fixed, it is entirely possible that the AGC would be adjusting its gain during the entire preamble thereby precluding derivation by other circuitry of gain and phase and frequency offset correction factors.

The sigma/delta output signal should have long rise and fall times and the frequency should not be too high so as to prevent interference to the RF circuitry. The rise and fall times can be on the order of 10% of the output 1/rate.

The front-end AGC has two modes:

1. a fixed output controlled by a programmable register. This is the main mode for cable head-ends because the CMTS tells the cable modems what power level adjustments to make at the transmitter to avoid saturating the A/D converter; and 2. an output level depending upon the input signal power. This second mode might be useful for other uses such as wireless, and is therefore optional but preferred.

The AGC loop is used for calibration also.

The output of the combined processing by the impulse detector and matched filter/decimation processes is two complex samples per symbol for quadrature modulated TDMA bursts or two complex samples per chip for quadrature modulated SCDMA bursts. In other embodiments, 4 samples/symbol could be used.

The SCDMA Transmitter In the Cable Modems

To best understand the circuitry used to received SCDMA signals, a short tutorial on the SCDMA transmitter in the cable modems and notions of synchronization and mapping of one-dimensional DOCSIS upstream Minislots into spreading codes and time (Minislot Mapping) is helpful at this point.

SCDMA is the same as conventional code division multiple access except that it uses synchronization among each of the users which share a particular upstream RF channel to minimize intersymbol interference between signal spread by different codes. SCDMA spreading codes are designed to have zero correlation between signals spread by different codes when there is zero time shift with respect to the two codes. In other words, spreading in cable modem 2 by code 2 is started such that the transmitted signal is output with its code 2 boundaries aligned in time with the code 1 boundaries as a signal from a further away cable modem spread by code 1 comes flying by cable modem 2. In a synchronous system, with an orthogonal code set, no interference between codes theoretically results. This makes it possible to have more users simultaneously transmitting on the same frequency channel for the same level of interference as an asynchronous system. Timing offsets from perfect synchronization increase the mutual interference and limit the number of users. With a code set of 128 mutually orthogonal codes, up to 128 symbols from different sources can be simultaneously transmitted on the same upstream channel. This is done in the cable modems by matrix multiplying an information vector of 128 elements (each CM's information vector only contains the data from the source or sources it is coupled to and the rest of the elements are zero) times a matrix having 128 codes, resulting in an information vector having 128 chips or symbols or constellation points. Each symbol can represent a programmable number of bits from 1 to 6. The bits of each element in the information vector are Trellis code modulated to add forward error correction (FEC) bits and map them into constellation points, and the raw data of the information vector elements are Reed-Solomon encoded, scrambled and interleaved to reduce the effect of burst errors, other transmission errors and to prevent long runs of logic 0s or logic 1s that could cause loss of lock in the tracking loops in the CMTS receiver.

FIG. 9 is a block diagram of a cable modem upstream transmitter that can transmit advanced PHY SCDMA or TDMA bursts. More details about typical circuits that can be used in the spread spectrum circuitry of the transmitter of FIG. 9 can be found in EPO publication 0858695, published Aug. 19, 1998, which is hereby incorporated by reference. The difference between the transmitter of FIG. 9 and the transmitter described in the EPO publication is that the transmitter of FIG. 9 can bypass the SCDMA circuitry so as to send TDMA bursts also. In the transmitter of FIG. 9, a bit stream from the MAC layer enters on 134 and is Reed-Solomon encoded in 136. In the preferred embodiment, the RS generator polynomial is $$g(x)=(x+\alpha^0)(x+\alpha^1)\ldots(x+\alpha^{2T-1}) \quad (1)$$

where the primitive element $\alpha$ is 0x02 hex

The RS primitive polynomial in the preferred embodiment is:

$$p(x)=x^8+x^4+x^3+x^2+1 \quad (2)$$

Encoder 136 has a fixed length codeword mode and a shortened-last-codeword mode. Each fixed length codeword has preamble data of programmable length followed by packet data, followed by a programmable number of FEC bits, followed by guardtime and is empty to the start of the next Minislot. One codeword is packet data and its FEC parity bits. The flexible length burst actually has preamble followed by two codewords the second of which may have zero fill, each having its own FEC. The minimum number of information bytes in a codeword in either mode is 16. R-S codeword interleaving in a byte (R-S symbol) format is performed after R-S encoding in TDMA bursts. This is done by writing bytes into an array row-wise and reading them out column-wise.

The output, byte interleaved codewords on line 138 are then scrambled at 140.

For non TCM bursts, a mapper (not shown) is used for mapping bits output by said scrambler into constellation points of non Trellis code modulated bursts. For TCM bursts, the scrambled output is input to a convolutional encoder and SCDMA framer and interleaver 142. This block includes a symbol mapper and functions to Trellis encode (TCM modulate) the data and further includes a code hopper in the form of a framer in the preferred embodiment. The framer functions to map bursts onto minislots for TDMA bursts and to map bursts onto minislots and codes for SCDMA bursts. A control circuit (not shown) received downstream UCD and MAP messages that indicate which types of bursts are to be transmitted and controls the TCM encoder to turn it on or off and the mapper to be used for non TCM bursts. The control circuit also controls the framer to frame for TDMA or frame for SCDMA.

Code hopping is implemented by the framer in systematically reordering the rows of the spreading matrix C which contains the spreading codes as its 128 rows using a pseudorandom code offset number. The framer maps complete bursts of symbols to minislots and spreading intervals, and needs to align bursts to begin and end on minislot boundaries. To this end, the CM includes a ranging processor in the receiver of FIG. 10 which controls the transmission of training bursts and recovers data transmitted downstream from the CMTS including ranging offsets and sets a ranging offset in the transmitter to achieve phase coherence and frame synchronization. The receiver also receives downstream MAP and UCD messages which define which type of bursts said transmitter can send and when it can send them and sends this data to the control circuitry for the transmitter.

Figure 11:
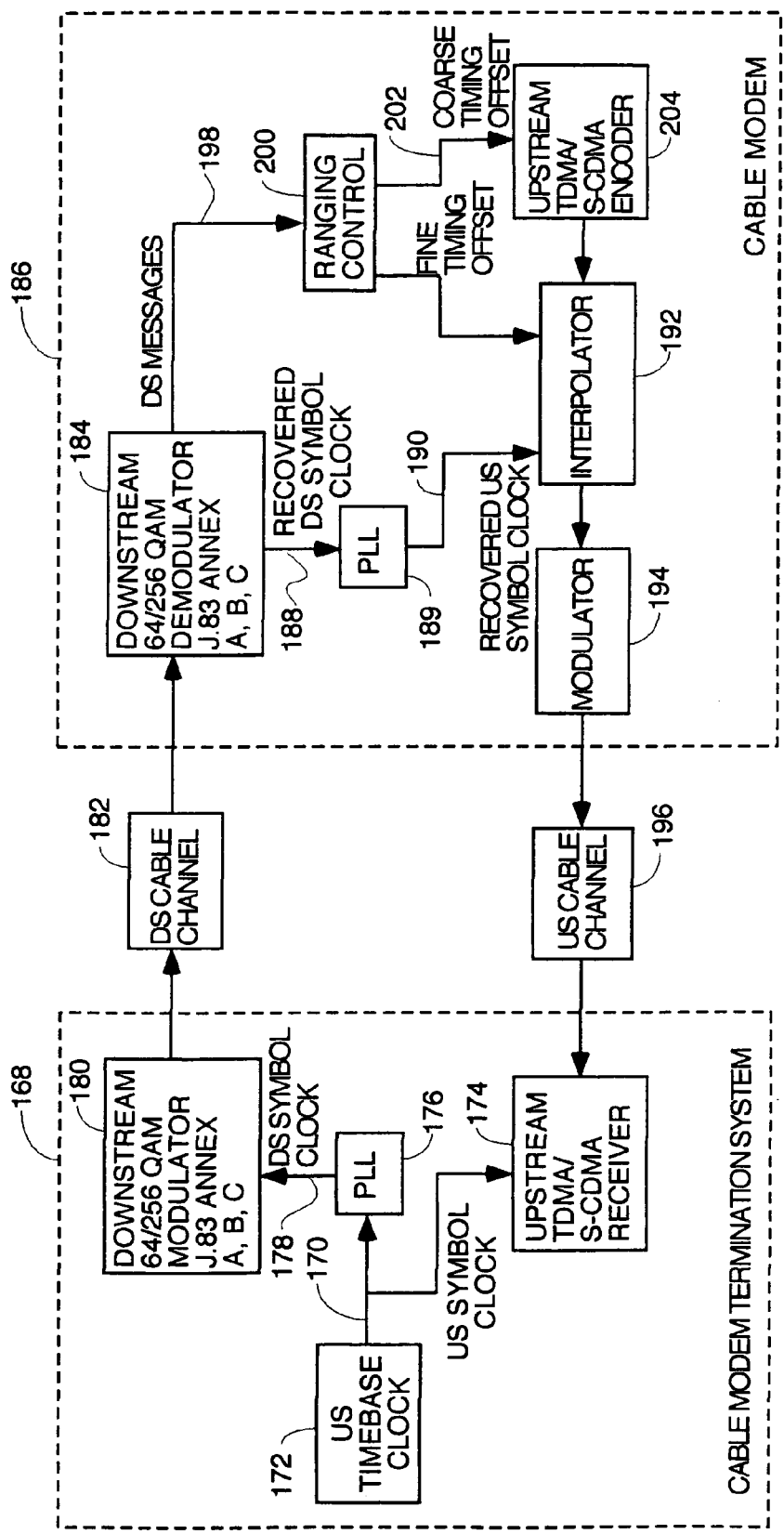
FIG. 11 is an overall system block diagram showing the CMTS and cable modem circuits that implement the preferred form of synchronization.

An upstream minislot counter is controlled by the ranging process to maintain phase coherence. The offset of the minislot counter in the CM transmitter and the CMTS minislot counter is determined using time stamp messages in the downstream data received by the receiver of FIG. 10 from the CMTS 168 in FIG. 11. These timestamp messages allow the CM transmitter of FIG. 9 to get a rough estimate of the ranging offset. Then training bursts are sent for DOCSIS ranging or a trial and error ranging method is carried out by ranging processor 160 to get fine tuning of the ranging offset needed to achieve phase coherence. After ranging, the CM can transmit a burst that is supposed to start on a particular minislot boundary with a proper frame timing delay or ranging offset such that the burst arrives at the CMTS receiver exactly aligned in time with the designated minislot boundary as it exists at the CMTS as required by phase coherence. This will also cause the master upstream clock on line 170 in the CMTS of FIG. 11 to line up with the symbol clock in SCDMA bursts transmitted by the transmitter of FIG. 9 which is a more detailed diagram of the blocks 204, 192 and 194 in FIG. 11. More details of this process can be found in EP publication 0955742, published Nov. 10, 1999, which is hereby incorporated by reference.

Within a burst, the framer numbers the symbols or bits and allocates them to codes and spreading intervals independent of the minislot mapping for SCDMA bursts.

The combination of the Trellis encoder and the R-S encoder form a concatenated code with strong error correction capabilities. The RS encoding helps correct burst noise and impulse noise, while the TCM helps minimize the effects of additive white Guassian noise. The byte interleaving also minimizes the effects of long burst noise. The bit level symbols from the framer 142 are mapped into QAM symbols, i.e., constellation points by symbol mapper 144. SCDMA spreader 146 then spreads the spectrum of the constellation points by the assigned spreading code for SCDMA bursts. Blocks 142 and 146 are bypassed for TDMA bursts so that the symbol mapper 144 receives the output of the scrambler 140 and outputs the resulting constellation points generated by the mapper to the input of the transmit equalizer 148. This allows backward compatibility for use in DOCSIS 1.0/1.1 systems that only use TDMA.

The set of 128 spreading codes in the preferred embodiment is orthogonal and quasi-cyclic and consists of values which are either +1 or −1. Code 0 consists of 128 elements all of which have value of +1. For code 1, each element corresponding to the following indices is equal to −1:

0 2 3 4 5 6 7 9 10 11 13 16 17 18 19 20 21 25 26 28 30 31 33 34 35 37 39 40 41 49 51 52 55 56 59 60 61 65 66 67 69 72 73 74 77 78 79 81 84 90 92 94 97 100 101 103 106 109 110 111 114 117 119 121

The remaining elements of the code 1 have a value of +1. Each subsequent code j is obtained by a cyclic shift to the left in the direction of increasing indices of code j−1 where the element $c_{j,0}$ has a value of −1 and does not take part in the cyclic shift.

If a CM has not been assigned to a spreading code at a spreading time interval, then it will set all elements of the result vector to zero in its computation of the result vector (also known as the transmission vector) from the information vector.

The spread symbols are equalized, i.e., predistorted to compensate for known channel impairments, in a transmit equalizer filter 148, and a transmit shaping filter 150 limits the bandwidth and satisfies the Nyquist criteria. A modulator/interpolator 152 generates the RF output upstream signal. For TDMA operation, the CM pre-equalizer is a linear equalizer structure configured by the CM in response to a ranging response message sent by the CMTS. The pre-equalizer in TDMA operation is a symbol (T)-spaced equalizer structure with 24 feed-forward taps.

For SCDMA operation, the pre-equalizer is again configured by the CM in response to the CMTS ranging response message containing equalization coefficients and ranging offset data. The equalizer is a symbol (T)-spaced equalizer structure with 24 feed-forward taps and 16 feedback taps. For DOCSIS 1.1 compatibility, the CM pre-equalizer is a (T)-spaced equalizer structure with 8 taps with a tap length longer than 8 symbols.

The CMTS computes pre-equalizer coefficients for each CM from its ranging burst and sends them to the CM in a ranging response message which uses 16 bit per coefficients. The CM convolves the new coefficients with the old coefficients to derive new pre-equalizer coefficients.

The CMTS responds to initial ranging requests and periodic ranging requests from a particular CM before CM registration by computing the pre-equalizer coefficients with an equalizer length of 8 and in symbol-spaced format, in the preferred embodiment. After CM registration, the CMTS may used a fractionally spaced equalizer format with a longer tap length to match the CM capabilities learned during the registration process.

Whenever the CM changes frequency or symbol rate, it initializes its pre-equalizer coefficients. New coefficients may be sent in every ranging response message, but typically the CMTS only computes new coefficients when it determines channel response has significantly changed.

Shaping filter 150 and modulator 152 then shape the output symbol spectrum and encode the spectrum of the symbols into one or more RF carriers using the type of modulation scheme designated in the downstream MAP and UCD messages using either carrierless modulation or other conventional QAM or QPSK, etc. modulator circuitry.

Burst Profiles

The transmission characteristics of each logical channel are separated into three portions: 1) channel parameters; 2) burst profile attributes, and 3) user unique parameters. The channel parameters include: a) the symbol rate which can be any one of 6 different rates from 160 ksym/sec to 5.12 Msym/sec in octave steps; b) the center frequency; and c) the 1536-bit preamble superstring; and d) the SCDMA channel parameters. These characteristics are shared by all users on a given channel. User unique parameters may vary from user to user even when on the same channel and same burst type and include such things as power level. Each CM must generate each burst at the appropriate time so that the beginning of the burst arrives at the CMTS at the assigned first minislot boundary specified in the MAP message. The burst profile attributes. in the preferred embodiment, include: modulation (QPSK, 64 QAM, 128 QAM etc.), differential encoding on or off; TCM encoding on or off; preamble length, preamble value offset;

preamble type (QPSK 0 or QPSK1), RS error correction T from 0 to 16 where 0 is no FEC bits to 16 for the maximum where the number of codeword parity bytes is 2×T, RS codeword length (fixed or shortened), scrambler seed, max burst length in minislots, guardtime from 5 to 255 symbols for TDMA channels and 1 for SCDMA channels, last codeword length, scrambler on or off, byte interleaver depth, byte interleaver block size, SCDMA on or off, codes per subframe, and SCDMA interleaver step size. In other embodiments, any smaller set of the above defined programmable burst parameters may be used so long as the receiver can receive both TDMA bursts and SCDMA bursts. In an important class of embodiments, the receiver will be able to receive TDMA and SCDMA bursts either on different frequency channels or transmitted on the same frequency channel during different non overlapping intervals.

The user unique parameters are: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient–2 real and 2 complex). The ranging offset is measured by the CMTS and is the fine tuning delay correction applied by the CM to the CMTS Upstream Frame Time derived at the CM during the coarse ranging process. It is an advancement equal to roughly the round-trip delay of the CM from the CMTS, and is needed to synchronize upstream transmissions in the TDMA and SCDMA bursts. The CMTS provides feedback correction for this offset value to the CM based on reception of one or more successfully received training bursts, with resolution of $1/16384$ of the frame tick increment (6.25 microseconds/ 16384=0.384 nsec).

Figure 13:
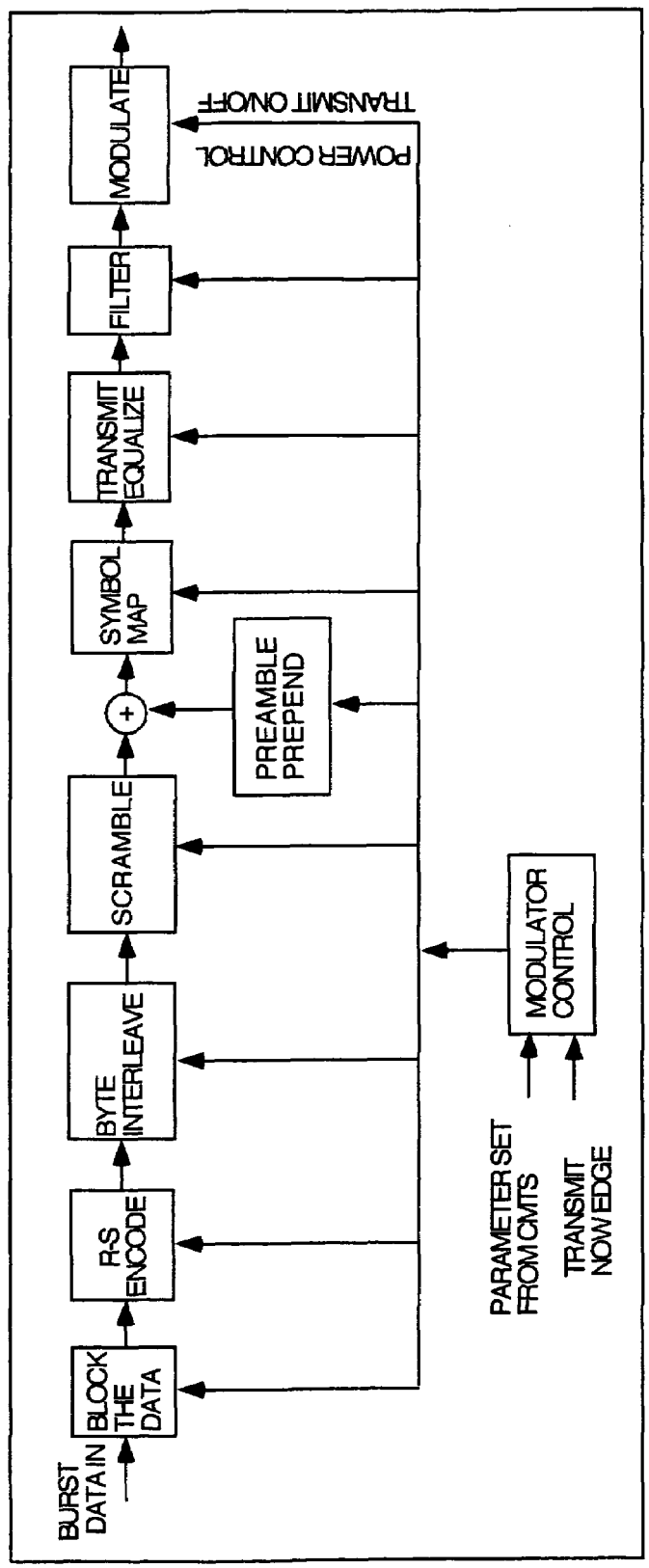
FIG. 13 shows the sequence of processing for TDMA transmit bursts in the CMs.
Figure 14:
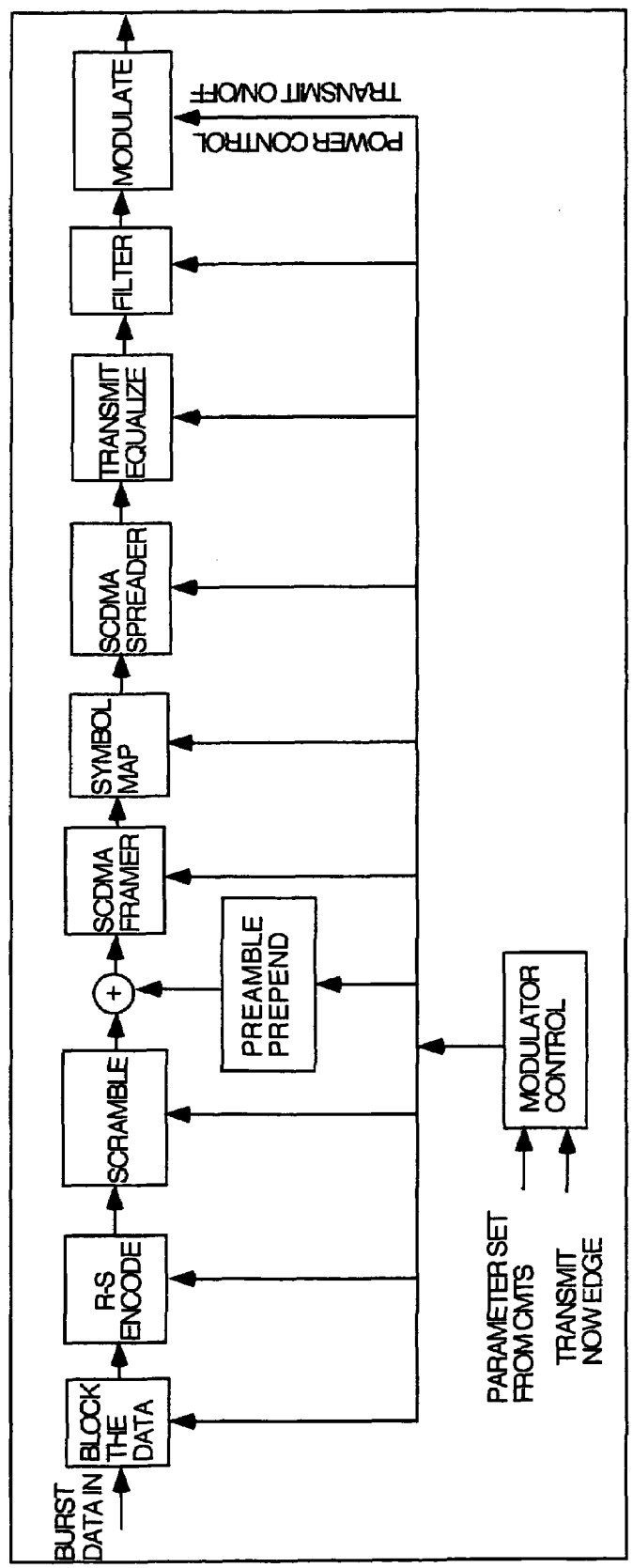
FIG. 14 shows the sequence of processing in the CMs for SCDMA transmitted bursts.

FIG. 13 shows the sequence of processing and the control of the CM transmitter for TDMA bursts. FIG. 14 shows the sequence of processing and the control of the CM transmitter for SCDMA bursts.

FIG. 10 shows a block diagram of a simple alternative embodiment for a CMTS receiver that can receive the signals transmitted by the transmitter of FIG. 9. The RF signal is received and demodulated in demodulator 154. Matched filter 156 removes noise, and despreader 158 despreads the spectrum. The despreader can be bypassed to receive TDMA bursts. A ranging processor 160 calculates a ranging offset to transmit to the CM so that it can achieve minislot alignment of bursts at the CMTS. The ranging processor also includes a rotational amplifier which calculates phase and frequency offsets and gain offsets and equalizer to calculate equalization filter coefficients for use by each CM to derive equalization filter coefficients for subsequent upstream transmissions. Deinterleaver/Trellis Decoder 162 deinterleaves the bytes and uses the Trellis encoded FEC bits to correct any errors for SCDMA bursts, and includes convention detection circuitry including a slicer to detect the payload bits in TDMA burst constellation points. The appropriate circuitry is used to detect the payload bits encoded by each received constellation point depending upon the burst type. A descrambler 164 reverses the effects of scrambler 140 in FIG. 9, and RS decoder 166 decodes the Reed-Solomon codewords back into the original data stream input at line 134 in FIG. 9 to output the received payload data.

Synchronization

In order to maintain code orthogonality even when multiple modems are transmitting simultaneously, all modems must be synchronized to one another in both phase and frequency at the CMTS input. This synchronization is accomplished by the apparatus shown in the overall system block diagram of FIG. 11. The CMTS serves as the synchronization master by generating an upstream timebase clock on line 170 using a master clock 172. Clock 170 is used as the upstream symbol clock by the CMTS upstream receiver 174 which can take the form of FIG. 1 or of FIG. 10 or any other structure which performs the same functions of receiving either TDMA or SCDMA bursts at different symbol rates using different forms of modulation and having different burst attributes. A PLL 176 generates synchronous, phase coherent downstream symbol clock 178 from the upstream symbol clock, and the downstream clock is used by the downstream transmitter 180 to transmit the downstream QAM modulated data over the downstream cable channel 182.

A cable modem 186 which is one of a plurality of distributed CMs all sharing both the downstream and upstream channels has a QAM demodulator 184 capable of receiving the 64/256 QAM J.83 Annex A, B and C signals sent downstream. Basically, the downstream in a broadcast MPEG stream in DOCSIS environments, and the CM receiver 184 receives it. The demodulator recovers the downstream symbol clock on line 188 and PLL 190 uses it to generate an upstream clock 190 which is phase coherent and synchronous (save for propagation delay phase shifts) with the master upstream clock on line 170. This upstream symbol clock is used as the upstream symbol rate, and may be implemented as an interpolator control signal for interpolator 192 in the CM upstream transmitter. The output of the interpolator is modulated in modulator 194 into an RF signal and transmitted over the shared upstream cable channel.

The CMTS broadcasts downstream messages inviting ranging and specifying a number of contiguous Minislots in the upstream transmissions when no modem can transmit upstream data and which is to be used for training bursts only. Modems which wish to achieve synchronization may send training bursts including their identification codes during the time when they think this gap is occurring. When a CM first starts up, its Minislot counter or frame counter is out of whack with that of the CMTS. The preferred embodiment performs both a coarse tuning ranging process followed by a fine tuning ranging process. The coarse tuning process is described in a U.S. patent application entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM, filed May 6, 1998, having Ser. No. 09/074,036, the EPO counterpart of which has publication number 0955742, published Nov. 10, 1999, which is hereby incorporated by reference.

One embodiment of a fine tuning process is described in U.S. Pat. No. 5,793,759 and a U.S. patent application entitled APPARATUS AND METHOD FOR SCDMA DIGITAL DATA TRANSMISSION USING ORTHOGONAL CODES AND HEAD END MODEM WITH NO TRACKING LOOPS, filed Jul. 16, 1997, Ser. No. 08/895, 612, and another embodiment of which is described in the DOCSIS 1.0 and 1.1 specifications, all of which are hereby incorporated by reference. The coarse tuning process makes use of downstream timestamp messages which are output on line 198 to ranging control 200 which uses them to establish a coarse tuning offset on line 202 for use by an upstream TDMA/SCDMA encoder 204 to correct its Minislot counter to keep it close to being in synchronization with that of the CMTS.

After, the coarse tuning process, a fine tuning process is performed using downstream messages and a trial and error process or the DOCSIS ranging process to establish a transmit frame timing delay value which causes transmissions to be exactly lined up on the assigned Minislot boundaries. The DOCSIS ranging process involves the CMTS establishing a timing reference in the designated ranging contention interval (or periodic maintenance burst interval which is reserved for a particular CM). This timing reference is aligned in time with an upstream chip clock boundary and is aligned in time with a minislot boundary). The CMTS receiver then receives an initial station maintenance burst in the ranging contention interval or a periodic station maintenance burst in the periodic maintenance burst interval. The start of burst detector 122 determines when the burst arrived, and measures the time offset of the start of a particular CM's ranging burst from the time reference. The CMTS MAC layer process then sends a downstream message telling the CM which way and by how much to adjust its transmit frame timing or ranging offset to achieve precise synchronization to the timing reference. When the ranging offset is correctly set in a CM, it will have its minislot boundaries for TDMA transmissions aligned in time at the input to the CMTS receiver with the minislot boundaries counted off in the CMTS receiver, and the chip clock boundaries in upstream SCDMA bursts from this CM will be aligned in time with the chip clock boundaries as they are counted off at the CMTS receiver. This is a state called "phase coherence", and it is absolutely necessary to correctly receive both TDMA and SCDMA bursts correctly. This fining tuning process is performed from time to time as a recurrent training process. The CMTS cooperates with each CM in this process by carrying out the functions described above of declaring the gap, setting a time reference in the gap, measuring each CM's ranging burst offset from that reference and sending the downstream messages described above.

Minislot Mapping

The DOCSIS 1.0/1.1 system upstream bandwidth is granted as a message burst defining a series of adjacent Minislots, where a Minislot is defined as a transmission time interval. In order to achieve MAC level compatibility, SCDMA in advanced systems compatible with DOCSIS 1.0/1.1 which can also transmit SCDMA burst employ the same Minislot concept. In the CM transmitters at the framer and interleaver, the series of assigned, adjacent Minislots which are one-dimensional in time is mapped across both spreading codes and time. This mapping uses the Minislot time intervals to represent the equivalent transmission time of an integer number of spreading codes, which are two in the preferred embodiment. This mapping is illustrated in FIG. 12.

In order to accomplish the mapping, a frame is defined as 128 codes by K spreading intervals where a spreading interval is the time over which a symbol is spread into 128 chips of the result vector on line 153 in FIG. 9. In the preferred embodiment, there are a programmable number of spreading intervals for every frame, but in alternative embodiments, the number may be fixed. In the example of FIG. 12, each Minislot covers two codes in the preferred embodiment, so the number of constellation points transmitted during every Minislot is 2×K where K is the number of spreading intervals that occur during the interval of one Minislot.

Data to be transmitted must be mapped from the Minislot numbers assigned to the burst in the MAP message to particular spreading codes and frames or spreading intervals. It is helpful to group the data into 2-D rectangular frames prior to transmission to accomplish this mapping.

A burst from a particular CM may be transmitted over two or more codes in one or more frames. A frame may contain bursts transmitted simultaneously from multiple stations (each on a separate subset of the 128 codes) as defined by the MAP message received from the CMTS MAC process.

In normal operations, the MAC process in the CMTS will respond to bandwidth requests by requesting the physical layer (PHY) circuitry in the CMs via a MAP message to transmit a burst of length N Minislots, starting at Minislot M. All CMs and the CMTS must have a common protocol of how Minislots are numbered, and how they are mapped onto the PHY layer framing. This common protocol is obtained from the information in the SYNC and UCD downstream messages.

Minislots are mapped onto frames starting at the first active code which is usually code 0, and are numbered sequentially throughout the rest of the frame (code 127). Then, if all the minislots are not exhausted, they wrap to the next frame. Minislots are mapped onto a group of consecutive codes. The common protocol for CMTS and CM Minislot numbering on a TDMA channel is achieved solely through recovery of the timestamp (see discussion of coarse ranging). However, since the duration of an SCDMA frame is not necessarily a power of 2 multiple of the 10.24 MHz reference, the timestamp rollover at $2^{23}$ counts is not necessarily at an SCDMA frame boundary. Therefore, an additional synchronization step is required. This step requires the CMTS to identify frame boundaries relative to the timestamp counter on a periodic basis. This is called a timestamp snapshot. This timestamp snapshot must be sent in the UCD message for each upstream SCDMA channel so the CMs can stay in frame synchronization with the CMTS. The CMTS must maintain a frame counter and a Minislot counter, and must sample these values along with the timestamp, on a frame boundary. Once every $2^{23}$ counts is sufficient for this sampling interval. The CMTS must obtain a new snapshot prior to sending every UCD message. In the preferred embodiment, this processing is carried out by the MAC process running on computer 20 in FIG. 1, but it may also be carried out by the timing and control circuit 222 in FIG. 6.

Each CM must maintain a set of counters functionally identical to the CMTS frame and Minislot counters. FIG. 12B shows how the timestamp snapshot is composed from the timestamp counter count on a minislot boundary, the frame number and the Minslot number for inclusion in the UCD message to keep the CMs frame synchronized.

Using this timestamp snapshot and parameters in the UCD message, the CM can calculate the number of time counts per SCDMA frame. Using modulo arithmetic, the CM can then calculate accurate values for the timestamp, Minislot and frame counters at any point in the future. The CM can then arrange to to update its local Minislot and frame counters at an appropriate timestamp counter value. At this point, the CM and CMTS representations of Minislots and frames are aligned.

The CM and CMTS, in the preferred embodiment, must each implement a 32-bit timestamp counter, a 32-bit Minislot counter and an 8-bit frame counter in the following way.

The Minislot counter must contain the value of the first Minislot in the frame when it is sampled. It may be incremented by the number of Minislots in the frame once per frame interval. The only specified function for the frame counter in the preferred embodiment is to reset the code hopping sequence at frame 0.

The frame structure and mapping described herein applies to the entire upstream and not to just one CM. The assignment of codes is done by the framer in each CM in accordance with instructions in the UCD message. Assignment of codes occurs as the framer assigns a burst of symbols to a particular order in the 2-D matrix of codes and time.

The UCD message transmitted by the CMTS specifies three parameters that control the mapping: spreading intervals per frame, codes per minislot and number of active codes. The number of spreading intervals along with the signaling rate define the time duration of the SCDMA frame. The codes per minislot in conjunction with the spreading intervals per frame define the total number of symbols per minislot. The number of active codes allows the number of codes used to carry the data to less than or equal to 128.

Programmability of the number of active codes to less than 128 plus programmability of the power per code for the remaining codes allows reliable operation in extremely noisy cable plants. For example reduction from 128 to 32 codes provides a 6 dB increase in SNR.

All the minislots in one SCDMA frame are transmitted simultaneously either from a single CM or from multiple CMs, as defined in the bandwidth allocation MAP message and the minislot mapping parameters in the UCD. One CM may not have more than one active burst in a single SCDMA frame. SCDMA frame timing is derived directly in the CMs from the CMTS master clock at 10.24 MHz. Selecting the number of spreading intervals and the signaling rate therefore defines the frame duration. Thus, frame duration can change for every burst based upon the UCD parameters. Thus, the term "frame synchronization" means that the the CM and CMTS counters are in synchronization and are processing SCDMA frames using the same three UCD parameters and the same MAP message and the CM has its ranging offset set such that when it transmits a burst scheduled for one or more specified minislots, the burst will arrive during those minislots as measured by the count of the CMTS minislot counter.

In the preferred embodiment, the CMTS must create MAP messages such that the first minislot in the MAP aligns with the start of an SCDMA frame. In other words, the group of minislots allocated in a single MAP must exactly span an integral number of SCDMA frames.

The advanced PHY TDMA Initial Maintenance ranging/ training burst and SCDMA Initial Station Maintenance ranging/training burst types are specified in the preferred embodiment by UCD and MAP messages to be TDMA bursts. The SCDMA channel is programmed by the UCD message for c codes per minislot, p number of active codes, k spreading intervals per SCDMA frame, and a resultant s minislots per frame where s=p/c.

Then each SCDMA frame, where TDMA transmission is to occur for ranging, will contain exactly s minislots where each minislot contains c*k symbols.

If a burst spans multiple frames, the burst will start at the beginning of the first frame and continue without interruption into the next frame.

TDMA bursts on SCDMA channels are defined with a guardtime of 1, i.e., no guardtime, and all TDMA bursts are padded with zeroes from the end of the RS encoded data until the end of the grant. Differential encoding and RS byte interleaving is not used with TDMA burst on SCDMA channels in the preferred embodiment, but may be used in alternative embodiments. The CMTS scheduler (implemented by computer 20 in some embodiments and by MAC layer processes executed elsewhere in the CMTS in other embodiments) insures in the preferred embodiment that the TDMA ranging burst interval is aligned to the start of an SCDMA frame, occurs completely within one or more SCDMA frames and ensures that no SCDMA bursts are scheduled during these same frames. The scheduler is allowed to grant at most one TDMA burst per CM per frame.

Consecutive Minislots are numbered vertically over codes. Thus, the bits to be transmitted during a burst are, after Trellis encoding, etc., mapped into a number of constellation points and the number of constellation points that can fit into the the assigned number of Minislots are picked, this defining the number of payload bits that can be transmitted during that burst. The rest of the bits are buffered for another burst in some embodiments. In other embodiments, the upstream bandwidth request will indicate how much data exists to be sent, and the UCD message will assign the number of Minislots needed to send that amount of data. If the 128 Minislots in a frame are assigned to different cable modems, up to 64 cable modems can transmit on the same frequency simultaneously without interference.

We now return to the discussion of the elements of the demodulator that process SCDMA bursts and the remaining elements.

Despreader 118

The despreader 118 receives the samples output by the decimation and matched filter circuit 114 only when the receiver is receiving an SCDMA burst. The samples for the entire frame of data spread by all 128 codes are received and stored in a buffer (not shown) in the despreader. The mapping betweeen frames, minislots and codes in an SCDMA region of a MAP is shown in FIG. 6. The grants or IEs in the MAP assign data from different sources to be transmitted by different cable modems during different minislots. For SCDMA bursts, the CMs connected to these sources map the assigned minislots to the appropriate frame and codes. Then, when it is time to transmit that particular frame, data from all the sources defined in the MAP message to be transmitted in SCDMA bursts is all transmitted simultaneously during the frame that maps to the minislots in the assignment. These transmissions all mix by superposition in the transmission medium and are sampled. The samples are then stored in the buffer of the despreader 118 during SCDMA intervals, but the despreader is bypassed in TDMA intervals of the MAP.

In some embodiments, CPU 20 in FIG. 1 is programmed to receive the MAP grants from the MAC layer process and use the information as to which Minislots have been assigned to TDMA intervals of the MAP and which have been assigned to SCDMA intervals to control the bypassing of the despreader 118. In other embodiments, the IUC (burst type) data in the MAP is stored in burst parameter memory 220 and used by timing and control circuitry 222 in the demodulator 14 of FIG. 1 to control bypassing of the despreader and the code hopping circuit 120 during TDMA intervals as well as controlling the other elements of the demodulator.

The despreader demultiplexes SCDMA bursts by multiplying the received vector elements defined by the samples output by the matched filter 114 times the inverse code matrix used by the cable modem transmitter. The output on line 130 is a result vector comprised of noise corrupted received chips or symbols or constellation points with two complex samples per chip.

To keep all the data from the different sources separate even though it was transmitted simultaneously during a particular frame, the despreader uses the same sample data 128 in multiple iterations of despreading. Thus, the despreader outputs the data resulting from each despreading operation and corresponding to a different spreading code at a different time. The sample data representing the despread data for each code is then stored in a portion of sample buffer 132 dedicated to storing samples for data spread by that particular code. Thus, the data from all 128 codes is stored in 128 different areas of sample buffer 132.

The over-sampled signal at the despreader output is used to measure the time offset of periodic training bursts and to enable sending of downstream messages to correct the time offset of each burst from each cable modem.

During DOCSIS ranging and while receiving TDMA bursts, the despreader is in bypass mode because training bursts are TDMA even in SCDMA CMs. In bypass mode, the despreader gain is compatible with the spreader gain at the transmitter used in ranging and in transmitting TDMA bursts. The gain in bypass mode is programmable in the preferred embodiment, but is not programmable in other embodiments.

Code Hopping Circuit 120

SCDMA bursts are transmitted on different spreading codes in the preferred embodiment to spread around the effects of bad codes. The code set in the preferred embodiment includes 128 orthogonal spreading codes, but they are not all equal in their SNR, so some codes will suffer from more interference than others. To combat this effect, code hopping is used so that a cable modem is not always transmitting on the same spreading codes. Code hopping circuit 120 reverses this hopping during the writing process into the sample buffer. For example, suppose cable modem number 1 has been assigned to code 1 during a particular spreading interval. Now, suppose during the next spreading interval, cable modem 1 is assigned to code 3 because of code hopping. This causes the data not to use the same code many times. This allows the error correction code to combat the noise more easily. The Code Hopping circuit 120 receives information about these code assignments from CPU 20 in FIG. 1 which assigned the codes in downstream MAC UCD messages to the cable modems. The Code Hopping circuit 120 reverses the code hopping by putting the data from the two different elements in the received information vectors into the appropriate memory locations in sample buffer 132 assigned to storing messages from cable modem 1.

A Code Hopping Offset number is obtained for each spreading interval. In the transmitter, when the Number of Active Codes equals 128 (all the codes are used) code 0 is written into the row address of the Code Hopping Offset, code 1 into address Code Hopping Offset+1, etc. When the address is above 127, it's calculated by modulo(128), e.g., address 128 is 0. In the receiver, the opposite operation should be done, the code address at the sample buffer is given by mod(code−Offset). For example, for offset of 58, the received code 0 is written into address of mod(0−58)=−58+128=70, receive code of 59 is written into code address of mod(59−58)=1.

When the Number of Active Codes is less than 128, code 0 is unused and at the transmitter at the address of Code Hopping Offset code 1 is written. For addresses above 127, the corrected address is obtained at the transmitter by modulo(128)+1; namely address 128 is converted to 1. At the receiver, the code address of the sample buffer is calculated by code−offset+1, if modulo operation is required, it's calculated by mod(code−offset). For example, for offset 59, the received code 59 is written into address of (59−59)+1=1, the received code 1 is written into address of mod(1−59)=−58+128=70, the received code 58 is written into address of mod(58−59)=−1+128=127. The received code 0 can be written into address 0 but it is not used.

The blocks that are affected by the code order and code 0 location are the equalizer 232 and the optional inter-burst ISI canceller 159. When the Number of Active Codes is 128, the equalizer does not use the code 0 symbols. The Code Hopping Offset for each spreading interval gives the location of code 0 (row number from 0 to 127). There are up to 32 values for each frame. The equalizer also gets the starting row number of the burst, and using this together with the code 0 location, the equalizer can find the location of code 0 in the equalizer buffer. When the Number of Active Codes is less than 128, each code in the sample buffer is a cyclic shift of the next one including at the address of Code Hopping Offset.

Code hopping is disabled during ranging and TDMA mode.

The code hopping circuit 120 is optional and is not used in some embodiments.

Sample Buffer 132

In SCDMA mode, the sample buffer stores a double frame sampled at 2 times per symbol. The data is processed after the buffer is full with one frame. The time-offset of each burst is corrected and the estimated data sampled at one sample per symbol are stored in the sample buffer.

The sample buffer 132 stores both the data and the erasure bit indication.

In TDMA mode, the sample buffer is a circular buffer or FIFO and is used to store the data in order so that it may be processed in a few passes. The read pointer follows the write pointer and it never passes the write pointer. The size of the sample buffer is smaller than the size in SCDMA mode and depends on the processing time of the data.

The memory size in SCDMA mode is 32 k words of 12*2+1=25 bits (I, Q & Erasure). The memory size is derived from the fact that the preferred embodiment has 128 codes, 32 spreading intervals per frame, 2 channels (I & Q), 2 samples per chip, 12-bit data resolution, an erasure bit and is a double buffer in that it must store all the symbols transmitted during two SCDMA frames.

In order to minimize latency, the sample buffer is processed by the highest clock available. This is especially important in low symbol rates where the highest clock rate is much higher than the symbol rate.

In some embodiments, a FIFO is used for the sample buffer and the other buffers that come after it.

The reading steps from the sample buffer in SCDMA are:
Read the Unique Word (UW) preamble bits for use by the Start of Burst Detector. When the interleaver in the CM is enabled, the UW symbols need to be deinterleaved. The UW size is programmable and is the same as the size of the preamble, 4 to 32 symbols.
The symbols including the preamble symbols are then read for a symbol clock timing recovery process carried out by the timing recovery circuit 135. The symbols are read over all the codes of the burst for each spreading interval. Interleaving does not change the order of reading the symbols.

The timing recovery circuit 135 reads the symbols only once, but the first symbols are processed 3 times as the timing recovery circuit 135 scans the data forward, backward and again forward to recover the downstream symbol clock therefrom.

The output of the sample buffer with the burst control is sent via line 15 to the timing recovery circuit 135.

The filtered data with the delayed control is then returned to switch 241 in demodulator 14. The switch 241 is controlled to supply the filtered data to the start of burst detector 122 during the unique word portion of every different type of burst (during the UW portion for all IUC types) for start of burst detection. The switch then changes states after the UW portion of every burst to supply the sample data to the timing recovery circuit 135.

Timing Recovery Circuit 135

The timing recovery circuit 135 only recovers the symbol clock during asynchronous TDMA bursts, and does nothing and is either bypassed or transforms itself into a transparent pipeline that just passes the sample data through to the frame buffer 155 during SCDMA bursts in the preferred embodiment. Likewise, in embodiments where STDMA bursts are transmitted, the timing recovery circuit 135 does nothing.

For SCDMA bursts, the CMTS receiver assumes the CM that transmitted the burst has achieved precise frame synchronization so the CMTS receiver just uses its local master symbol clock along with phase and amplitude correction factors developed from the preamble to process upstream data. The IUC of every burst is supplied to a control circuit (not separately shown) which can be in the timing recovery circuit 135 or elsewhere to cause the bypassing to occur during SCDMA (or STDMA) bursts in the embodiments where the CMTS receiver assumes the CM is in precise synchronization.

There is another class of alternative embodiments, where the timing recovery circuit 135 monitors the time synchronization of SCDMA and STDMA and TDMA bursts and provides time offset data for downstream messages to the cable modems that transmitted the bursts if any slip in synchronization to the minislot boundaries at the CMTS receiver is detected, or corrects the time offset of the burst.

The timing recovery circuit 135 works before the carrier acquisition and is non-decision aided.

The timing recovery 135 tracks the symbol clock phase using a second order loop. The second-order loop is used in TDMA mode and a first-order loop is used in SCDMA mode in some embodiments. The loop gets the initial time offset estimate from the start of burst detector via data on line 151. The timing recovery circuit then tracks the symbol clock by using the timing error of each symbol.

There is a resampler in the timing recovery circuit to convert from the two samples per symbol stored in the sample buffer 132 and the one sample per symbol output on line 157 to the frame buffer. The timing recovery circuit 135 synchronizes to the symbol clock and then samples the transmitted signal at the proper time to develop one sample per symbol taken at the proper time and output on line 157. In other words, the resampler uses the time offset to estimate the correct timing for one sample per symbol.

The timing recovery circuit 135 outputs the following data for each burst:

Initial time offset
Final time offset at the end of the burst
Clock frequency offset In ranging and training (initial and periodic station maintenance) bursts, the time offsets are used by the CMTS transmitter (not shown) to send downstream messages that correct the cable modem's upstream symbol clock time offset.

The time detector accuracy is $1/128$ minimum of a symbol for signal to noise ratio of 27 dB. In SCDMA mode, the time offset of the symbols over a spreading interval of each burst are calculated and used by the timing recovery loop. In tracking mode for TDMA bursts, the loop tracks the symbol clock phase noise.

In SCDMA mode, the timing recovery circuit 135 is mainly used for symbol clock tracking of TDMA training bursts. In SCDMA mode, the time offset of the symbols over a spreading interval of each burst are calculated and used by the timing recovery loop to do resampling at the proper time. In tracking mode, the loop tracks the symbol clock phase noise.

The time used for the timing recovery process should be as small as possible (much less than a frame time) so the total system latency is small. The worst case occurs when the timing recovery circuit processes short bursts, since all the symbols are processed 3 times: first in the forward direction, second in the backward direction, and the third time wherein the symbols are output.

The timing recovery 135 has the following control registers in the preferred embodiment:

Enable/Disable: sometimes the MAC layer process only needs to run the equalizer without correcting symbol clock time offset such as in SCDMA mode. Thus, some training bursts have their timing offset corrected and some get only equalizer coefficients.

Timing offset resolution (number of bits). The process is as follows. The training burst time offset is calculated, and the same burst then passes through the equalizer 232 to converge on new coefficients. The equalizer corrects any time offset that was not corrected by the timing recovery. The time offset and the new coefficients are then sent to the CM via a downstream message.

The resampler (not shown) in the timing recovery circuit 135 uses the time offset in order to interpolate the samples at the correct timing for the preamble and the data symbols. It receives 2 samples per symbol and resamples at the correct time to output 1 sample/symbol. The resampler is an interpolation filter whose coefficients are determined by the time shift.

In SCDMA mode the resampler is initialized during each spreading interval because there is no connection between two spreading intervals. In the first and last codes of the burst, the resampler has limited window span to interpolate the data because it cannot use the adjacent samples which are from a different spreading interval or different user. Therefore, the interpolator uses a smaller window span when processing the first and last codes of the burst.

The resampler in SCDMA mode for data bursts can be disabled by the software of the computer 20 in FIG. 1.

The demultiplexed data from each minislot of the frame being processed is then stored in a different set of addresses in frame buffer 155 with one sample per symbol in the preferred embodiment, although other numbers of samples per symbol can also be used.

Frame Buffer 155

The frame buffer stores bursts as long as the burst is not larger than a frame. When the burst size is bigger than one frame, the frame buffer stores up to one SCDMA frame. In TDMA mode the size of the buffer is anything that works to adequately receive TDMA bursts, but it does not have to be large enough to store the biggest TDMA burst.

In SCDMA mode, the timing recovery circuit 135 writes frames of data into the frame buffer over codes (in columns). Once it finishes a column, the preamble processor 124 can start processing the preamble symbols that are located in that column. The preamble processor does not wait until the full burst is written into the frame buffer in the preferred embodiment, but in other embodiments, it can do so. If the preamble processor starts processing the preamble symbols as soon as the column is available in the frame buffer, there is no need to speed up the preamble processor beyond the speed of the timing recovery circuit 135 in the preferred embodiment. The timing recovery circuit 135 needs to be fast, because it is the first processing block, and, if it is slow, it delays the whole process.

Data is processed burst by burst. When the rotational amplifier (comprised of the AGC circuit 139 and the carrier recovery circuit 141) finishes processing the preamble of a burst to develop phase and amplitude error correction factors, the preamble processor immediately begins to process the preamble of the next burst in the preferred embodiment. The burst sizes can be different; thus, the transfer of bursts from one module to the other is done in the preferred embodiment only after the following module has finished processing the previous burst. In alternative embodiments, pipelined buffers can be employed between each stage such that when a circuit is done doing its work, it can output the burst to the pipeline buffer between it and the following stage. When the following stage is ready, it can retrieve the burst from the buffer.

Processing Steps For Each Burst

1. Inter-burst ISI correction is optionally performed by the ISI canceller 159 which is useful to eliminate intersymbol interference between SCDMA bursts transmitted from different CMs that are not exactly aligned in time with each other. The ISI canceller is also optional in embodiments which can receive STDMA bursts.

2. After processing by the start of burst detector 122, the time of the beginning of the burst is known. The length of the preamble UW is also known. Thus, timing and control circuitry 222 or the computer 20 of FIG. 1, controls switch 161 to couple the preamble processor 124 to receive the samples of the UW symbols for an interval corresponding in length of the preamble. The preamble processor 124 deinterleaves (only when necessary) and processes the preamble symbols and outputs to the rotational amplifier 143 initial phase, gain and frequency offset values for use by those circuits in developing more refined phase, gain and frequency offset correction factors and for controlling the gain of the received symbols and recovering the upstream carrier. The switch 161 is then switched to couple the AGC and carrier recovery circuits 139 and 141 to receive the symbols of the burst sent following the preamble. The AGC circuit 139 then, starting from the initial gain offset sent to it by the preamble processor 124, tracks and corrects for the gain offset of the data symbols of the burst. The carrier recovery circuit 141 tracks and corrects for the phase and frequency offset of the data symbols. That is, the rotational amplifier refines the initial phase, gain and frequency correction factors received on line 125 for use in receiving this burst. When the preamble symbols are not available this step is skipped.

3. The separation of the R/A 143 into two loops 139 and 141 gives more flexibility to program the different tracking loop bandwidths of AGC and carrier recovery. The rotational amplifier 143 processes the symbols of the burst over the code for SCDMA bursts or over time for TDMA bursts. The symbols with the rotational amplifier correction are written into a burst buffer 145 or equalizer buffer 147 according to the burst type. The rotational amplifier coefficients are written into a rotational amplifier coefficient register (not shown) for output to the computer 20.

The output data from the carrier recovery circuit 141 goes to the equalizer buffer 147 if it is a training burst such as initial or periodic station maintenance bursts. At powerup, the initial station maintenance burst is sent. Thereafter, within every 30 seconds, a periodic station maintenance burst is sent. Each training burst is comprised of a preamble followed by the ID of the CM that transmitted the burst. The data bursts take the other route to the burst buffer 145. A multiplexer or other switch (not shown) controls which path each burst takes. The corrected data burst symbols are written into the burst buffer 145 and the corrected training burst symbols are written into the equalizer buffer 147 for processing by the equalizer 232.

Training Steps

Measure the burst time offset and send down to the CM by MAC message so that the CM achieves "phase coherence" (defined above).

Correct the time offset for a sample for each symbol using the resampler.

Find the initial gain & phase values from the preamble using the preamble processor.

Find the R/A coefficients for each spreading interval using the AGC & the carrier recovery circuits and correct each symbol.

Correct the gain, phase and frequency offsets (equivalent to 1 tap equalizer) by convergence in the R/A.

Interleave the local preamble (true) symbols when the received preamble symbols are interleaved (Interleaver can be active only in SCDMA).

Perform coarse equalization (using a larger adaptation step value and only 4 FFE & 4 FBE coefficients).

Process the data through the equalizer filter.

Fine equalization (using a smaller adaptation step value and all 24 coefficients have converged)

Output: Time, Gain and frequency offsets, coefficients and equalizer SNR.

It is desirable to limit the training rate in order to allow the equalizer more time to process the received burst and to simplify the implementation. The training burst rate is limited to one burst per 0.8 msec (reduced from 1.6 msec). For a system of 2,000 modems it will take only 1.6 sec to train all the modems, where the requirement is maximum 30 sec.

There are 3 alternative ways to process the data portion in the training burst (the first alternative is preferred):

Decoding the data after passing the data through the coarse equalizer coefficient filter. Since the data is in QPSK it will be decoded properly.

Decoding without passing it through the equalizer filter. This mode is used if there is a problem with the second mode.

Decoding after calculating the full 24-tap equalizer filter (fine equalization).

In order to pass the data through the equalizer filter, the data portion should be stored in the equalizer data buffer 149. After the equalizer finishes the equalization, the data is passed through the equalizer filter and the soft decision output is passed to the equalizer data buffer. When the equalizer outputs the data the LMS is disabled and the coefficients are frozen.

Docsis 1.0 Equalization Issues

DOCSIS 1.0 has a linear equalizer with 8 complex coefficients. In order to be compatible with DOCSIS 1.0 the main tap location has to be programmable according to the initial value and also the FBE should be disabled. The disable of the FBE is done automatically for bursts in DOCSIS 1.0 mode and when ENABLE_EQ_1.0=1.

The location of the main tap in the 8-coefficient FFE filter is programmed.

In alternative embodiments, the equalizer uses the same FBE filter for DOCSIS 1.0 bursts and the control circuit 222 or computer 20 will configure the FBE filter to be the required precoder filter.

Optional Inter-Burst ISI Canceller 122

The CM transmitter time offset is corrected once every 30 seconds by the periodic training process. Between these time alignments, the cable delay may change or the recovered downstream clock may shift due to TV channel surfing. This effect generates intersymbol interference (ISI) from two sources: one is the intra burst ISI that is caused by the user symbols that interfere one with the other due to time offset; and, the other is the inter burst ISI between different users. The intra burst ISI is removed by correcting the CM's time offset. The ISI between users affects mostly transmissions from other CMs spread by the 3 to 4 codes that are close to the codes used to transmit a burst. This ISI is caused by time offset between SCDMA bursts from different CMs. The inter-burst ISI canceling reduces significantly the ISI between neighboring spreading codes used for SCDMA bursts by different CMs. The Inter-burst ISI canceller receives the time parameters it needs via path 247 from the timing recovery block and receives the samples taken at the correct time via path 249 from the frame buffer 155.

For the sake of clarity the inter-burst ISI between two users is shown here for only one code. The received symbols of each user are given by:

$r_1 = s_1 + s_2 * RC(-T+\tau), \tau = \tau_1 - \tau_2$ $r_2 = s_2 + s_1 * RC(T-\tau)$ where $\tau_1$ is positive when the sampling time is after the correct time, and $r_1$ and $r_2$ are the signal of CM 1 and CM 2, respectively, and $s_1$ and $s_2$ are the transmitted signals without ISI, and RC is the raised cosine function.

In matrix form, these relationships are expressed as:

$$\begin{array}{c} r_1 \\ r_2 \end{array} = A * \begin{array}{c} s_1 \\ s_2 \end{array}$$

where $$A = \begin{array}{cc} 1 & \alpha \\ \alpha & 1 \end{array}$$

and $\alpha = RC(T-\tau)$

The two unknown variables $S_1$ and $S_2$ are obtained by solving the following two equations:

$$s_1 = \frac{\alpha * r_2 - r_1}{\alpha^2 - 1}$$

$$s_2 = \frac{\alpha * r_1 - r_2}{\alpha^2 - 1}$$

This can be easily expanded for more than one interfering code. This ISI reduction algorithm can be used for TDMA or STDMA bursts also when two bursts from different CMs with a smaller than normal guardtime or no guardtime between them and timing offsets between the two CMs. The interburst ISI canceller 159 can start to process the data only when the frame buffer stores at least 2 bursts.

Start Of Burst Detector 122

Ranging is the process of making the necessary timing adjustments in a CM so as to get the start of a transmission burst from that particular CM aligned in time with a reference time established in a ranging gap opened by the CMTS so that subsequent transmissions will be aligned with the start of the assigned minislots for those bursts. The start of burst detector uses the preamble of known symbols known as a Unique Word or UW at the beginning of each burst including training bursts to find the start of the burst.

Start of Burst Detector and Ranging

There are two different types of ranging: initial ranging and periodic ranging. The object of initial ranging is to achieve "phase coherence", and the object of periodic ranging is to maintain "phase coherence". "Phase coherence" exists for a CM when the ranging offset is correctly set for that CM, and it will result in the CM's TDMA transmissions having their minislot boundaries aligned in time at the input to the CMTS receiver with the minislot boundaries counted off in the CMTS receiver. "Phase coherence" will further result in the chip clock boundaries in upstream SCDMA bursts from this CM being aligned in time with the chip clock boundaries as they are counted off at the CMTS receiver. Phase coherence also requires that the upstream symbol clock or chip clock frequency used by the CM to transmit a burst is identical to the upstream symbol clock and chip clock frequency generated in the CMTS from the master clock and that the upstream symbol clock or chip clock frequency generated by the CM be generated from the CMTS master clock recovered from the downstream so that there is frequency lock and no drift between the upstream chip or symbol clock generated in the CMTS and the upstream chip or symbol clock generated in the CM. Phase coherence also requires that the upstream carrier frequency used by the CM to transmit a burst be identical to the upstream carrier frequency generated in the CMTS from the master clock and that the upstream carrier frequency generated by the CM be generated from the CMTS master clock recovered from the downstream so that there is frequency lock and no drift between the upstream carrier generated in the CMTS and the upstream carrier generated in the CM. Phase coherence results in timeslot and frame synchronization for TDMA and SCDMA bursts, respectively, and is necessary to correctly receive these bursts. The generation of the upstream carrier and upstream chip or symbol clocks locked to the recovered master clock is one element necessary to achieving phase coherence. This is done using the technology of FIG. 11 which is a broad overview of the technology disclosed in APPARATUS AND METHOD FOR SYNCHRONIZING AN SCDMA UPSTREAM OR ANY OTHER TYPE UPSTREAM TO AN MCNS DOWN- STREAM OR ANY OTHER TYPE DOWNSTREAM WITH A DIFFERENT CLOCK RATE THAN THE UPSTREAM, filed May 6, 1998, having Ser. No. 09/074,036, the EPO counterpart of which has publication number 0955742, published Nov. 10, 1999 which are incorporated by reference. The ranging process and circuitry are another necessary element to achieving phase coherence. Ranging corrects for bulk timing errors which are the most common variety. Optionally, but included in the preferred embodiment is the ISI canceller which corrects for small timing offsets that arise on a burst-by-burst basis by developing timing correction factors from each burst's preamble.

During initial ranging, there is no control by the CMTS of which CMs can do their initial ranging and the CMs can be substantially off in their timing and there can be collisions of ranging bursts. Thus, the MAC layer sends a downstream message which tells the CMs that an initial ranging interval with IUC type 3 will be opened up over an identified span of minislots. The span of the initial ranging interval is set to be long enough to encompass the entire round trip propagation time to the farthest CM. The IUC in the downstream message tells the CMs that it is an initial ranging interval so every CM that needs to do initial ranging is free to do so during this interval. The CM then sends its initial ranging burst during the identified interval and times the burst to start at what that CM thinks is the reference time identified in the downstream message opening the interval. The initial ranging burst (also known as the Initial Station Maintenance burst) starts with a UW and includes the ID of the CM that transmitted it.

Because the CMs minislot counter may be way off, the initial ranging burst will arrive at the CMTS receiver at some time which is offset from the reference time established by the downstream message. The start of burst detector detects when the burst starts and outputs the timing offset. That timing offset is used to compose a downstream message directed to that particular CM telling it how far and in which direction to adjust its minislot counter or other timebase. If there is a collision, the start of burst detector 122 detects this fact and no timing offset calculation is made and no downstream message is sent to any CM. The CMTS uses the fact that there are a large number of collisions during initial station maintenance intervals to infer that there is a large demand for initial ranging. The CMTS will respond by opening more initial station maintenance intervals or lengthening them (also known as contention intervals).

If a CM transmits an initial ranging burst and does not receive a reply, it assumes there was a collision or its power is not high enough, and waits for the next contention interval to send another initial ranging burst.

After achieving initial synchronization, CMs have their timing adjusted so as to be able to transmit their bursts so that they arrive within ½ a symbol time from the designated minislot boundary. Periodic ranging is the other type of ranging the the CMs perform and the CMTS start of burst detector is involved in. From time to time, the MAC layer will open a periodic ranging interval for each specific CM. That periodic ranging interval will be transmitted in a downstream message directed to the specific CM which includes and IUC that indicates to the CM that it is a periodic ranging interval. Only that CM can transmit a ranging burst during that particular interval so there will be no collisions. The CM transmits its periodic training burst, and the start of burst detector detects when it starts relative to the reference time identified in the downstream message and calculates time offset data to be used in a downstream message to that CM.

The start of burst detector is also involved in processing of non-training bursts. Asynchronous TDMA bursts are transmitted by DOCSIS 1.0, 1.1 and advanced TDMA CMs, and these bursts will hereafter just referred to as TDMA bursts. All ranging is performed with TDMA bursts in the preferred embodiment even for SCDMA only CMs, although in other embodiments, other types of burst multiplexing such as SCDMA bursts could be used. Synchronous TDMA for post ranging bursts with more precise time alignment is not implemented in the preferred embodiment, but is in alternative embodiments.

That is, the start of burst detector 122 functions to determine where in time each asynchronous TDMA burst starts by monitoring for the arrival of the Unique Word (UW). For SCDMA mode in the preferred embodiment, and synchronous TDMA mode in alternative embodiments, the start of burst detector knows where the burst is (assuming the CM that sent it has already performed ranging and is in frame synchronization and has complied with the MAP message) so the main function of the start of burst detector 122 in these modes is to determine if the STDMA or SCDMA burst is present and if there has been a collision. Certain bursts such as requests for bandwidth are transmitted during a contention interval so there can be collisions. The MAC wants to know if there have been collisions in the contention intervals. It want to know this so it can open more contention intervals if there have been collsions or make the contention intervals wider. The MAC also wants to know is SCDMA bursts(or STDMA bursts in some embodiments) have arrived when scheduled to make sure the CMs that are supposed to have sent them are operative.

Each burst starts with a UW that is approximately the same length as the preamble in embodiments where separate preamble and UWs are used. In some embodiments, the UW may be different length than the preamble.

The preamble pattern and the length of the preamble are both programmable in the preferred embodiment, but may be fixed in other embodiments. The preamble length and value are configured by the CM in accordance with the UCD message transmitted by the CMTS.

All CMs transmitting upstream are quiet until they request bandwidth during a contention interval, are granted a certain number of Minislots in a MAP message and transmit during those Minislots. The data transmitted during that interval plus the preamble and/or UW are known as a burst although bursts are also transmitted during ranging intervals as well.

In SCDMA mode, the CMTS sets and/or knows the time reference in the ranging gap (also known as the contention interval) where the SCDMA burst is supposed to start. In SCDMA mode, the start of burst detector detects if there is an SCDMA burst, where the SCDMA burst actually starts and detects if there is a collision in the contention interval. However, to train SCDMA modems at initial station maintenance burst time, the start of burst detector determines the time of arrival of the UW of the TDMA initial station maintenance burst relative to the reference time in the contention interval. This time offset is then sent down to the SCDMA modem so that it can adjust its ranging offset to achieve frame synchronization. The same process occurs for TDMA periodic station maintenance bursts from SCDMA modems.

Contention Interval and Bandwidth Requests

The contention interval is an interval established from time to time in the upstream which the MAC layer process establishes for CMs to send their bandwidth requests. The MAC layer sends a downstream message telling all CMs the minislot boundaries of the contention regions, and any CM that needs bandwidth sends an upstream burst during that interval requesting bandwidth. There can be collisions, so the start of burst detector 122 detects if there are collisions between bandwidth requests. If there are, the MAC layer finds out from the start of burst detector and may widen the contention interval the next time it is established, but no downstream collision message is sent. In the CMs, if they send a bandwidth request and there is a collision, they will receive no response. They respond by sending the bandwidth request again, because they assume if they received no grant in a MAP message after transmitting a bandwidth request that there must have been a collision.

Summary of Steps Performed by SBD

The start of burst detector (SBD) and the timing recovery loop perform the following steps in the preferred embodiment:

Start of burst presence detection (valid, collision or empty burst).

In TDMA mode and in SCDMA initial and periodic station maintenance bursts the SBD is used for burst presence detection and for initial timing offset, whereas for other SCDMA bursts, the start of burst detector (hereafter sometimes referred to as the SBD) is used for burst presence detection only (and time correction in some embodiments).

Initial burst time-offset measurement.

The SBD is used to calculate the initial time offset for timing recovery purposes.

Estimating the symbol samples at the right time by the timing recovery loop.

In TDMA mode there is no interleaver on the preamble symbols of the UW, but in SCDMA mode when the interleaver is enabled, the UW symbols need to be deinterleaved before the start of burst detection process can detect the UW.

The time offset is calculated in two steps:

Coarse time offset

Fine time offset

The burst time offset, which is the combination of the coarse and fine time offsets, is output to the MAC layer process (not shown but typically executing on computer 20 in FIG. 1).

The Start of Burst detector's main use is monitoring the contention region for REQ, REQ/DATA and Initial Station Maintenance bursts.

For each burst, the following calculations are also carried out by the start of burst detector 122.

Start of burst nominal receive time

Start of burst search window

Time offset output

Burst length calculation

Coarse Burst Time Offset

The start of burst detection is based on correlation of a known preamble sequence—unique word (UW) that is added by every CM at the beginning of every burst and the actual received signal. The absolute value of the correlation of the received signal with the UW is calculated and compared to a predefined programmable threshold. The absolute value is used because the received signal phase is unknown.

The carrier phase is not fixed during the correlation window when there is a carrier frequency offset.

In simpler embodiments, the correlation result is compared to the multiplication of the threshold by the power estimate. In other simpler embodiments, the threshold is normalized by the received power and by the length of the UW sequence because the preamble length might change from burst to burst.

In order to find the two largest adjacent correlation values, four correlation values are stored and compared in the preferred embodiment. The second largest correlation value is always before or after the peak. The four correlation values include one correlation value before the first threshold crossing and two-correlation values after the peak crossing. The correlation value before the threshold crossing is needed when this value is bigger than the correlation value after the threshold crossing. The fourth correlation value is needed when the threshold is low, so the real peak is the sample after the first threshold crossing, and the sample after the peak is bigger than the correlation before the peak.

The correlation peak is found by comparing the first threshold crossing with the correlation after it. The second largest correlation is found by comparing the correlation before and after the peak. The correlation peak location relative to the expected start of burst location is the coarse burst-timing offset.

Start of Burst Nominal Receive Time

In the preferred embodiment, the MAC layer software process (not shown) sets a timing reference mark in every contention interval the CMTS opens. This timing reference takes the form of a start Minislot value established by the MAC layer and transmitted downstream to the CMs in a MAP message. Ranging bursts need to have their timing adjusted until the start of the ranging burst arrives at the CMTS at the time of the timing reference mark to achieve frame synchronization.

The expected location of start of burst occurs when the demodulator Minislot counter (not shown) matches the MAC layer start Minislot of the burst.

The start of burst expected location for most of the burst types (IUCs) is obtained from the sum of the MAP Start Minislot field (4 bytes) and the minislot Offset of each IE. The exception is for the following burst types: REQ, REQ/DATA and Initial Station Maintenance.

There is a process at the CMTS MAC process that maps out the usage of the entire upstream bandwidth on all TDMA and SCDMA logical channels of all FDMA channels. That usage is defined in a table or other array of grants for upstream bursts and is communicated downstream in a MAP message. Each grant is defined by an information element which will hereafter be referred to as an IE. Each IE contains an IUC field that defines the burst type, an offset field that defines the minislot number where the burst is supposed to start, and a SID or service identifier that identifies the voice, data or other service to which the data of the burst belongs.

The REQ burst (IUC=1) can start in the first minislot of the IE and on all the minislots in the IE region, which satisfies $$\text{First\_minislot} + n * \text{Burst\_Size}, n=0,1,2,\ldots$$

where the Burst_Size is given in the burst attribute.

Initial Station Maintenance

The Initial Station Maintenance ranging/training burst (IUC=3) is used to achieve initial synchronization and to allow the CMTS receiver to generate amplitude, frequency and phase error correction factors and equalization coefficients for that CM. This ranging/training burst can start in the first minislot of the contention interval defined by the IE. The burst size is given by the Burst Size in the burst attribute.

After the Start of Burst Detector 122 detects the Initial Station Maintenance burst, the Timing Recovery circuit processes the data. After the timing recovery circuit finishes processing the burst, it tells the Start of Burst Detector to start searching for another possible burst after the previous burst.

Start of Burst Search Window

The search of the Start of Burst is performed within a window. The window size is defined by the TDMA/SCDMA, IUC# and by the contents of two registers SOB_PRE_WINDOW and SOB_POST_WINDOW (not shown). For most of the burst types, except initial and periodic station maintenance, the window is defined by 2 registers. The PRE_WINDOW defines the start of the window before the anticipated Start of Burst location and the POST_WINDOW defines the end of the window after the anticipated start of burst.

The search window for the start of burst for Initial and Periodic Station Maintenance, which are burst types having IUC 3 & 4 for TDMA and IUC 3 & 12 for SCDMA is defined by the contents of a register STATION_MAINT_PRE_WINDOW (not shown).

The search window for Initial Station Maintenance burst lasts for all the allocated grant.

The search window, for Periodic Station Maintenance bursts (IUC=4 for TDMA and IUC=12 for SCDMA), will continue for half of the guard of the burst after the nominal location of the start of the burst. The guard for SCDMA IUC=12 can be any value that works.

Using a NULL SID is a way to increase the time-offset range of the modem by adding a no transmission region. For TDMA bursts IUC 4, an ENABLE_TDMA_NULL_SID control register can be added in some embodiments, which the CPU can enable in order to start the UW search from the beginning of the NULL SID. In alternative embodiments, the search for the start of burst for the periodic station maintenance burst behaves as a regular burst search and there no need to increase the window over the one used in a regular burst.

The Periodic Station Maintenance for SCDMA (IUC=4), which is an SCDMA burst, is not supposed to have a big time offset. In this case the window is within 1 symbol of the anticipated start of burst time, or +/−0.5 symbol. In the preferred embodiment, mainly IUCs 3 and 12 are used for SCDMA bursts. The IUC=4, which is in SCDMA mode, may also be used in alternative embodiments.

Time Offset Output

The time offset is output for each burst and not only for station maintenance bursts. The main use of the time offset output is for ranging using initial and periodic station maintenance bursts to maintain each CM's timing so as to be aligned with the minislot boundaries at the CMTS.

The time offset is composed of 2 portions: Coarse Time Offset and Fine Time Offset. The coarse time offset is output from the start of burst detector in units of symbols or half symbols. The fine time offset output is in units of a fraction of a symbol. The software of computer 20 will convert these two values into timestamp fraction units based on the symbol rate of the burst. DOCSIS 1.1/1.0 cable modems require downstream messages from the CMTS to specify ranging offsets in 6.25 usec/64 (1/10.24 MHz) resolution.

The coarse time offset is calculated by the difference between the expected location of the Start of Burst and the actual location where the start of burst was found. There is a counter (not shown but usually in timing and control circuit 222) that counts the number of samples that were read from the sample buffer until the start of burst was found relative to the starting point or reference point. The software of computer 20 converts the count of the counter to the desired value by subtracting the number of samples read before the start of burst and converts the counter value to time as required by MAC using the symbol rate value. The time offset can be output as a downstream message to the CM that sent the burst as a +/− value relative to the expected start of burst location or as an offset from the search start in alternative embodiments.

Burst Length

The burst length calculation depends on the burst type given by the IUC. For most of the burst types, the length in minislots described by the IE is inferred by the difference between the IE starting minislot offset and the minislot offset of the following IE.

In TDMA mode, when the last RS codeword is illegal, the burst size is shorter and the full grant is not utilized. In this case the modem does not transmit during the full grant and the guard is extended.

The controller will use the parameter Burst Length for the burst length in minislots. The Burst Length is equal to the Burst Size burst attribute for IUC 1 & 3.

Note that TDMA-within-SCDMA bursts (IUC 3 & 12 of SCDMA) burst length is calculated using SCDMA parameters, namely, an SCDMA minislot has CODES-PER-MS*SPREADING_INTERVALS_PER_FRAME symbols.

Preamble Power Modes

The preamble symbol power has two power levels referred to as Preamble Scaling Factors (QPSK-P0 or QPSK-P1) which represent high and normal power. If the preamble of the burst is transmitted in high power mode, all the received preamble symbols are normalized to normal power by the timing recovery circuit 135 so all the other circuits do not need to deal with the high power mode. Also the preamble symbol power will be normalized for all the preamble symbols in DOCSIS 1.0 16-QAM constellation.

Start of Burst Power

The expected range of the received burst power is different for data bursts and training bursts. Training bursts, especially the initial station maintenance burst, has a bigger range of received power (up to +/−15 dB). Note that when the burst's power is too high, the burst is subject to clipping by the A/D converter in the RF section 10 in FIG. 1.

The power threshold of the correlation for burst detection depends on the burst type.

Clock Frequency Offset

The clock frequency offset according to the DOCSIS specifictions is 50 ppm in TDMA mode. In SCDMA mode, a block converter in the cable plant may product only a carrier frequency offset. The maximum timing phase offset for 32 symbols is very small. In SCDMA, the CMs generate their upstream clocks from the downstream clock so there is no clock offset. The technology to generate the upstream clock from the recovered downstream clocks is described in U.S. patent application Ser. No. 09/074,036, filed May 6, 1998, entitled APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM which is hereby incorporated by reference. The timing phase offset due to the clock frequency offset is small, and does not affect the correlation output.

Carrier Frequency Offset

The correlation calculation in the start of burst detector needs to change when there is a big carrier frequency offset. The expected frequency offset in initial station maintenance bursts can be big and therefore requires changing the correlation calculation. The carrier frequency for initial station maintenance can be offset by more than 50 ppm. The frequency shift is a result of errors in the frequency agile cable modem oscillators and errors in frequency converters at the cable plant. Assuming that the total frequency offset is 100 ppm, carrier frequency of 65 MHz (Euro-DOCSIS) and TDMA symbol rate of 160 ksps, the 32-preamble symbols processed in initial station maintenance yields phase offset of $2*pi*65$ MHz*100 ppm*$1/160$ ksps*32 symbols=$2*pi*1.3$=468 degrees. Since the phase rotates more than 360 degrees in the correlation window, the correlation output is invalid. Therefore, the correlation needs to be divided into small pieces. The size of each piece is controlled by a software programmable register that depends on the expected frequency offset, TDMA/SCDMA mode, and mainly on the symbol rate. TDMA and SCDMA should have different programmable register.

If the output were absolute value rather than absolute-square, the correlation peak would not change relative to the previous case without the splitting into sub-correlations, but the sidelobe level will be higher. Thus, the threshold needs to be modified. Note that the time-offset estimate needs to be simulated also for this correlation with sections.

For TDMA data bursts, the phase offset in the correlation window is small, and there is no need to divide the correlation into sections. For frequency offset of 100 Hz and symbol rate of 160 ksps, the phase offset in a window of 32 symbols is $2*pi*100$ Hz*$32/160$ ksps=7.2 degrees. For SCDMA bursts, assuming the block converter frequency offset is 20 ppm or 65 MHz*20 ppm=1.3 kHz, the phase change inside the correlation window for 1.28 Msps is $2*pi*1.3$ kHz*32 spreading intervals/1.28 Msps=12 degrees, which is small. SCDMA initial station maintenance also does not have a problem because the phase offset in the correlator window is $2*pi*1.3$ kHz*32 symbols/1.28 Msps=11.7 degrees.

The threshold for TDMA initial and periodic station maintenance should be different than the TDMA data burst threshold.

The number of symbols per each section of the correlator is programmable according to the symbol rate and expected frequency offset. The possible number of symbols in each correlator section is 2, 4, 8, 16 or 32.

Correlation and Erasures

The received samples can have erasure indications. These samples should not be used in the correlation calculation. This can be done by zeroing the multiplication of the sample by s or by replacing the received sample by 0. When the number of erased samples is more than a programmable fraction of the UW, the correlation is automatically set to 0.

Implementation of the Correlator In the Start of Burst Detector 122

A shift register of 64*2 registers with alternate inputs of I and Q are used to do the correlation. Each fourth tap of the register is output for correlation calculation $(sum(I*s))^2$ and then $(sum(Q*s))^2$. Each tap has an inversion when s is −1. There is no addition of 1 for 2's complement because all the additions of ones are counted via a counter and are added with one adder at the end. Then adders are used to sum all the taps and at the end the value is squared. After a shift the same circuit is used for all the Q samples to calculate $(sum(Q*s))^2$.

The power is calculated using the same shift register. The average power is calculated for all the 64 samples, and it's not calculated differently for the odd and even samples. The previous power is updated by adding the new sample power and subtracting the old sample power. It's calculated by $(I1+jQ1)^2-(In+jQn)^2=(I1-In)*(I1+In)+(Q1-Qn)*(Q1+Qn)$. This requires only 2 adders and one multiplier for I or Q.

Preamble in DOCSIS 1.0/1.1 and Preamble Processor 124

The preamble symbols can be transmitted in different modes by legacy DOCSIS 1.0 and 1.1 CMs. Those modes are QPSK, 16-QAM, differentially encoded QPSK, and differentially encoded 16-QAM.

In DOCSIS 1.0/1.1 bursts, when the data is in 16-QAM modulation, the preamble symbols are also modulated in 16-QAM. Thus, a preamble pattern buffer in preamble processor 124 uses 4 bits for each preamble symbol. A portion of the preamble pattern buffer is dedicated for 16-QAM preamble symbols for DOCSIS 1.0. The head-end should program the preamble pattern buffer so the preamble symbols get the BPSK points of the 16-QAM constellation, located at the corners of first and third quadrants. The receiver should translate the preamble pattern buffer bits into 16-QAM symbols when the burst is in DOCSIS 1.0/1.1 mode and 16-QAM modulation. Each 4 bits in the preamble pattern buffer is converted to 1 bit representing a BPSK symbol.

Note that in differential encoding mode the preamble symbols are differentially encoded together with the data in a known manner, so the preamble processor has to decode them appropriately. The differential encoding is quadrant-differential encoding for uncoded QPSK and 16-QAM.

DOCSIS 1.0/1.1 Preamble in Differential Mode

The preamble symbols can be differentially encoded at the modem in 1.0 and 1.1 CMs. The preamble pattern buffer in the receiver 174 (FIG. 11) at the CMTS 168 should store the expected preamble bits after differential encoding. Thus, the preamble pattern buffer at the head-end is different from the preamble pattern sent to the cable modems. The MAC layer process will do the differential encoding according to the definition in DOCSIS 1.1 specification section 4.2.2.2, Symbol Mapping, table 4.2. Derivation of Currently Transmitted Symbol Quadrant. This is applied to QPSK and 16-QAM modulations. The modems do the preamble differential encoding via circuitry therein. A portion of the preamble pattern buffer will be devoted to the preamble in differential mode. It uses up to 32 QPSK (64 bits) and 16-QAM (128 bits) symbols.

Station maintenance bursts in differential mode require a long sequence for differential encoding.

The Start of Burst Detector and the Timing Recovery circuits are not sensitive to phase rotation; thus, they can deal with the received preamble symbols when they are differentially encoded. The Preamble Processor 124 recovers the phase of the received signal with ambiguity of 90 degrees when the preamble is differentially encoded depending on the initial state of the differential encoder at the modem. The ambiguity is resolved at a differential decoder 137 which is bypassed under control of the computer 20 or control circuitry 222 in the demodulator when differential encoding is not in use. Differential encoding of the preamble and data is used only in DOCSIS 1.0 CMs when the CMTS commands them to use this mode, but most TDMA 1.0 bursts are not differentially encoded and advanced PHY bursts are not differentially encoded. The differential decoder functions to decode only the differentially encoded bursts and is bypassed for all other bursts. Thus, this element is optional in systems where no DOCSIS 1.0 differentially encoded bursts will ever be transmitted. The 90-degree ambiguity does not interfere with the equalizer operation for station maintenance bursts. The differential decoder 137 receives its input from an inner deinterleaver 224.

Preamble Processor 124

Figure 16:
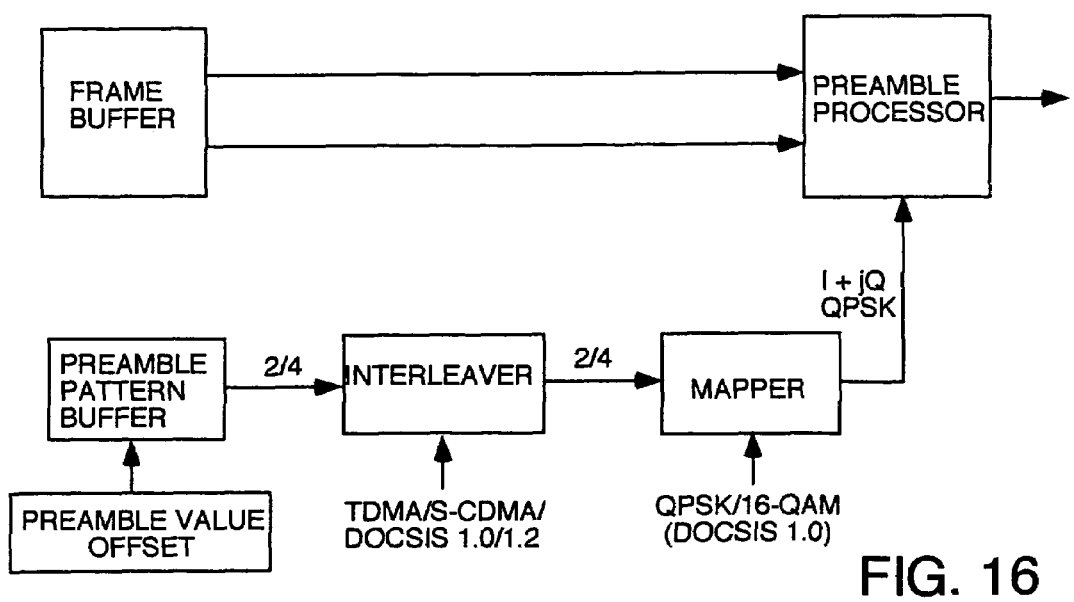
FIG. 16 is a more detailed diagram of the connections of the preamble processor.

The preamble process 124 receives the preamble symbols of training bursts and other bursts from the frame buffer 155 via switch 161 which is controlled by the timing and control circuit 222. A more detailed diagram of the connections of the preamble processor is shown in FIG. 16. The received preamble symbols are read from the frame buffer according to the time they are received. They are output together with a time index. The time index in SCDMA indicates the spreading interval number in the frame and in TDMA mode (including TDMA burst in SCDMA) the time index indicates the symbol number in the received sequence.

In SCDMA mode, when a burst is transmitted over more than one frame, there are pieces of data without the preamble portion. In this case the R/A continues to track the data.

The received signal can have frequency offset also in SCDMA mode when there is a block converter in the cable plant. The frequency-offset option in SCDMA can be turned off via a control register (not shown) which receives control input from any control circuitry that reads the IUC.

The preamble processor calculations of the initial gain, phase and frequency offsets are based on the best linear interpolator (least squares) of the received symbol phases. The calculation steps are:

Read the symbols from the frame buffer and calculate the amplitude and phase for each symbol;
Filter impulse noise according to amplitude;
Phase unwrap;
Filter impulse noise according to the normalized phase difference (frequency offset) (cancelled later to reduce latency);
Phase unwrap (cancelled later to reduce latency);
Calculate initial phase, frequency offset, gain offset and signal-to-noise ratio (SNR).

The preamble processor operates in the same way on data, ranging and training bursts. In training bursts, the first portion of the preamble is the same as in data bursts.

The preamble processor does not use symbols that are indicated as erased.

The preamble processor outputs to the MAC the frequency offset and received power of each burst. Typically this is done by the computer 20 in FIG. 1 reading registers in the preamble processor and passing along the data to the MAC process.

Rotational Amplifier 143

The rotational amplifier 143 functions to calculate the fine tuned gain, phase and frequency offset correction factors and use them to correct at least the data symbols of the burst. For training bursts, the preamble symbols are corrected and stored in the equalizer buffer 147 for use in developing equalization coefficients for the upstream transmissions of the transmitter that sent the training burst. The data symbols of training bursts are corrected and stored in the burst buffer 145. For data bursts after training has been accomplished, the data symbols of the burst are corrected and stored in the burst buffer 145, and the equalization circuitry (147, 232 and 149) is bypassed.

When a burst continues to the following frame and there is no new preamble, the R/A loop should continue to track the data without getting new initial values.

The loops are decision directed (DD) since the initial values obtained from the preamble processor are accurate enough.

In SCDMA mode, the input symbols to the R/A are read from the frame buffer over the codes of each spreading interval. The input symbols include also the received preamble symbols.

For each spreading interval, the R/A outputs a complex number which is used to correct all the symbols of the spreading interval. For each spreading interval the current R/A coefficient corrects all the symbols. The error is averaged over all the symbols per spreading interval, and the loop filter is run only once per spreading interval.

In ranging request and TDMA mode, the R/A corrects each symbol gain and phase. In SCDMA mode, the amplitude and phase corrections are done for each group of symbols. The symbols in a spreading interval are divided into small groups. The temporary R/A coefficient obtained from the small group of symbols will correct all the symbols in that group.

The R/A correction is done in a pipeline, which requires a double buffer of about 8 symbols. Note that tracking high frequency phase noise and AM hum are better when the correction is done after the R/A coefficient is corrected based on the symbols at the spreading interval.

Outputs for monitoring:
SNR per burst: The SNR of each burst is estimated by averaging the error signal, which is the difference between the received symbol and its hard decision in the decoder. The CPU 20 has a look-up table to convert the error value to SNR in dB. The initial SNR for the averaging can be the preamble SNR.
Averaged SNR: MIB for the average Signal/Noise of the upstream channel. The average can be done via the moving average scheme.
SNR per code: The average SNR for a predefined code is output for measurement of the SNR as required by a test defined in the standard.

Note the SNR should not include the case of collision. The AGC 139 does not get the burst data when a collision is detected in the start of burst detector 122.

The constellation points I & Q output by R/A 143 may be output to external pins for testing purposes.

The data output resolution to the equalizer 232 is 12 bits, but the output going to the burst buffer 145 is the same as the TCM decoder, which is 9 bits.

When Tomlinson/Harashima (T/H) clipping is on at the CM, the slicer constellation is extended and the slicer should deal with more constellation points. This extended slicer has an ENABLE signal in order to switch it off in the preferred embodiment, but not in other embodiments.

In order to save processing time, only the data symbols will be processed by the R/A (except for training burst which are long enough>64 symbols). In TDMA bursts, the initial phase of the first symbol will be calculated based on the preamble processor initial phase and frequency.

Preamble Gain And Phase Output Accuracy:

The TCM decoder 126 input resolution is 8+1=9 bits for 128-QAM. Therefore, the gain accuracy has to be less than $\Omega\hat{}8=0.25\%$. The required phase accuracy is $\arctan((\frac{1}{2}\hat{}8)/1)=0.2$ deg. The preamble processor accuracy will be $\frac{1}{4}$ of those values; namely the phase and gain resolution is 8+2=10 bits.

Preamble Length: The number of symbols in the preamble is programmable depending on the SNR and modulation. The preamble processor is able to process up to 64 symbols in the preferred embodiment, but more or fewer symbols are permissible. Note that the preamble in training bursts is generally longer than 64 symbols and the preamble processor will process only a portion of the preamble symbols.

The preamble processor has the following inputs:
    Received preamble symbols
    Time index (in SCDMA the spreading interval index)
    Erasure indication
    Preamble symbols read from the preamble buffer according to the Preamble Value Offset Control Registers In The Preamble Processor
    Frequency offset enable/disable in SCDMA mode: When SCDMA mode is active, the frequency-offset calculation can be disabled.

The received preamble symbols are read in the order they are received and not interleaved. In SCDMA mode the received preamble symbols are read from the frame buffer over the spreading intervals, where all the symbols from the first spreading interval are read first.

The preamble buffer symbols are read according to directions from the interleaver and converted to a complex signal by a mapper.

Note that when the number of preamble symbols is above 32 the preamble processor processes only 32 symbols. In SCDMA mode the preamble processor does not choose all the symbols from one spreading interval in the preferred embodiment. It takes only about (total preamble_symbol #)/(spreading_interval #) symbols from each spreading interval.

The preamble processor outputs a preamble SNR, which is an indication of the quality of the received preamble symbols. The preamble SNR is a number proportional to the received SNR of the preamble symbols or is an indication for collision when the SNR is very low. In order to simplify the implementation only the phase SNR is calculated.

The preamble symbols in DOCSIS 1.0 bursts are programmed as 16-QAM symbols when the data uses 16-QAM modulation. The MAC should program the preamble pattern memory into the BPSK or QPSK constellation points out of the 16-QAM points.

In 16-QAM mode, the preamble symbols are chosen to be a subset of the 16-QAM constellation. It can be the 4 extreme points, which have power above the average.

MAC Limitations

In SCDMA bursts, the preamble symbols should be limited to one frame, because the demodulator 14 in FIG. 1 uses the phase and gain obtained from the preamble to detect the data symbols received in the same frame. There is one exception to this requirement; which is when all the symbols of the burst in the frame are preamble and there are no data symbols in that frame. Then the preamble can extend to the next frame.

The preamble length for all the bursts except training will be equal or less than 64 symbols in the preferred embodiment.

In TDMA mode, the preamble symbols are not interleaved. They are interleaved only in synchronous TDMA and SCDMA bursts, so in embodiments which can receive STDMA bursts, the preamble processor either includes a deinterleaver or an interleaver that interleaves the preamble symbols programmed into the preamble pattern buffer (not shown) so that they are interleaved in the same way as the received preamble symbols.

The preamble processor needs to finish processing the preamble data before the next preamble of a burst arrives.

The are 2 worst cases to deal with when the symbol rate is 5.12 Msps:
    The smallest burst with minimum number of preamble symbols.
    The smallest burst with maximum (32) number of preamble symbols.

In the preferred embodiment, symbols are written into the burst buffer without correction because the rotational amplifier coefficients are obtained only after reading all the symbols of each spreading interval. In order to correct the symbols before writing them into the burst buffer, in alternative embodiments, another read phase is made of the symbols of the spreading interval stored in the frame buffer 155.

In TDMA mode a smaller portion of the frame buffer is used to store symbols to be processed by the preamble processor and rotational amplifier.

Burst Buffer 145

The burst buffer is used as a pipeline in order to allow the TCM decoder 126 more time to process the data. Otherwise, the TCM decoder, the preamble processor 124 and the R/A 143 will have to finish processing the data in one frame. If the TCM decoder is fast enough this pipeline is not necessary.

The burst buffer size is about 3 frames so it can store a couple of bursts up to the maximum storage available. The bursts are output from the burst buffer in FIFO mode.

Each burst is stored with its burst attributes, which define all the burst parameters such as modulation, TCM type and RS code parameters, etc.

The data in the burst buffer is read according to the deinterleaving algorithm by the inner deinterleaver.

Equalizer 232

The equalizer 232 processes the preamble symbols to converge on equalization filter coefficients that correct for channel impairments. The equalizer data buffer stores the identification data of the training bursts that define which CM transmitted the training burst. Block 232 represents any conventional equalizer in some embodiments, or the two stage equalizer used in the preferred embodiment that does both coarse and fine equalization convergences.

A summary of the operation of the equalizer is as follows. The equalizer 232 is only sent training bursts. The data portion of each training burst is stored in the equalizer data buffer 149, and the preamble portion is input to the equalizer to do a coarse equalization convergence. After coarse equalization, the data portion of the training burst is passed through the equalizer as a filter using the coarse equalization coefficients just derived to correct the data symbols that identify the CM that sent the training burst. The corrected data symbols are then passed on line 238 to the TCM Viterbi decoder 126 through the inner deinterleaver 224 (which may be bypassed if the data is not interleaved) and the differential decoder 137 (which is bypassed). The TCM Viterbi decoder 126 decodes the constellation points into the coded and uncoded bits which define which CM sent the training burst. These bits are sent to the MAC process through the same Reed-Solomon and descrambling circuitry that processes the data bursts. While this is happening, the equalizer re-runs the preamble bits of the training burst that are stored in equalizer buffer 147 iteratively to do a fine tuning equalization process. In some embodiments, the equalizer can re-run both the preamble bits and the data bits of the training burst through iteratively to converge on final adaptive equalizer filter coefficients to be convolved with the existing adaptive equalizer coefficients in the CM that sent the training burst for developing new adaptive coefficients for its subsequent upstream bursts. This fine equalization process results in final equalization coefficients that are output and/or stored for transmission downstream to the CM that transmitted the training burst. The MAC process then sends the equalization coefficients just derived to the CM that sent the training burst in a downstream message. The coefficients of the equalizer 232 are then initialized to receive the next training burst. When subsequent data bursts are sent, they are stored in the burst buffer 145 and the equalizer 232 does not filter them since they were equalized at the CM transmitter. From the burst buffer, they are processed through the inner deinterleaver 224, differential decoder 137 if necessary (only used for DOCSIS 1.0 ATDMA bursts which are differentially encoded and bypassed for all other bursts including all advanced PHY bursts) and the TCM decoder 126 to convert the constellation points or symbols that were received back to payload bits.

The T-spaced equalizer 232 is an 8-tap FFE filter and a 16-tap FBE filter. The LMS algorithm updates the taps. The resampler and the R/A 143 correct the symbol time, gain, phase and frequency before the data gets in the equalizer. This accelerates the equalizer convergence. The time offset and the equalizer coefficients are calculated using the same training burst.

The equalizer has two modes of operation:
TDMA: used for TDMA mode and TDMA training bursts in SCDMA mode
SCDMA: used for periodic station maintenance in SCDMA mode.

In SCDMA mode, the symbols are processed over codes and in TDMA mode the symbols are input sequentially over time.

In TDMA and SCDMA modes, the R/A has already corrected the phase and the amplitude of the stored symbols in the equalizer buffer.

An erasure indication is input to the equalizer in order to prevent updating the taps using erased symbols.

In the preferred embodiment, the received preamble symbols are recycled through the equalizer during the fine tuning of the equalization filter coefficients until a new training burst is received or until the preamble symbols are recycled N number of times as set by the cycle number parameter. The recycling enables the equalizer to converge utilizing a short training burst. If a new training burst arrives prior to completion of all the cycles, the calculation is terminated and the interim result is latched with reduced accuracy. The equalizer does not process the data portion at the end of each TDMA burst.

There are 3 types of training bursts:
Ranging (initial station maintenance) in TDMA mode
Periodic training in TDMA mode
Periodic training in SCDMA mode (only SCDMA mode)

In order to reduce the complexity, the equalization process has two programmable convergence step sizes: a larger step size for coarse equalization convergence, and a smaller step size for fine equalization convergence:

Coarse equalization: the equalizer uses a larger, programmable adaptation step value and adapts only 4 of the most significant FFE (out of 8 total FFE tap coefficients) and 4 of the most significant FBE (out of 16 total FBE taps) coefficients, although in alternative embodiments, any other number of coefficients can be used and the step size can be fixed and larger than is used in the fine equalization. If there is no new training burst the equalizer continues to the fine equalization mode. This mode needs to be finished before the following training burst (if available) is processed. When there are two consecutive training bursts, as may occur in ranging, the equalizer will adapt only 8 coefficients.

Fine equalization: the equalizer uses a smaller, programmable adaptation step value and all the 24 FFE and FBE coefficients are adapted. In alternative embodiments, the step size can be fixed and smaller than is used in the coarse equalization. The equalizer switches to this step automatically after filtering the data portion of the training burst using the results of the coarse equalization.

There is a programmable register that controls the number of cycles in fine equalization.

A better equalizer implementation in an alternative embodiment employs phase correction inside the equalizer. The phase correction loop processes the data after the FFE. This gives better performance because the phase is corrected after equalization. The equalizer outputs the frequency offset too in this alternative embodiment for transmission to the CM to adjust its frequency.

The equalizer outputs are:
Equalizer coefficients (8 FF & 16 FB)
Equalizer final SNR The equalizer control parameters are:
Adaptation step for coarse equalization
Adaptation step for fine equalization
Cycles number for fine equalization
Enable/disable DFE & FFE (for testing)
The tap coefficient initial values are programmable so the CPU can load initial values for all the coefficients into initial coefficient registers. Each time the equalizer starts processing a new burst, it will initialize the coefficients using the initial coefficient registers. The default value is 0.5 for the main tap and the rest are zeros.
The main tap location for linear FFE is programmable for DOCSIS 1.0

The equalizer main inputs are:
Data
Erasure

The equalizer control inputs are:
Code 0 location per spreading interval (in SCDMA mode) (up to 32 complex values) & training burst offset code number
TDMA/SCDMA training burst mode
Preamble Pattern memory (1536 bits)
Preamble Value Offset
Interleaver parameters (for preamble) (Codes per Subframe, Symbol Step Size, Spreading Intervals per Frame, SCDMA Interleaver Enable/Disable)

Figure 15:
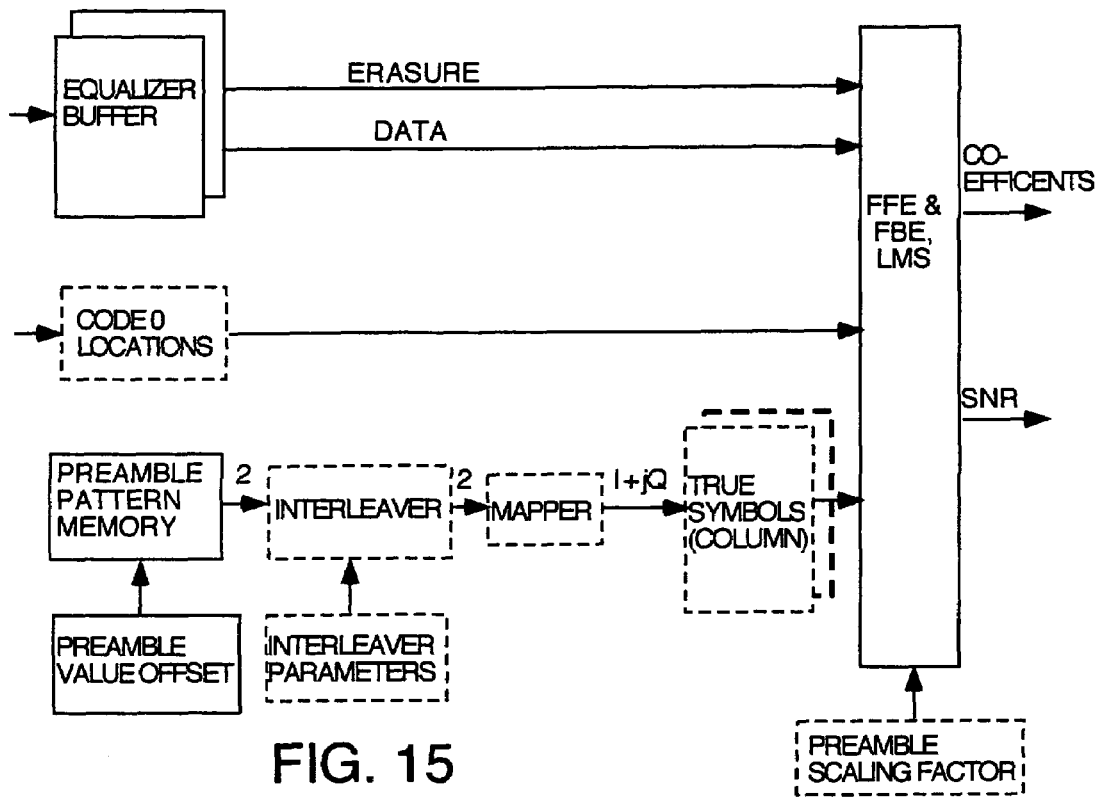
FIG. 15 is a more detailed diagram of the connections of the equalizer.

FIG. 15 is a more detailed diagram of the connections of the equalizer. Circuits surrounded by dashed lines are used only to process SCDMA training bursts. The preamble scaling factor is only used in some alternative embodiments.

The data portion of the training bursts is transferred to the burst buffer 145 and the Trellis decoder 126 for decoding and to the equalizer buffer 147 for equalization.

Code 0 Effect on the Equalizer

Code 0 is not a cyclic shift of the other codes like every other code. Therefore, the equalizer should not use the symbols transmitted in code 0 and needs to know in which minislot code 0 data was transmitted. The location of code 0 for each spreading interval needs to be transferred to the equalizer from the code-hopping block 120 in embodiments where code hopping is used. Therefore, the equalizer has to have a memory that stores all the code hopping offsets of the frame, up to 32 values of 7-bit each. An alternative embodiment approach is to implement a code hopping random number generator in the equalizer block. When the equalizer recycles the data, the random number generator has to be initialized properly. When the number of active codes is less than 128, code 0 is not used, so the above described circuitry is not necessary if the number of active codes is always less than 128. All the other codes in the sample buffer are cyclic shift of each other including the pair of code 1 and code 127.

Inner Deinterleaver 224

The inner deinterleaver is essential to receive advanced PHY SCDMA bursts that are Trellis Code Modulated and functions to undo the interleaving done by the CM prior to Trellis encoding payload bits into SCDMA constellation points. The inner deinterleaver deinterleaves both the coded and uncoded bits that define constellation points, although, ideally, it would deinterleave only the coded bits. The uncoded bit interleaver 230 undoes the effects of the inner deinterleaver on the uncoded bits of the TCM constellation points by reinterleaving the uncoded bits to get them back to the state they were in before the inner deinterleaver 224 deinterleaved all the bits of each constellation point. Together, these two deinterleavers 224 and 230 undo the interleaving carried out in the transmitter. The coded bits are encoded with a redundant bit at the transmitter to overcome the effects of burst noise. The uncoded bits are interleaved at the transmitter and grouped in RS groups to minimize the effects of burst noise. The method of interleaving the one dimensional array of symbols to be transmitted in CDMA bursts in two dimensions one being the code axis and the other being the time axis is disclosed in EPO publication 0987850, published Mar. 22, 2000, which is hereby incorporated by reference. The two deinterleavers undo the effects of this 2-D interleaving.

The inner deinterleaver 224 has an SCDMA mode and a TDMA mode and only deinterleaves TCM TDMA or SCDMA bursts and is bypassed for non TCM bursts. The deinterleaver can be disabled depending on the latency requirements and channel characteristics in the preferred embodiment.

The burst buffer 145 and the equalizer data buffer 149 have similar features. They both hold the data portion of a burst. The equalizer 232 and the carrier recovery 141 should output the data symbols of the data portion of a burst as a vector (in SCDMA and TDMA modes) without the preamble symbols. The input cell to the inner deinterleaver 224 should be divided into vectors, each according to the data in a frame for SCDMA. The output cell from the inner deinterleaver consists of one burst and is divided into vectors, each with length of sub-frame in SCDMA mode and interleaver segments in TDMA mode. The inner deinterleaver builds the matrix and the sub-frames according to the burst parameters including the preamble length, sub-frame length, frame parameters (number of codes and spreading intervals) etc. For SCDMA CMs, there are no interleavers (inner & RS) for TDMA station maintenance bursts (IUC 3 & 12). For TDMA TCM bursts, the block size is 2048 TCM coded subsymbols or 2048*3*n bits maximum, where n=8 soft decision bits.

For SCDMA TCM bursts, the address to the burst buffer is calculated according to interleaved symbols. The data resolution is the same as the TCM decoder. In the preferred embodiment, the TCM deinterleaver processes the data without the preamble symbols, but in other embodiments, the preamble symbols may be included if they are interleaved. In other embodiments, the inner deinterleaver is structured to deinterleave bit interleaved code modulation TDMA and SCDMA bursts.

For TDMA TCM bursts, the block size is 2048 TCM coded subsymbols or 2048*3*n bits maximum, where n=8 (TBD) soft decision bits.

TCM Viterbi Decoder 126

The Trellis Code Modulation Viterbi decoder 126 can be any TCM decoder that implements a polynomial defined by the DOCSIS standards. The TCM decoder is essential to detect the payload data bits encoded in Trellis Code Modulation (TCM) constellation points of advanced PHY SCDMA and TDMA bursts. When bursts are not Trellis code modulated, the TCM Viterbi decoder portion of the circuit is bypassed and a conventional slicer type hard decision decoder is used to determine which constellation point each received symbol is and output the bits that map to that constellation point. The TCM decoder 126 can also be a known type soft output Viterbi algorithm (SOVA) to output coded and uncoded bits along with an erasure indicator that indicates how confident the Viterbi decoder is that its decision was correct. The erasure indications are then used along with the Reed-Solomon parity symbols to detect and correct at least some errors in said codewords. In this class of embodiments, the slicer is also a known type of slicer which outputs the bits of each received symbol/constellation point along with an erasure indication indicating the degree of confidence the slicer has in its decision. The slicer's erasure indication is also used by the Reed-Solomon decoder circuitry to decode the Reed-Solomon codewords. The Reed-Solomon decoder circuitry used in this class of embodiments which can use SOVA or slicer erasure indications is known.

The TCM modulator at the CM convolutionally encodes only some of the payload bits that go into each constellation point. Other uncoded bits are then combined with the encoded bits to define the constellation point.

The Viterbi decoder 126 decodes the TCM bits of the constellation point and then figures out from those bits what the uncoded bits were and outputs all the bits on line 228. An uncoded bit interleaver 230 then deinterleaves the uncoded bits, and is essential to complete the deinterleaving of TCM encoded SCDMA bursts.

The TCM (trellis) decoder gets input symbols or constellation points with erasure indications for each symbol.

The programmable register branch metric clipping value sets the maximum branch metric value. When the channel has impulse noise, the branch metric clipping value is set to a small value so the impulse noise can be corrected. When the channel is characterized with white noise only, the branch metric clipping is set to a greater value.

In TDMA mode, the TCM branch metric calculation should take into consideration the Tomlinson-Harashima clipping at the precoder.

The TCM decoder has a TCM mode and a bypass mode.

The TCM decoder outputs the corrected symbols and the normalization rate of the path metric. The normalization rate is proportional to the input SNR.

For continuous data transmission, the input signal phase can be rotated by n*pi/2 without ability for detection and correction. Therefore, when the normalization rate is too high above a programmable threshold, the input phase of the signal at the TCM decoder input should be increment by 90 degrees. When the phase is corrected, the normalization rate should be reset and recalculated in a predefined window. The rotation has an enable/disable mechanism in some embodiments. The TCM decoder outputs data with an erasure bit. The output data is divided into coded bits and uncoded bits. The erasure bit indicates whether the uncoded bits are erased. When SOVA TCM decoding is not used, the coded bits do not have erasure indications.

The TCM decoder 126 outputs erasure bits for the uncoded bits. This is implemented in TCM mode and also when the TCM decoder is bypassed. An assumption has been made in the preferred embodiment that for typical impulse noise, the TCM decoder will not have error in the coded bits due to the coding. The RS decoder 128 combined with the RS degrouper 240 will improve the BER performance.

The TCM decoder gets its erasure input from the impulse detector 112. The TCM decoder 126 also outputs for monitoring the number of erasure bytes in RS codeword. The rate adaptive algorithm will use the erasure count for finding the optimal number of RS information bytes (k) in a codeword.

The erasure output has an ENABLE/DISABLE capability in the preferred embodiment, but not in other embodiments.

When the burst is not Trellis code modulated, an erasure bit for the uncoded bits is output when one of the following occurs:

The input erasure indication is active.

The input signal power is bigger than a programmable threshold.

When the difference between the distance of the received signal and the two closest constellation points is smaller than a programmable threshold.

When the burst is Trellis code modulated, an erasure bit for the uncoded bits is output when one of the following events occurs:

The input erasure indication is active.

The input signal power is bigger than a programmable threshold.

The difference between the branch metrics of the two closest parallel paths in the trellis is smaller than a programmable threshold generates a temporary erasure bit. After a temporary erasure bit, the Add Compare Select (ACS) circuit (not shown) selects the appropriate erasure for a state between all the possible paths. Then a trace-back processor (not shown) decides the final erasure bit output.

When the input symbol power is above a programmable threshold or the input symbol is erased, the branch metric is set to 0.

An ENABLE/DISABLE option for this feature is present in the prior art.

Uncoded Bit Interleaver 230

After the TCM decoder the uncoded bits need to be interleaved in order to cancel the deinterleaving of the uncoded bits which were done together with the coded bits at the TCM deinterleaver. Note that at the transmitter only the coded bits were interleaved. There are two modes: TDMA and SCDMA. The coded symbols are obtained in the correct order and are received in a vector. The uncoded bits are then converted to a matrix to perform the interleaving.

In SCDMA mode, The TCM decoder 126 outputs bits together with the erasure indication bit and these bits are stored in a double buffer (not shown) with the size of a sub-frame in the uncoded bit interleaver. The uncoded bits together with the erasure indication bit are interleaved and the correct pairs of coded and uncoded bits with erasure indication are output to the RS degrouper 240.

In TDMA mode, the operation is similar, but the required memory is smaller.

A switch 226, under control of the computer 20 or control circuitry 222 in the demodulator, couples the inner deinterleaver to the output of the equalizer data buffer 149 for training bursts and to the output of the burst buffer 145 for data bursts.

The differential decoder gets the last received preamble symbol, which is used to differentially decode the first data symbol. It is assumed that that the differential encoder uses a random initial phase. The AGC and Carrier Recovery circuits 139 and 141 and the Equalizer 232 will output to the Burst Buffer 145 and to the Equalizer Data Buffer 149, respectively, the last preamble symbol in differential encoder mode.

RS Degrouper 240

The upstream transmission is divided into Reed-Solomon (RS) codewords each of which has data bits and RS parity bits. The concatenation of these bits is divided into bytes. When these bytes entered the Trellis encoder in the transmitter, some bits of each byte were mapped to the uncoded bit inputs of the Trellis encoder, and the rest of the bits of each byte were mapped to the coded bit inputs. The RS degrouper 240 reverses this mapping by receiving the uncoded and coded bits at its input 242 and mapping them back into the Reed-Solomon byte stream of the codewords. This byte stream can be deinterleaved and decoded as necessary.

The RS degrouper has two modes depending upon whether Trellis coded modulation is on or off. It uses the TCM mode burst parameter that travels with the data of every burst to set its mode. The RS degrouper needs to calculate the parameter of the block based upon the burst length.

Descrambler 244

The descrambler does the same operation as the scrambler in the CM transmitter but only for bursts that are scrambled. For other bursts, that are not scrambled, the descrambler is bypassed by the scrambled burst parameter.

RS Deinterleaver 246

The RS deinterleaver 246 deinterleaves the bytes of the RS code words so as to put them back into the order in which they arrived at the RS encoder in the CM transmitter. The RS deinterleaver is active only in TDMA mode. The RS deinterleaver improves performance in the presence of impulse noise, but with increased latency. Data is written into the deinterleaver's internal double buffer by columns and read out by rows. The RS deinterleaver uses the RS encoding parameters in the burst profile data such as the T value and RS codeword length to properly deinterleave the byte stream of RS codewords output by the RS degrouper 240 and descrambler 244.

The block segment memory size is $I_r$ rows by N columns, where N is the RS codeword length in bytes and $I_r$ is the deinterleaver depth in bytes. There are two modes of operation:

Fixed interleaver depth ($I_r$) mode
Dynamic interleaver depth ($I_r$) mode

In fixed interleaver depth mode the block size of each interleaver segment is defined by the MAC parameters ($I_r$ & N). The MAC sets the interleaver depth Ir according to the latency requirement and expected impulse noise. The maximum possible value of the interleaver depth (calculated by the CPU) is $$I_{r,max}=\text{floor}(2048/N)$$

In dynamic interleaver depth mode, the number of rows in each deinterleaver segment is optimally configured. The number of rows in each segment is more or less the same which avoids having the last small segment as occurs in fixed interleaver depth.

RS Decoder 128

The RS decoder 128 receives the RS codewords and uses the RS parity bits to correct any errors.

The RS decoder inputs are:
Data (8 bits)
Erasure (1 bit)

The RS decoder uses erasure input in order to double the impulse noise correction capability.

There is an internal buffer of one RS word at the RS decoder input. The size of the buffer is 255 bytes and 255 bits for erasure indication. Note that the erasure indication does not have to be stored in a buffer because it can be processed immediately after it arrives by the RS decoder.

The RS is programmable: T=0–6 up to N=255. Last code word is selectable fixed or programmable. When T=0, the RS decoder is bypassed. In bypass mode the smallest "codeword" has 6 bytes for REQ bursts.

The MAC interface 248

The MAC interface 248 functions to output the decoded data to the MAC layer process executing in computer 20. In some embodiments, the MAC interface formats the data into whatever format the particular MAC uses. In other embodiments, the data is simply stored in a buffer and an interrupt is generated to the MAC to retrieve the data. In other embodiments, the data is stored in a buffer, and the MAC periodically polls the buffer to retrieve new data. In the preferred embodiment, the MAC interface includes three lines. A data line carries user payload data from the data bursts or CM identification data from training bursts. A measurements line carries the measurements obtained in the demodulator such as power, time offset, frequency, signal-to-noise ratio, equalizer coefficients, etc. Any of these messages can be masked in the preferred embodiment, but not in alternative embodiments. In the preferred embodiment, the MAC can enable the output of the measurements only for particular SID numbers so that the MAC can average the numbers for each specific SID. A third line carries control data from the MAC to the demodulator such as the channel parameters, the burst parameters (UCD) and the MAP (assignments are stored in a buffer in the demodulator).

Measurements and other data are typically sent to the computer 20 using a serial port with a programmable nominal clock rate. When a circuit in the demodulator that makes measurements is disabled for a burst, it outputs a measurement of 0.

A collision indication from the start of burst detector can be output on the status line if power is over a predetermined threshold and the UW is not detected after a predetermined number of symbols. The MAC also calculates a CRC on the data portion of such a burst to determine if a collision has corrupted the data in some embodiments.

In embodiments where the data does not need to go to the MAC, this block is optional. Where broadband internet access is one of the services being provided, the MAC layer process, among other things, strips off the cable MAC headers. In a typical environment, a computer that wants to browse the internet is coupled to the cable modem. It converts a request from the user into a TCP packet which is encapsulated into an IP packet when is then encapsulated into an Ethernet packet and transmitted over an Ethernet physical layer to the cable modem. The cable modem MAC layer strips off the Ethernet PHY layer header and adds a cable DOCSIS MAC layer header which contains data defining the burst parameters and sends the burst to the CMTS.

The CMTS MAC layer strips off the cable DOCSIS MAC layer header and sends the TCP/IP packet out to the internet.
start here Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A digital data receiver, comprising:
first means for suppressing frequencies in an input spectrum other than the frequency components of a desired carrier and digitizing at least said desired carrier;
second means for recovering data encoded in one or more burst type transmitted at different times on the same frequency subchannel, said bursts being any of a plurality of different burst types, and for recovering data encoded in two TDMA bursts transmitted at the same first symbol rate on two adjacent frequency channels during a first interval as well as the data from multiple services encoded in an SCDMA burst transmitted during a second interval that does not overlap said first interval and having a symbol rate which is twice as high as the symbol rate of said TDMA bursts and transmitted on a frequency channel having a center frequency approximately at the boundary frequency between said two adjacent frequency channels on which said TDMA bursts were transmitted, said burst types characterized by at least the following characteristics: DOCSIS 1.0 or 1.1 time division multiplexed; advanced PHY time division multiplexed or synchronous code division multiplexed, and any one of a plurality of different symbol rates and modulation types; and having programmable interleaving depth and block size, and being or not being Trellis code modulated; and
means for controlling said first and second means to operate correctly to receive the particular type of burst or bursts being received on one or more selectable frequency channels.

2. An apparatus comprising:
a filtering, mixing and digitizing circuit for receiving a spectrum of radio frequency signals and suppressing unwanted frequencies to leave a band of frequencies including a desired carrier frequency modulated with digital data, and for altering the frequency of at least said desired carrier to the center frequency of the passband of a narrow passband bandpass filter having a passband bandwidth matched to the bandwidth of the highest symbol rate burst that can be received, and for filtering said band of frequencies to remove more unwanted frequencies, and for performing intermediate frequency sampling and analog to digital conversion in an analog to digital converter on the output signal from said narrow passband bandpass filter;

a demodulator circuit for recovering the data transmitted in one or more burst type transmitted at different times on the same frequency subchannel, said bursts being any of a plurality of different burst types characterized by a plurality of programmable characteristics, said demodulator including at least a decimation and programmable bandwidth, digital matched filter for filtering out frequencies outside the bandwidth of the burst based upon the symbol rate of the burst, and a despreader circuit which can be bypassed for despreading the spectrum of code division multiplexed bursts, and a timing recovery circuit to recover the upstream symbol clock of at least TDMA bursts, and a master upstream clock for use in receiving SCDMA bursts, and a start of burst detector for measuring the time offset of the start of TDMA training bursts from a specified reference time for use by transmitters which transmitted said training bursts to achieve frame synchronization, and including a rotational amplifier to calculate and track phase, amplitude and frequency correction factors from the preamble of at least training bursts and use the correction factors to correct phase, amplitude and frequency errors in received symbols, and including an adaptive equalizer circuitry to develop equalization coefficients from the preamble of training bursts, and including deinterleaver and slicer detector circuitry for detecting the bits encoded in each received symbol and including a Trellis code modulation Viterbi decoder which detects the coded and uncoded bits of each received symbol in Trellis code modulated bursts and which is bypassed for non Trellis code modulated bursts, and including circuitry to deinterleave and detect the data bits encoded in transmitted constellation points of Trellis encoded SCDMA bursts, and including a descrambler that can be bypassed to unscramble scrambled bursts, and including programmable Reed Solomon deinterleaver and decoder circuitry to deinterleave and error correct Reed Solomon codewords encoded in said received symbols; and a computer coupled to said demodulator and to said filtering, mixing and digitizing circuit and programmed to read said timing offset and equalization coefficients for transmission to transmitters which transmitted said training bursts and programmed to generate downstream messages for transmission to said transmitters which control which burst types each transmitter can send and when, and programmed to control the configuration and operation of said demodulator and said filtering, mixing and digitizing circuits to correctly receive said bursts in accordance with the burst type being received.

3. The apparatus of claim 2 wherein said computer is programmed to control said demodulator and said filtering, mixing and digitizing circuit to correctly receive any burst having predetermined combinations of the following characteristics:

DOCSIS 1.0 or 1.1 time division multiplexed;
advanced PHY time division multiplexed or synchronous code division multiplexed, and
any one of a plurality of different symbol rates and modulation types; and
having programmable interleaving depth and block size; and being or not being Trellis code modulated; and being differentially encoded or not for predetermined TDMA bursts; and
being Trellis code modulated or not; and
having a programmable preamble length and programmable preamble type; and
having a programmable Reed Solomon T value, and a programmable Reed Solomon codeword length; and
having a programmable scrambler seed value and being scrambled or not scrambled; and
having a programmable maximum burst length in minislots, and a
programmable guardtime in symbols between different intervals and having a
programmable last codeword length; and
having a programmable byte interleave depth, and a programmable byte interleaver block size; and
having a programmable number of codes per subframe for SCDMA bursts and a programmable SCDMA interleaver step size.

4. The apparatus of claim 2 or 3 wherein said computer is programmed to control said demodulator and said filtering, mixing and digitizing circuit to also correctly receive data encoded in two TDMA bursts transmitted at the same first symbol rate on two adjacent frequency channels during a first interval as well as the data from multiple services encoded in an SCDMA burst transmitted during a second interval that does not overlap said first interval and having a symbol rate which is twice as high as the symbol rate of said TDMA bursts and transmitted on a frequency channel having a center frequency approximately at the boundary frequency between said two adjacent frequency channels on which said TDMA bursts were transmitted.

5. The apparatus of claim 2 or 3 wherein said Trellis code modulation Viterbi decoder is structured to use a soft output Viterbi algorithm and outputs both the coded and uncoded bits of each received symbol as well as an erasure indication for said coded bits indicating the degree of confidence in the decoding of said coded bits, and wherein said Reed Solomon deinterleaving and decoding circuitry is coupled to receive said erasure indications for said coded bits from said Viterbi decoder and functions to use said erasure indications as well as Reed Solomon parity symbols added to each codeword to detect errors therein and correct at least some of said errors.

6. The apparatus of claim 2 or 3 wherein said slicer detector outputs the bits encoded in each received symbol as well as an erasure indication for said coded bits indicating the degree of confidence in the decoding of said bits, and wherein said Reed Solomon deinterleaving and decoding circuitry is coupled to receive said erasure indications from said slicer and functions to use said erasure indications as well as Reed Solomon parity symbols added to each codeword to detect errors therein and correct at least some of said errors.

7. The apparatus of claim 2 or 3 wherein said adaptive equalizer circuitry is structured to perform a coarse and fine filter coefficient convergence process with programmable step size.

8. The apparatus of claim 2 or 3 wherein said adaptive equalizer circuitry is structured to perform a coarse and fine filter coefficient convergence process such that during coarse equalization, the adaptive equalizer uses the known preamble symbols of a training burst using a relatively larger step size to adapt only a subset of the most significant feed forward tap coefficients of an FFE filter and a subset of the most significant feedback equalization filter tap coefficients of an FBE filter during the coarse equalization and then iteratively passes at least the preamble symbols of said training burst through said equalization circuitry to do a fine adaptive equalization convergence using a smaller step size to adapt all the tap coefficients of said FFE and FBE filters.

9. The apparatus of claim 2 or 3 wherein said adaptive equalizer circuitry is structured to perform a coarse and fine filter coefficient convergence process using programmable step size such that during a coarse equalization convergence, the adaptive equalizer uses the known preamble symbols of a training burst that includes known preamble symbols prepended to a data portion that identifies the transmitter that sent said training burst, said coarse equalization convergence performed using a relatively larger step size to adapt only a subset of the most significant feed forward tap coefficients of an FFE filter and a subset of the most significant feedback equalization filter tap coefficients of an FBE filter and then filters the data portion of said training burst using the coarse coefficients and forwards the filtered data portion of the training burst to other circuitry in said demodulator for detection, and then, automatically switches to a fine equalization convergence wherein said equalization circuitry iteratively passes at least the preamble symbols of said training burst through said equalization circuitry to do a fine adaptive equalization convergence using a smaller step size than was used during said coarse equalization convergence so as to adapt all the tap coefficients of said FFE and FBE filters to the final equalization tap coefficients to be sent to the transmitter which transmitted said training burst.

10. An apparatus comprising:
a broad passband bandpass filter;
a mixer having one input coupled to said bandpass filter and a local oscillator input for receiving a local oscillator signal, and having an output;
a local oscillator having an output frequency signal coupled to said local oscillator input;
a narrow passband filter coupled to said output of said mixer for outputting at least a desired signal;
an analog to digital converter coupled to digitize the output of said narrow passband filter for generating digital data samples of at least said desired signal;
a configurable demodulator capable of recovering data transmitted in said desired signal in bursts, said bursts being any one of the following types on the same or different frequency channels: DOCSIS 1.0 or 1.0 time division multiplexed (TDMA) bursts or advanced PHY time division multiplexed or advanced PHY synchronous code division multiplexed (SCDMA) bursts;
and wherein each burst can have a predetermined one of a plurality of different symbol rates and a predetermined one of a plurality of different modulation types;
and wherein each burst may be Trellis code modulated or not; and
a computer coupled to said demodulator and programmed to configure said demodulator properly to receive the particular type of burst to be received by writing burst parameters into a burst parameter memory, said configurable demodulator having a timing and control circuit which uses said burst parameters in said burst parameter memory to control and configure said demodulator properly to receive the type of burst being received.

11. The apparatus of claim 10 wherein said local oscillator is frequency agile and has a frequency control input for receiving a frequency control signal which controls what frequency the local oscillator outputs, and wherein said computer is coupled to said frequency control input and is programmed to generate a frequency control signal at said frequency control input which causes said receiver to tune to the desired carrier frequency.

12. The apparatus of claim 10 wherein said demodulator is further structured so as to be capable of receiving different type bursts defined by the following burst parameters: scrambled or not and scrambler seed; variable byte interleaver depth and block size; differential encoding on or off; programmable preamble length, programmable preamble value offset, programmable preamble type, programmable Reed Solomon error correction T value between 0 to 16; programmable Reed Solomon codeword length; programmable maximum burst length in minislots; programmable guardtime for TDMA and SCDMA bursts; programmable last codeword length; a programmable number of spreading codes per subframe; and programmable SCDMA interleaver step size.

13. The apparatus of claim 10 further comprising a narrowband excision circuit coupled to process the digital data output by said analog to digital converter to remove narrowband interference and supply the processed data to said demodulator.

14. The apparatus of claim 10 further comprising a transmitter coupled to said computer for transmitting downstream data and messages to transmitters which transmit said bursts, and wherein said demodulator comprises:
a burst parameter memory for storing burst parameters, channel characteristics and MAP messages stored therein by said computer;
a timing and control circuit coupled to use said information in said burst parameter memory to control the circuits of said demodulator;
a decimation and matched filter circuit that is configured by said computer to have a bandwidth for the matched filter which matches the bandwidth of the burst to be received;
a despreader that is configured by said computer to be bypassed for TDMA bursts;
a code hopping circuit that is configured by said computer to be bypassed for TDMA bursts;
a sample buffer for storing data of at least one burst;
a timing recovery circuit that is configured by said computer to recover the sample clock from the data symbols of TDMA bursts, said receiver using a master upstream symbol clock in said receiver to receive data symbols of SCDMA bursts;
a start of burst detector that is configured by said computer to receive the preamble of at least training bursts and at least measure a time offset thereof from a reference time for transmission downstream to the transmitter which sent said training burst;
a preamble processor that is configured by said computer to deinterleave the preamble symbols if necessary and process the preamble symbols of at least some of said bursts to develop initial gain, phase and frequency offset correction factors;
a rotational amplifer that is configured by said computer to receive the data symbols of each burst following the preamble symbols and coupled to receive said initial gain, phase and frequency offset correction factors and functioning to fine tune said initial gain, phase and frequency offset correction factors and track said correction factors as said data symbols are received and use said correction factors to receive said data symbols;
an equalizer means that is controlled by data output by said computer to receive the preamble symbols of at least one training burst from a transmitter and functioning to use said preamble symbols of said training burst to iteratively converge in coarse and fine equalization convergence intervals on equalization filter coefficients that correct for channel impairments that affect transmissions from the transmitter which transmitted said training burst, and wherein said computer is programmed to control said transmitter to transmit the final equalization coefficients to said transmitter for use in deriving new equalization coefficients;

a burst buffer that is configured by said computer to receive corrected data symbols output by said rotational amplifer;

an inner deinterleaver that is configured by said computer to receive at least the data of advanced PHY SCDMA and TDMA Trellis coded modulation bursts including training bursts and deinterleave the uncoded and coded bits to undo the interleaving of said coded bits performed by the transmitter prior to Trellis encoding said coded and uncoded bits when the received SCDMA burst is Trellis code modulated, and is configured by said computer to be bypassed for non Trellis code modulated bursts;

a differential decoder coupled to receive the output from said inner deinterleaver that is configured by said computer to decode differentially encoded TDMA bursts but is bypassed for all other bursts;

a Trellis coded modulation decoder/slicer that is configured by said computer to decode the coded and uncoded bits of Trellis coded constellation points of advanced PHY TDMA and SCDMA TCM bursts and is configured by said computer to determine which constellation point corresponds to each received symbol in non TCM bursts and output the data bits that correspond to each said constellation point;

an uncoded bit interleaver that is configured by said computer to interleave the uncoded bits output by said Trellis coded modulation decoder to undo the effects of said inner deinterleaver on said uncoded bits and outputting the coded and uncoded bits, and is configured by said computer to be bypassed for non Trellis code modulated bursts;

an Reed Solomon degrouper controlled by said computer to receive the coded and uncoded bits and controlled by said computer to reverse the mapping of some bits from each Reed Solomon codeword byte to the uncoded bits and coded bits inputs of a Trellis coded modulator in the transmitter so as to output a Reed Solomon byte stream of codewords;

a descrambler that is configured by said computer to unscramble the data of bursts that are scrambled but to not affect the data of bursts that are not scrambled;

a Reed Solomon deinterleaver that is configured by said computer to correctly deinterleave said byte stream of Reed Solomon codewords;

a Reed Solomon decoder to receive said Reed Solomon codewords and use the error detection and correction bits therein to correct the payload bits thereof; and a MAC interface for transmitting said payload bit data output from said Reed Solomon decoder to a MAC process, and for transmitting measurements made by said demodulator to said MAC process and for receiving control information from said MAC process and storing at least some of said control information in said burst parameter memory.

15. The apparatus of claim 14 wherein said Trellis coded modulation decoder/slicer is a SOVA TCM decoder which outputs erasure indications along with the coded and uncoded bits corresponding to each received symbol and a slicer which outputs erasure indications with the bits that correspond to each received symbol, and wherein said Reed Solomon decoder includes an erasure indication input coupled to receive said erasure indications, and is structured to use said erasure indications along with Reed Solomon parity bits appended to each Reed Solomon codeword transmitted in a burst to detect and correct at least some of the errors in said codewords.

16. A process carried out in a digital data receiver comprising:

filtering out unwanted radio frequency signals and digitizing the radio frequency components of a desired radio frequency carrier that remain;

storing burst parameters of one or more bursts encoded into said radio frequency carrier in a burst parameter memory and using said burst parameters to select and configure circuitry that carry out the processing steps necessary to recover the payload data encoded in said burst;

despreading the spectrum of synchronous spread spectrum multiplexed (SCDMA) bursts but skipping this step for DOCSIS 1.0 and DOCSIS 1.1 and advanced PHY time division multiplexed (TDMA) bursts and TDMA training bursts;

storing sample data for said despread SCDMA bursts and said TDMA bursts in a sample buffer so as to keep the data of each burst separate;

recovering the symbol clock of TDMA bursts and using a symbol clock synchronized to said recovered symbol clock to receive at least TDMA bursts, and using a master upstream symbol clock to receive SCDMA bursts from transmitters that have performed at least a ranging process, and resampling the received symbols at the correct timing using the recovered symbol clock or said master upstream symbol clock and storing the re sampled samples in a frame buffer;

detecting the time of arrival of a preamble of each burst and measuring the time offset between said time of arrival and a reference time in a contention interval for at least training bursts;

deinterleaving the preamble symbols if the preamble symbols are interleaved and processing the preamble symbols of at least training bursts to calculate and track gain, phase and frequency offset coefficients, and using said offset coefficients to correct the received symbols of at least some bursts and storing the corrected data symbols in a burst buffer and storing the corrected preamble symbols of at least training bursts in an equalizer buffer;

processing said received preamble symbols of at least training bursts to develop equalization coefficients for use in developing new equalization coefficients by the transmitter which sent said training bursts;

deinterleaving Trellis coded modulated (TCM) TDMA and SCDMA bursts but bypassing this step for non TCM bursts;

differentially decoding differentially encoded bursts but bypassing this step for all other bursts;

using a Viterbi decoder to detect the coded and uncoded bits of received symbols of TCM bursts, and using a slicer to detect the bits encoded in constellation points that correspond to each received symbol of non TCM bursts and outputting the bits mapped to said constellation points;

receiving the bits encoded in each received symbol of TCM and non TCM bursts and reversing the mapping of said payload bits of bytes of Reed Solomon codewords to constellation points to output a byte stream of Reed Solomon codewords;

descrambling said codewords of bursts that are scrambled, but bypassing this step is a burst is not scrambled;

deinterleaving said byte stream of Reed Solomon codewords;

decoding said Reed Solomon codewords by using error detection and correction bits therein to correct the data bits therein.

17. The process of claim 16 wherein said step of processing the preamble symbols to develop equalization coefficients comprises performing a coarse equalization convergence using a relatively larger step size to converge a subset of the most significant equalization filter taps and then performing a fine equalization convergence using a relatively smaller step size to adapt all the equalization filter coefficients by iteratively passing said preamble symbols through equalization filter circuitry.

18. The process of claim 16 wherein said step of using a Viterbi decoder comprises using a SOVA Viterbi decoder to detect and output the coded and uncoded bits of received symbols of TCM bursts along with an erasure indication and wherein said step of decoding said Reed Solomon codewords comprising using said erasure indication from said SOVA Viterbi decoder along with Reed Solomon parity bits appended to each Reed Solomon codeword to detect and correct at least some of the errors in said codewords.

19. The process of claim 16 further comprising the steps of performing a narrowband excision process to remove narrowband interference before the step of despreading.

20. The process of claim 16 further comprising the steps of performing impulse noise detection and erasing any samples from portions of bursts that have been corrupted by impulse noise before the step of despreading.

21. The process of claim 19 further comprising the steps of performing impulse noise detection and erasing any samples from portions of bursts that have been corrupted by impulse noise before the step of despreading.

22. The process of claim 16 wherein said step of filtering out unwanted radio frequency signals and digitizing the radio frequency components that remain, comprises the steps of:

using a broadband passband filter to filter out some unwanted frequency components;

using a frequency agile local oscillator and mixer combination to alter the center frequency of the band of frequency coming out of said broadband passband filter to the center frequency in the passband of a surface acoustic wave (SAW) passband filter that has its passband set wide enough to receive the bandwidth of the highest symbol rate burst to be received;

performing intermediate frequency sampling in an A/D converter to digitize the output band of frequency components output from said SAW filter;

performing narrowband excision to remove narrowband interference from said samples output from said A/D converter;

detecting impulse noise in said samples output by said narrowband excision filter and marking as erased any samples possibly corrupted by impulse noise;

performing decimation to remove excess samples not necessary for the symbol rate of the burst being received; and performing digital matched filtering using a digital filter having its filter coefficients set to establish a filter that matches the burst being received.

23. The process of claim 16 wherein said step of filtering out unwanted radio frequency signals and digitizing the radio frequency components that remain, comprises the steps of:

using a broadband passband filter to filter out some unwanted frequency components;

using a frequency agile local oscillator and mixer combination to alter the center frequency of the band of frequency coming out of said broadband passband filter to the center frequency in the passband of a surface acoustic wave (SAW) passband filter that has its passband set wide enough to receive the bandwidth of the highest symbol rate burst to be received;

down converting the signal output by said SAW filter to an intermediate frequency;

low pass filtering to remove all radio frequency components above a predetermined frequency;

digitizing the output signal of said low pass filter in an A/D converter;

performing narrowband excision to remove narrowband interference from said samples output from said A/D converter;

detecting impulse noise in said samples output by said narrowband excision filter and marking as erased any samples possibly corrupted by impulse noise;

performing decimation to remove excess samples not necessary for the symbol rate of the burst being received; and performing digital matched filtering using a digital passband filter having its filter coefficients set to establish a filter that matches the bandwidth of the burst to be received.

24. The process of claim 16 wherein said step of filtering out unwanted radio frequency signals and digitizing the radio frequency components that remain, comprises the steps of:

using a selected filter from a bank of passband filters with overlapping passbands to filter out some unwanted frequency components and leave generally a band of frequency components including the frequency components of a desired radio frequency carrier;

performing intermediate frequency sampling in an A/D converter to digitize the output band of frequency components output from said bank of passband filters so as to output a band of frequencies that depends on the radio frequency carrier to be received;

digitally mixing the signals represented by the samples output from said A/D converter with a quadrature, frequency agile local oscillator signal to mix the signals down to a lower fixed intermediate frequency signal that is independent of the center frequency of the radio frequency carrier to be received;

performing decimation and matched filtering on the output from the previous step to remove unnecessary samples for the symbol rate of the burst to be received and to passband filter the signal using a passband matched to the symbol rate of the symbol to be received;

performing narrowband excision to remove narrowband interference from said samples output from said A/D converter; and detecting impulse noise in said samples output by said narrowband excision filter and marking as erased any samples possibly corrupted by impulse noise.

25. The process of claim 16 wherein said step of filtering out unwanted radio frequency signals and digitizing the radio frequency components that remain, comprises the steps of:

using a frequency agile low resolution frequency synthesizer to down convert the desired radio frequency carrier to a signal having a frequency which is approximately at a fixed intermediate frequency;

digitizing said intermediate frequency signal at a fast sample rate high enough to correctly represent even the highest symbol rate burst to be received;

using a high resolution frequency synthesizer to digitally down convert the intermediate frequency signal to a digital intermediate frequency having the exact, desired intermediate frequency;

performing narrowband excision to remove narrowband interference from said samples output from said A/D converter; and detecting impulse noise in said samples output by said narrowband excision filter and marking as erased any samples possibly corrupted by impulse noise;

performing decimation to remove excess samples not necessary for the symbol rate of the burst being received; and performing digital matched filtering using a digital passband filter having its filter coefficients set to establish a passband for said filter that matches the bandwidth caused by the symbol rate of the burst to be received.

26. The process of claim 16 further comprising the step of cancelling intersymbol interference by processing data in said frame buffer using time offset information derived in the step of recovering said symbol clock.

27. The process of claim 16 further comprising the step of adjusting the gain of the received radio frequency signals and/or the sample data derived therefrom appropriately depending upon the application to which said receiver is put.

28. A pipelined digital data receiver comprising:
a filtering and digitizing circuit;
a pipelined demodulator that can process 5 different bursts simultaneously in different stages of the pipeline, comprised of the following five sections:

(1) an input processing circuit for marking samples that have been corrupted with impulse noise, performing decimation and matched bandpass filtering based upon the sample rate of each burst, despreading the spectrum of any synchronous code division multiplexed bursts and storing the processed sample data in a sample buffer;

(2) a timing recovery circuit for recovering the symbol clock of at least some bursts and detecting the timing offset of the start of at least training bursts from a time reference and detecting collisions in other bursts and resampling the received symbols of each burst at the correct timing, and storing the re sampled samples in a frame buffer;

(3) a rotational amplifier and equalizer circuit for processing the preambles of at least training bursts to calculate and track gain, phase and frequency correction factors and correct the preamble symbols of at least training bursts using said correction factors and store the corrected symbols in an equalizer buffer, and for correcting the data symbols of at least some bursts and storing the corrected symbols in a burst buffer, and for calculating upstream equalization coefficients from said corrected preamble symbols in said equalization buffer and making them available for transmission to the transmitter which transmitted said training burst;

(4) a deinterleaving and decoding circuit for deinterleaving Trellis code modulated (TCM) bursts and detecting the payload bits mapped to every constellation point corresponding to a TCM burst symbol and for detecting the payload bits mapped to the constellation point corresponding to each symbol of non TCM bursts; and (5) Reed Solomon error correcting circuitry for reconstructing Reed Solomon codewords from said payload bits and error correcting said codewords to generate payload data for output; and a computer programmed to control a transmitter to send messages downstream to upstream transmitters to control what type of bursts they transmit and when they transmit them and for storing burst parameters that define said bursts and MAP messages that define when the bursts are supposed to be transmitted in a burst parameter memory; and a timing and control circuit for using said burst parameters of each burst and said MAP data to control each section of said pipeline.

29. A process for receiving multiple types of DOCSIS bursts of radio frequency carrier signals modulated with constellation points each of which corresponds to a transmitted symbol including time division multiplexed (TDMA) bursts and synchronous code division multiplexed (SCDMA) bursts, said bursts having programmable symbol rates and modulation types comprising:

filtering out unwanted carrier signals and digitizing a desired carrier signal; performing symbol timing recovery and tracking to recover a symbol clock; performing carrier recovery and tracking;

performing burst acquisition and measuring timing offset of at least some bursts for transmission to a transmitter which transmitted said burst for using in achieving and maintaining frame synchronization and time alignment to minislot boundaries;

despreading the spectrum of any received SCDMA bursts using the proper codes but bypassing the despreading step for TDMA bursts;

processing a known, prepended preamble of each burst to determine gain, phase and frequency correction factors and using said correction factors to correct the received symbols prior to detection of the data bits encoded in each symbol;

developing equalization coefficients from a known preamble prepended to each burst, and providing said equalization coefficients for transmission to a transmitter which transmitted said burst for use in developing new equalization filter coefficients for subsequent transmissions;

deinterleaving received symbols if necessary;

detecting the data bits represented by each symbol including, if necessary, detecting both coded and uncoded bits for Trellis coded bursts;

receiving the bits of each burst including coded and uncoded bits of each constellation point of Trellis coded bursts and unmapping them back into a byte stream of Reed Solomon codewords;

descrambling the byte stream of Reed Solomon codewords derived from said received symbols if necessary;

deinterleaving the Reed Solomon codeword byte stream, and error correcting the byte stream into data for output.

30. The process of claim 29 wherein said symbol timing recovery step is only performed when receiving TDMA bursts and a master clock in the receiver is used for symbol timing when receiving SCDMA bursts, and wherein said step of developing equalization coefficients comprises the steps:

iteratively passing known preamble symbols of a training burst through equalization filtering circuitry and using a relatively larger step size to converge a subset of the most significant filter tap coefficients of an FFE and an FBE filter on coarse equalization coefficient values using said coarse equalization coefficient values to filtering the data symbols of said training burst in said FFE and FBE filters and passing the corrected data symbols to detecting circuitry to perform said detecting step; and iteratively passing at least said preamble symbols of said training burst through said FFE and FBE filters and using a relatively smaller step size to converge all the tap coefficients of said FFE and FBE filter on fine equalization coefficient values; and further comprising the steps of reading said fine equalization coefficient values and preparing a message which includes said fine equalization coefficient values for transmission to the transmitter which sent said training burst.

31. The process of claim 29 wherein the step of detecting the data bits comprises the steps of using a SOVA TCM Viterbi decoder to detect and output the coded and uncoded bits of each received symbol along with an erasure indication indicating the degree of confidence in the accuracy of said coded bits, and wherein the step of error correcting the Reed Solomon codewords comprises using said erasure indication output by said Viterbi decoder along with Reed Solomon parity symbols appended to each said codeword to detect and correct at least some errors.

32. The process of claim 29 wherein said bursts may have 16 QAM for TDMA bursts, Gray coded QPSK and 8 QAM to 64 QAM for TDMA and SCDMA bursts and Trellis encoded QPSK and 8 QAM through 128 QAM for SCDMA bursts, each modulation type having a predetermined symbol constellation, and wherein said bursts may have symbol rates of 160, 320, 640, 1280, 2560 and 5120 kilosymbols per second.

33. The process of claim 29 further comprising the steps of detecting impulse noise in the received bursts and marking data that may be corrupted by impulse noise as erased.

34. The process of claim 29 further comprising the steps of excising narrowband interference from the digitized data before demodulating it and detecting the transmitted bits.

35. The process of claim 29 further comprising the steps of amplifying the received radio frequency carriers by an appropriate gain level prior to digitization so as to allow said receiving process to be used in wireless as well as wired and other cable modem applications.

36. The process of claim 29 wherein said filtering step is performed by using a decimation and programmable passband digital filter and adjusting said passband of said filter digitally to match the bandwidth of bursts at various symbol rates.

37. The process of claim 36 wherein said filtering step is performed in a matched filter.

38. The process of claim 29 wherein said process of despreading the spectrum of SCDMA bursts includes the process of matching the codes used to despread said bursts so as to match a code hopping algorithm used in the transmitter which transmitted said burst.

39. The process of claim 29 wherein said step of burst acquisition is performed using a start of burst detector and further comprising the step of detecting collisions in bursts using said start of burst detector.

40. The process of claim 29 further comprising the step of performing intersymbol interference cancellation prior to detection of the bits that were sent.

41. An apparatus comprising:

a downstream transmitter;

an upstream receiver comprising:

a radio frequency filtering and digitizing circuit for filtering out undesired radio frequency components and digitizing a desired carrier;

a demodulator circuit capable of processing the digitized data to recover payload data transmitted in any of the following type bursts on the same or different frequency channels: DOCIS 1.0 or DOCSIS 1.1 or advanced PHY TDMA or SCDMA bursts, said bursts having programmable symbol rates and programmable modulation types, and including a start of burst detector to measure the time offset of the start of a training burst from a reference time, and including a preamble processor for developing phase, gain and frequency offset correction factors from known preamble symbols prepended to at least training bursts and for using said correction factors to correct received symbols, and including equalization circuitry to develop equalization coefficients from said prepended preamble symbols; and a computer programmed to control said downstream transmitter to send messages downstream to multiple transmitters telling them what type of burst to send and when to send them, and programmed to control said radio frequency filtering and digitizing circuit and said demodulator so as to know the type of burst that each received burst is so as to control these circuits to properly receive the burst, said computer programmed to read said time offset factor and said equalization coefficients developed from each training burst and to send said time offset and said equalization coefficients to the transmitter that sent said training burst via said downstream transmitter.

42. The apparatus of claim 41 wherein said radio frequency filtering and digitizing circuit comprises:

a gain controlled amplifier circuit either with a fixed gain or with a gain control input to receive a signal that controls the gain;

a wideband bandpass filter coupled to filter the output of said amplifier so as to pass a band of frequencies that includes the desired carrier frequency;

a frequency agile frequency synthesizer coupled to be controlled by said computer for generating a local oscillator signal;

a second bandpass filter in the form of a surface acoustic wave bandpass filter or other bandpass filter with suitable sharp rolloff and adequately linear passband to filter out most unwanted radio frequency signals outside a bandwidth selected to match the spectrum of the fastest symbol rate burst to be received, and having an input;

a mixer to receive the output of said wideband bandpass filter and mix it up to a predetermined frequency in the middle of the passband of said second bandpass filter using said local oscillator signal and couple the resulting signal to said input of said second bandpass filter;

an analog to digital converter coupled to receive the output signal from said second bandpass filter and functioning to IF sample said signal down to an intermediate frequency; and and wherein said demodulator circuit includes a digital bandpass filter with a programmable bandwidth set to match the bandwidth of each burst as said burst is received.

43. The apparatus of claim 41 wherein said demodulator circuit has five piplined sections which comprise:
input processing circuitry for removing impulse noise and filter at a bandwidth appropriate to the symbol rate and despread the spectrum of any SCDMA bursts;
timing recovery circuitry for at least recovering the symbol clock of at least TDMA bursts and detecting the start time of at least TDMA bursts;
rotational amplifier/equalization circuitry for deriving phase, amplitude and frequency correction factors and equalization coefficients from a preamble of known data prepended to every burst and using said correction factors to correct the constellation points of said burst; and
detector circuitry including a Trellis code modulation detector for determining the bits encoded in each symbol included the coded and uncoded bits of each Trellis coded constellation point and circuitry to deinterleave and decode Reed Solomon code words encoded by said bits to correct any errors therein.

44. An apparatus comprising:
a first filter to filter out most of the unwanted signals;
an analog to digital converter;
a digital matched filter with programmable filter coefficients which are altered so as to filter the output of the first filter using a passband matched to the bandwidth of each burst being received;
an SCDMA burst despreader which can be bypassed for TDMA bursts and functioning to despread the spectrum of received SCDMA bursts;
clock recovery circuitry to recover symbol clocks of TDMA bursts and to use a master clock for receiving SCDMA bursts;
a rotational amplifier to develop correction factors from known preambles of training bursts and use said correction factors to correct received symbols;
a ranging processor to determine a ranging offset for training bursts from each upstream transmitter for transmission to transmitters which transmitted said training bursts so that said transmitters can transmit bursts with timing such that the bursts arrives at said receiver with their boundaries aligned in time with the boundaries of assigned minislots;
a equalizer to develop equalization coefficients from said known preamble of training bursts;
a deinterleaver and Trellis decoder/slicer to detect the bits that are encoded into each SCDMA or TDMA burst constellation point, as appropriate;
a descrambler to reverse the effects of scrambling in the transmitter that transmitted each burst; and
a Reed Solomon decoder to correct errors in transmitted bits using error correction bits added to the bits by a Reed Solomon encoder at the transmitter which transmitted a burst.

45. The apparatus of claim 44 wherein said Trellis decoder/slicer are a SOVA TCM Viterbi decoder which is used to detect TDMA or SCDMA TCM bursts and output erasure indications and a slicer which detects non TCM bursts and outputs erasure indications, and wherein said Reed Solomon decoder is of a type which can use said erasure indications along with Reed Solomon parity bits to detect and correct errors in Reed Solomon codewords.

46. A digital data receiver, comprising:
first means for suppressing frequencies in an input spectrum other than the frequency components of a desired carrier and digitizing at least said desired carrier;
second means for recovering the payload data from any of a plurality of different burst types transmitted on the same frequency channel or two or more different burst types transmitted during different non overlapping intervals on the same frequency channel, said burst types having the following characteristics:
multiplexing is DOCSIS 1.0 or 1.1 TDMA or advanced PHY TDMA or SCDMA; and
any one of a plurality of different symbol rates and modulation types; and
programmable interleaving depth and block size; and
being or not being Trellis code modulated; and
means for controlling said first and second means to operate correctly to receive the particular type of burst or bursts being received on a selectable frequency channel.

47. A digital data receiver, comprising:
first means for suppressing frequencies in an input spectrum other than the frequency components of a desired carrier and digitizing at least said desired carrier;
second means for recovering the payload data from a plurality of different bursts transmitted at different times on the same frequency subchannel, each said bursts being any of a plurality of different burst types, said burst types having the following characteristics:
multiplexing is DOCSIS 1.0 or 1.1 TDMA or advanced PHY
TDMA or SCDMA; and
any one of a plurality of different symbol rates and modulation types; and
programmable interleaving depth and block size; and
being or not being Trellis code modulated; and
means for controlling by transmission of downstream messages which transmitters can send which burst types at which times and for controlling said first and second means to operate correctly to receive the particular type of burst being received at any particular time.

48. A two stage equalizer circuit for a digital data receiver, comprising:
first means in a DOCSIS compatible Cable Modem Termination System for processing known preamble data of only a training burst sent by a first DOCSIS compatible cable modem to said DOCSIS compatible Cable Modem Termination System to perform a coarse equalization convergence using a relatively larger step size to converge on a subset of coarse filter tap coefficients for a digital equalization filter by iteratively passing said known preamble data of a training burst through Feed Forward Equalization (hereafter FFE) and Feedback Equalization (hereafter FBE) digital filters of a two stage equalizer;
second means for filtering a data portion of a training burst sent by said first DOCSIS compatible cable modem using said Feed Forward and Feedback Equalization fitters having taps programmed with said coarse filter tap coefficients to correct said data symbols of said data portion of said training burst and for decoding said corrected data symbols to determine the identity of a cable modem which sent said training burst;
means for iteratively passing said known preamble data of said training burst sent by said first DOCSIS compatible cable modem through said first means and performing a fine equalization convergence using a relatively smaller step size so as to adjust all the tap coefficients of said FFE and FBE filters to converge on final equalization coefficients, and for sending said final equalization coefficients to said first DOCSIS compatible cable modem which transmitted said training burst and initializing said tap coefficients of said FFE and FBE filters to initial values to ready said FFE and FBE filters to process a training burst from a second DOCSIS compatible cable modem and for not filtering subsequent data bursts from said first DOCSIS compatible cable modem in said two stage equalization circuit.

49. An transceiver for transmitting a variety of different kinds of bursts, comprising:
- a transmitter comprising:
- a Reed Solomon encoder means for encoding bits to be transmitted into Reed Solomon codewords;
- interleaver means for interleaving said codewords;
- a scrambler means for scrambling said interleaved codewords;
- a mapper for mapping bits output by said scrambler into constellation points of non Trellis code modulated bursts;
- a Trellis code modulator for convolutionally encoding some bits of each scrambled codeword of bursts to be TCM modulated and mapping said convolutionally encoded bits plus one or more redundant bits into constellation points of TCM bursts;
- a framer means for mapping bursts onto minislots for TDMA bursts and for mapping bursts onto minislots and codes for SCDMA bursts;
- an SCDMA spreader means for spreading the spectrum of SCDMA bursts;
- a transmit equalizer means for receiving equalization coefficients developed by a CMTS receiver and for convolving said coefficients with existing equalization coefficients to develop new equalization coefficients and for using said new equalization coefficients in an equalization filter which filters the output of said SCDMA spreader for SCDMA bursts or the output of said mapper means for TDMA bursts;
- shaping filter means for shaping the resulting spectrum of the symbols to be transmitted;
- modulator means for encoding the filtered spectrum output by said shaping filter means onto one or more radio frequency carriers; and
- control circuitry coupled to said transmitter and having an input to receive downstream message data, and programmed to control all of the above transmitter circuitry appropriately to transmit the type of burst specified in said downstream message data; and
- a receiver to receive downstream messages including MAP and UCD messages and ranging offset data and equalization coefficients and for coupling said downstream message data to said input of said control circuitry, and including a ranging processor to control said transmitter to transmit training bursts including a known preamble and the identity of said transceiver.

* * * * *